United States Patent
Bush et al.

(10) Patent No.: US 6,397,186 B1
(45) Date of Patent: May 28, 2002

(54) HANDS-FREE, VOICE-OPERATED REMOTE CONTROL TRANSMITTER

(75) Inventors: William Stuart Bush, Manhattan Beach; Carlos Ferdinand Roura, Lomita, both of CA (US)

(73) Assignee: Ambush Interactive, Inc., Manhattan Beach, CA (US)

( * ) Notice: Subject to any disclaimer, the term of this patent is extended or adjusted under 35 U.S.C. 154(b) by 0 days.

(21) Appl. No.: 09/469,707

(22) Filed: Dec. 22, 1999

(51) Int. Cl.[7] .................................................. G10L 21/00
(52) U.S. Cl. ........................................ 704/274; 704/272
(58) Field of Search .................................. 704/200, 275, 704/272, 231, 233, 251, 252, 255, 250

(56) References Cited

U.S. PATENT DOCUMENTS

| | | | |
|---|---|---|---|
| 4,322,718 A | | 3/1982 | Faierstain |
| 4,725,827 A | * | 2/1988 | Gallegos, Jr. et al. ...... 340/696 |
| 4,771,283 A | * | 9/1988 | Imoto .................... 340/825.71 |
| 4,774,511 A | | 9/1988 | Rumbolt et al. |
| 4,905,279 A | | 2/1990 | Nishio |
| 5,142,398 A | | 8/1992 | Heep |
| 5,199,080 A | * | 3/1993 | Kimura et al. .............. 381/110 |
| 5,226,090 A | | 7/1993 | Kimura |
| 5,247,580 A | | 9/1993 | Kimura et al. |
| 5,267,323 A | | 11/1993 | Kimura |
| 5,444,673 A | * | 8/1995 | Mathurin ..................... 368/63 |
| 5,452,274 A | | 9/1995 | Thompson |
| 5,471,557 A | | 11/1995 | Chung et al. |
| 5,691,710 A | | 11/1997 | Pietraszak et al. |
| 5,774,859 A | | 6/1998 | Houser et al. |
| 5,777,571 A | | 7/1998 | Chuang |
| 5,790,754 A | | 8/1998 | Mozer et al. |
| 5,852,804 A | | 12/1998 | Sako |
| 5,878,394 A | | 3/1999 | Muhling |

(List continued on next page.)

OTHER PUBLICATIONS

"24AA64/24LC64 64K I²C™ CMOS Serial EEPROM" published by Microchip Technology Inc. 1999, Document No. DS21189C, pp. 1–12.

"CMOS Low Voltage 2Ω SPST Switches ADG701/ ADG702" published by Analog Devices, Inc. 1998, pp. 1–8.

"CMOS Low Voltage 4Ω SPDT Switch ADG719" published by Analog Devices, Inc. 1998, pp. 1–8.

(List continued on next page.)

*Primary Examiner*—Richemond Dorvil
(74) *Attorney, Agent, or Firm*—Katten Muchin Zavis Rosenman

(57) ABSTRACT

A wireless, programmable, sound-activated and voice-operated remote control transmitter can be used to add hands-free speech control operation to a plurality of remotely controlled appliances manufactured by various manufacturers, each of which is normally controlled with one or more signals from an associated remote control transmitter. The system may be pre-programmed with a universal library of codes for controlling various appliance categories and appliances produced by various manufacturers within each category. The system may also be programmed using the controlled appliances' remote control transmitters and one or more operators' spoken commands. Once programming is complete, there is no need for the operator to manually operate the system, allowing true hands-free voice control of the remotely controlled products. Voice commands are organized into a plurality of linked recognition vocabulary sets, each representing a subset of the complete voice command vocabulary available. These subsets are structured in a fashion that is intuitive to the user because the structure is consistent with controlled appliance operation. As such, the system allows a user to easily navigate via voice commands between recognition sets to attain access to the intended voice commands.

55 Claims, 27 Drawing Sheets

U.S. PATENT DOCUMENTS

| | | | |
|---|---|---|---|
| 5,959,751 A | | 9/1999 | Darbee et al. |
| 5,983,186 A | | 11/1999 | Miyazawa et al. |
| 6,012,029 A | * | 1/2000 | Cirino et al. ............... 704/275 |
| 6,052,666 A | * | 4/2000 | Diel et al. .................. 704/275 |
| 6,070,140 A | * | 5/2000 | Tran ........................... 704/275 |
| 6,119,088 A | | 9/2000 | Ciluffo |

OTHER PUBLICATIONS

"DM1000 Component Directional Microphone" published by Lucent Technologies, pp. 1–2.

"MACH 4 CPLD Family High Performance EE CMOS Programmable Logic," Publication 17466, published by Lattice Semiconductor Corporation, May 1999 pp. 1–62.

"Preliminary Product Specification Z86L81/86/98 28–Pin Low–Voltage Infrared Microcontroller", Document No. DS000701–IRX1298, published by Zilog, Inc. 1999, pp. 1–55.

"RSC–300/364 DataBook" published by Sensory, Inc., Aug. 1999, pp. 1–50.

"RSC–300/364 Recognition • Synthesis • Control", datasheet part No. 80–0111–6, published by Sensory, Inc.1999, pp. 1–8.

"Build a Voice–Activated Tape Recorder Switch", by Marc Spiwak, *Popular Electronics* magazine, Jan. 1996, pp. 35–36, 79.

"Voice Direct™ Speech Recognition IC", datasheet part No. 80–0022–5, published by Sensory Inc., Sep. 8, 1998, pp. 1–4.

* cited by examiner

HANDS-FREE, VOICE-OPERATED REMOTE CONTROL TRANSMITTER

BACKGROUND OF THE INVENTION

1. Field of Invention

This invention relates to devices for remotely controlling electronic equipment, and more particularly, to a wireless, user-programmable, voice-activated and voice-operated remote control system for controlling appliances.

2. Description of Prior Art

Historically, appliances, for example, electronic appliances, such as, televisions, VCRs, digital satellite systems, audio systems, and related accessories, have been remotely controlled by hand-held transmitters used to generate signals to receivers incorporated into the electronics of the remotely controlled appliances. Signals for such appliances correspond to control commands, such as channel selection/tuning, power on/off, audio volume adjustment, and muting controls, typically generated by the user by depressing buttons on a remote control transmitter keypad. The basic composition and operation of such remote control systems are well known in the art.

For convenience, such remote control transmitters are generally designed to be sufficiently small to be hand-held during operation. There are several disadvantages in using such hand-held transmitters. For example, the small size and mobility often contribute to misplacement or loss of the transmitter. Also, for device operators with restricted physical mobility or sight limitations, hand-held remote controls may not provide sufficient access to the command controls of the remotely controlled appliances. Also, if an operator's hands are engaged in an activity, an interruption in the activity may be required to operate the hand-held remote control, causing inconvenience to the operator and potentially having an adverse effect on productivity.

Additional problems occur as a consumer acquires various remotely controlled appliances, where each is typically supplied with a separate remote control transmitter. As the number of separate remote control transmitters increases, locating, distinguishing, and locating the appropriate transmitters becomes increasingly difficult. In response to this problem, universal remote control transmitters, pre-programmed by the manufacturers with control commands, typically coded infrared signals, have been developed to operate many different remotely controlled electronic appliances, for example, as disclosed in U.S. Pat. No. 4,774,511. In addition to universal remote control transmitters, learning remote control transmitters have been developed which receive the control command signals, typically infrared codes, from the remote control transmitters provided with remotely controlled appliances and generally store the frequencies and pulses into memory, with the signals becoming associated with buttons located on the keypad of the learning remote control transmitter. After programming is complete, depressing the keypad buttons prompts the learning remote control transmitter to re-transmit the codes stored within its memory. This allows the user to consolidate the control of several remotely controllable appliances into a single hand-held remote control transmitter. An example of such a system is disclosed in U.S. Pat. No. 5,142,398. For additional convenience to the user, the learning capability has been combined with universal remote control transmitters which are pre-programmed by the manufacturers with control commands necessary to operate many different remotely controlled electronic appliances, for example as disclosed in U.S. Pat. No. 5,691,710.

All of the above-mentioned systems require the user to establish physical contact, typically in the form of manually depressing keypad buttons, to transmit a control command to the remotely controlled appliance. As such, the above-mentioned systems due to their small size are often misplaced causing frustration to the user.

As such, voice-operated remote control systems have recently been developed which operate in response to user-spoken commands instead of commands selected by manually depressing keypad buttons. U.S. Pat. Nos. 5,199,080; 5,247,580; 5,267,323 and 5,226,090 disclose various embodiments of voice-operated remote control systems which employ voice control commands instead of control commands entered through buttons on a keypad. Unfortunately, such systems are not truly hands-free, requiring manual intervention by the user during use. In particular, such remote control systems as disclosed in the above-mentioned patents, are all based upon the use of a "talk switch"; which must be manually depressed to enter a voice command when the transmission of a remote control signal is desired.

U.S. Pat. No. 5,226,090 further discloses a voice-operated remote control system which contains a detector for detecting whether a voice command is received or not. A detected signal from the detector is applied to a power supply circuit. When there is no voice command received as detected by the detector, the power supply control circuit cuts off electric energy supplied to a speech recognition circuit. The voice command detector circuit is implemented by a detecting program stored in the ROM in a controller. The detecting program determines whether the talk switch has been depressed. The transmitter operates depending on whether the talk switch has been depressed. If the talk switch has been depressed, the transmitter is enabled to remote control signals. Once the talk switch is released, the transmitter is kept in a low power consumption mode, waiting for voice commands to be applied. As indicated above, the means for generating and transmitting a remote control signal based on the recognized spoken voice command is not hands-free, requiring the manual intervention of pressing a talk switch to accomplish these functions.

Various other systems are known which use speech recognition to control appliances. For example, U.S. Pat. No. 5,852,804 discloses a system for controlling several external appliances connected to a speech recognition system. However, the system disclosed in the '804 patent requires physical interconnections between the control system and the appliance which makes it difficult for a user to add additional appliances or change controlled appliances.

U.S. Pat. No. 5,878,394 discloses a system which includes connections to a remote control network for transmitting infrared codes and a graphical user interface on a personal computer (PC). In addition to the inconvenience of establishing the remote control network, a user must have access to a PC and desire to make the PC available for such control functions. The system disclosed in the '394 patent has only limited utility for consumers who have access to a PC or can afford the expense of a PC and thus excludes a significant portion of consumers who may otherwise desire to add speech recognition control to their electronic appliances if an inexpensive alternative is available.

U.S. Pat. No. 5,774,859 discloses a subscriber information system with a speech interface, similar to the system disclosed in U.S. Pat. No. 5,878,394 the system in the '859 patent is based upon a PC-class processor. Operation of this system is dependent upon receiving information from an information distribution center or head-end installation and therefore lacks the advantages of a stand-alone device. Unfortunately, the remote control is not capable of independently completing the speech recognition process and transmitting infrared signals indicated by such recognition results to controlled appliances. Furthermore, this system also requires a PC-class processor.

Inconvenience is another problem that occurs as a user intends to perform multiple control functions involving one or more controlled appliances and must recall and enter a series of voice commands to a voice-operated remote control system. U.S. Pat. No. 5,852,804 discloses a system, where one speech command may be defined which is capable of manipulation of more than one connected appliance. However, this system requires that each controlled appliance be physically connected to the system and that the controlled appliance be manually manipulated during setup for each function to be executed upon recognition of the speech command. Also, if a single command is to be used to execute a series of controlled appliance functions, its capability is limited unless time delays of variable lengths may be inserted within the series of control functions to accommodate the initialization periods for certain controlled appliances. For example, if a voice command sends signals to a television to power it on and turn to a specified channel, a period of time may elapse between the receipt of the power on command until the television warms up and is ready to receive additional commands. Such initialization periods vary from appliance to appliance and therefore means is needed to allow a user to adjust the time delay as necessary.

There are various other problems with known systems which utilize voice recognition to control appliances. For example, one problem occurs as the list of voice commands grows. Generally, each time a speech recognition product detects a spoken word, it compares the word to those in a recognition vocabulary. In general, as a recognition vocabulary increases in size, recognition time increases and accuracy decreases. The more words in a recognition vocabulary, the more likely the speech recognition circuit will make a mistake and accuracy generally diminishes. Without the capability to utilize multiple vocabulary recognition sets, the commands available for selection must all be available at the same time, meaning they must all reside in the same recognition vocabulary set. Thus, the user may be inconvenienced by the limited command availability of a small recognition vocabulary or the diminishing speech recognition accuracy and longer recognition times resulting as the single recognition vocabulary is increased in size. Another disadvantage of a single recognition vocabulary is that the recognition of voice command always yields the same response. In a multiple recognition vocabulary set scheme, the same voice command may yield different results upon recognition if placed within different vocabulary recognition sets. A still further disadvantage of a single recognition vocabulary is that the recognition vocabulary words must be phonetically distinctive from each other which may limit the use of words that may be intuitive for their intended function but are too phonetically similar to other words in the recognition vocabulary, forcing the user to remember a word that is less intuitive. In a multiple recognition vocabulary set scheme, words that are not phonetically distinctive from each other may still be used by placing such words in different recognition vocabulary sets.

Another problem with known systems occurs when a device is limited to executing software for a single speech recognition mode for recognizing spoken commands to remotely control appliances. This problem becomes apparent if an appliance has the ability to process a series of remote control signals arriving within a predetermined time of each other differently than if the codes arrive at intervals outside of this predetermined time. For example, many televisions are capable of receiving the remote control signal transmissions for the digits one, two and three in rapid succession and responding by switching to channel 123 instead of changing to channel 1, then to channel 2 and then to channel 3. As such, a user must be able to quickly submit a voice command following the recognition of a prior voice command, and then the recognition of the latter voice command, the submission of a remote control signal and the detection of the signal by the appliance must occur within the time limit if the appliance is to interpret the commands as a related series of commands instead of individual commands.

Thus, there is a need for a stand-alone, wireless remote control that can be positioned in a location remote to both the user and the controlled appliances, which can be activated and operated entirely via voice commands, conveniently compatible with commercially available remote controlled appliances, and can be operated by a plurality of users and can be programmed by a user to operate in a customized manner.

SUMMARY OF THE INVENTION

The present invention relates to a method and apparatus that enables a user to control the function of one or more electric appliances or other electrical equipment solely with voice commands. An important aspect of the invention relates to voice-actuated mode switching for switching the present invention from a low power consumption mode.

A hands-free speech recognizing transmitter in accordance with the invention, which may be a light-weight small base mounted unit, is adapted to be located near the controlled appliances. A voice-operated selection mechanism is provided for selecting any one of a number of categories of appliances to be controlled. A universal remote control code library may be provided which allows codes to be selected for control of different types of appliances as well as appliances manufactured by different manufacturers. Infrared signal receiving, decoding and storage capabilities further enhance the invention by providing means to learn infrared codes from other remote control transmitters, such as an appliance's original remote control transmitter. This feature is advantageous for appliances whose codes are not contained in the universal library stored in the invention's memory and also serves to render the invention much less susceptible to obsolescence than speech recognizing transmitters disclosed in the prior art.

A scheme is provided where both speaker independent and speaker dependent vocabulary may be used as voice commands. A speaker independent vocabulary structure provides the user with the means of navigating multiple linked recognition vocabulary sets. At any one time, a single recognition set is made active by the speech recognition circuit. A voice command in one recognition vocabulary set may be used to activate another recognition vocabulary set. In this fashion, a user may verbally navigate among different types of remote control functions and target appliances in an intuitive fashion, while minimizing the number of alternative words from which the speech recognition circuit must select during any given recognition process.

With the total recognition vocabulary partitioned into smaller recognition vocabulary sets, improvements result in recognition time and accuracy because, in general, as a recognition vocabulary increases in size, recognition time increases and accuracy decreases. Furthermore, recognition vocabulary sets are created such that the contents within each set have either functional similarities or otherwise share a relationship that is intuitive to the user. To prevent confusion that may arise with respect to the active recognition vocabulary set at any given time, the present invention monitors conditions with a time-out counter and an error counter to automatically return to a general default mode if certain conditions are met. In other words, a predetermined number of recognition errors or a period during which no successful recognition occurs will result in a known default state.

Custom speaker dependent voice commands may be trained by the user and associated with infrared signals during product setup processes. These speaker dependent commands may be accessible from the vocabulary structure described above.

The present invention has the capability of transmitting multiple control signals, such as infrared signals, to one or more appliances in response to a single voice command by the user. Such macro programs may be programmed by the user during a product setup process. For example, a user may desire that the response to the voice command "Video" is for the invention to issue commands to turn a TV power on, wait for the TV to warm up until it is ready to receive control signals, such as infrared signals, set the channel to "3," select the VCR for control, turn on the VCR, and execute the VCR's play function. As another example, the user may desire that the response to the user-trained voice command "Sports" is for the invention to issue commands to a TV to turn to channel 123.

The system may be configured to be self-contained in a single free-standing or stand-alone housing. The housing may contain a directional microphone mounted to be rotationally adjusted by the user to enable the user to adjust the sensitivity of the microphone so that the microphone's high sensitivity region is pointed toward the user and microphone noise generating sources, such as an appliance's loudspeaker are located in a region of low microphone sensitivity. Visual indication lights may be provided in a manner to remain in line of sight with the user to communicate operation status, such as availability for recognition and results of prior recognition attempts. A small keypad may be provided to assist the user during product setup sequences. A speaker is also provided to enable output speech synthesized prompts to further assist the user during setup sequences.

DESCRIPTION OF THE DRAWINGS

These and other advantages of the present invention are readily understood with reference to the following specification and attached drawings wherein.

DETAILED DESCRIPTION

The present invention relates to a truly hands-free universal control unit system for controlling various appliances, such as entertainment appliances, for example, TVs, VCRs, stereo's and the like and may also be used for non-entertainment appliances and virtually any device that is amenable to remote control, The universal remote control system in accordance with the present invention is user programmable to enable any number of appliances to be programmed by the user. In order to facilitate portability and eliminate the inconvenience associated with power cords/cables, the universal control system in accordance with one embodiment of the invention may be battery operated. During periods when no voice commands are being issued the system enters a sleep or sound activation mode. An important aspect of the invention relates to the ability of the system to switch from a sleep mode to an active mode solely by voice commands, to provide true hands-free remote operation.

Figure 1:
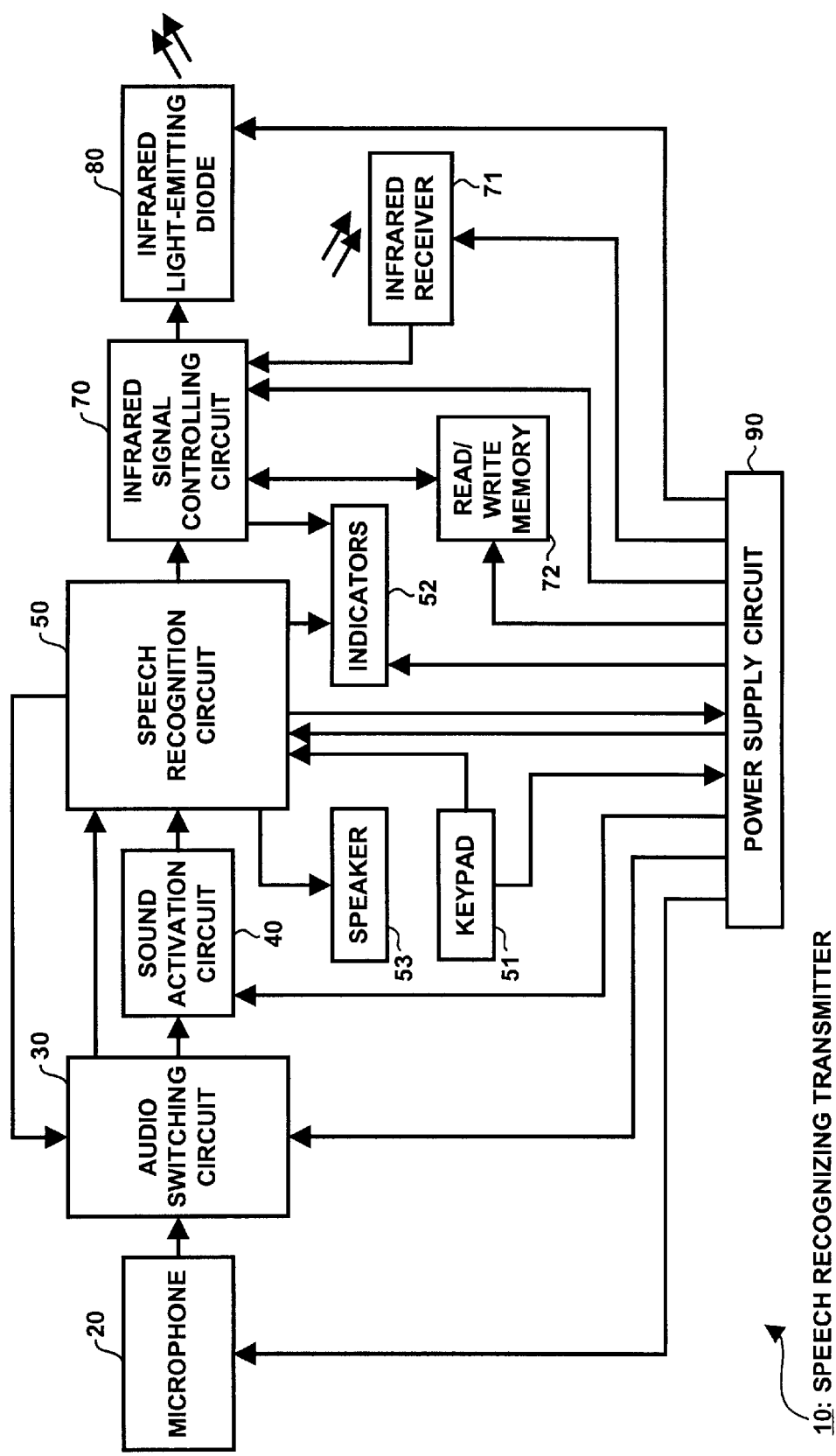
FIG. 1 is a functional block diagram of the electronic elements and circuits in one embodiment of the present invention.

A block diagram of the system in accordance with the present invention is illustrated in FIG. 1 and generally identified with the reference numeral 10. As will be discussed in more detail below, the system 10 enables hands-free operation of one or more appliances in a wireless manner.

Referring to FIG. 1, the system 10 includes a microphone 20, an audio switching circuit 30, a sound activation circuit 40, a speech recognition circuit 50, and a transmitter, for example, an infrared signal controlling circuit 70 and one or more infrared light-emitting diodes 80. The system 10 may also contain an infrared receiver 71, a read/write memory device 72 for storage of received IR signal data one or more indicators 52, a keypad 51 and a speaker 53. A power supply circuit 90 is also included. The power supply 90 may be configured for DC operation to enable portability of the system 10 or alternatively AC operation.

An output signal from the microphone 20 is electrically connected to an automatic audio switching circuit 30. The microphone 20 may be one or more directional microphones, which have higher sensitivity to sound generated in predetermined regions in relation to the microphone's position than in other predetermined regions. A suitable microphone is a model number M118HC directional microphone, available from Lucent Technologies and described in detail in; "DM 1000 Component Directional Microphone", pages 1 and 2, available from Lucent Technologies, hereby incorporated by reference. Sound arriving at the microphone is converted into an electric audio output signal by the microphone 20 and is directed to the audio switching circuit 30. Depending on the state of the audio switching circuit 30, the microphone audio signal output is directed to the speech recognition circuit 50 if the speech recognition circuit 50 is not in a sound activation mode. Conversely, if the speech recognition circuit 50 is in sound activation mode, the audio switching circuit 30 routes the microphone audio signal output to a sound activation circuit 40.

In the sound activation mode, the output signal of the microphone 20 is electrically connected to the sound activation circuit 40 which includes an amplification circuit (shown in detail in FIG. 2c), that amplifies the signal and a trigger circuit 43 (shown in FIG. 2c) that receives the amplified signal from the output of the amplification circuit. An output of the trigger circuit 43 is electrically connected to an input/output pin of the speech recognition circuit 50. If the amplified signal is of sufficient amplitude to activate the trigger circuit 43, the output of the trigger circuit causes a logic state change on the input/output pin of the speech recognition circuit 50, causing the invention to change modes from a sleep or sound activation mode to an awake or speech recognition mode.

The mode change may be done in software and/or hardware to cause the logic state of a mode output pin 65 (shown in FIG. 2a) of the speech recognition circuit 50, connected to an input control of the audio switching circuit, to cause the audio switching circuit 30 to route the microphone output signal to the speech recognition circuit 50. Once the logic state is changed to an awake or speech recognition mode, voice commands may then be received and recognized by the speech recognition circuit 50. The speech recognition circuit 50 may include output pins that are electrically connected to a infrared signal controlling circuit 70. Upon recognition of a voice command associated with an instruction to the transmitter, for example, an infrared signal controlling circuit 70, the speech recognition circuit 50 sends one or more signals using the output pins to the infrared signal controlling circuit 70.

The system 10 as illustrated and described herein translates the voice commands to infrared signals for controlling the appliance by way of an infrared link. In particular, as will be discussed in more detail below, the output from the speech recognition circuit 50 is directed to a wireless transmitter, formed from an infrared signal controlling unit 70 and one or more infrared light emitting diodes 80 capable of transmitting infrared light in one or more wavelengths. As such, the present invention utilizes conventional infrared remote control microcontroller-based technologies, including the conventional universal appliance code libraries that are familiar to those skilled in the art. Alternatively, the system may utilize other wireless links, other than infrared or in addition thereto, such as RF, ultrasonic and optical links. In addition, certain aspects of the invention including the mode changing from a sleep to an awake mode are adapted to be used with appliances that are either wired and wirelessly coupled to the system. For example, the appliances may be coupled to the system 10 over a power distribution network. In all such applications, the principles of the present invention enable truly hands free control of the appliances.

Referring back to FIG. 1, for applications utilizing infrared signals to control the appliance, the infrared signal controlling circuit 70 is electrically connected to one or more infrared light emitting diodes 80. The infrared signal controlling circuit 70 receives and interprets signals from the speech recognition circuit 50 and if the signals communicate instructions to transmit infrared signals to a controlled appliance, the infrared signal controlling circuit 70 identifies the appropriate remote control code and sends a remote control signal representing the code to the infrared light emitting diode(s) 80, which transmits the signal to the controlled appliance.

An infrared receiver 71, a read/write memory 72, and an indicator 52d may be electrically connected to the infrared signal controlling circuit 80. The infrared receiver 72 detects and receives the infrared remote control signals transmitted by other remote control transmitters in a learn mode. The infrared signal controlling circuit 70 receives these signals as digital output from the infrared receiver 72. The infrared signal controlling circuit 70 decodes and stores the digital signals as codes in the read/write memory 72 for later transmission. The indicator 52d may be used to provide a visual indicator to the user during said infrared signal receiving and transmitting operations.

A keypad 51, indicators 52a, 52b and 52c, and a speaker 53 may be electrically connected to the speech recognition circuit 50. The keypad 51 buttons may be utilized by the user to send signals to the input pins of the speech recognition circuit 50 during a product setup process and to provide a power switch for the invention. The indicators 52 may be utilized to provide the user with visual status of the system during setup and operation. The speaker 53 is driven by the speech recognition circuit 50 pulse width modulation output and is primarily used to provide synthesized speech prompts to the user during product setup processes.

Software executed by the speech recognition circuit 50 monitors conditions with a sound activation time-out counter and an error recognition counter. Upon the attainment of predetermined conditions discussed below, the speech recognition circuit 50 software enters a low power consuming sleep or sound activation mode.

A power supply circuit 90 electrically connects a power source (not shown) to circuitry distributing electric power to the electronic elements of the present invention. The power source may be either AC or DC or a combination thereof. For example, commercially available alkaline batteries or rechargeable battery packs are suitable for a DC power supply.

Figure 17:
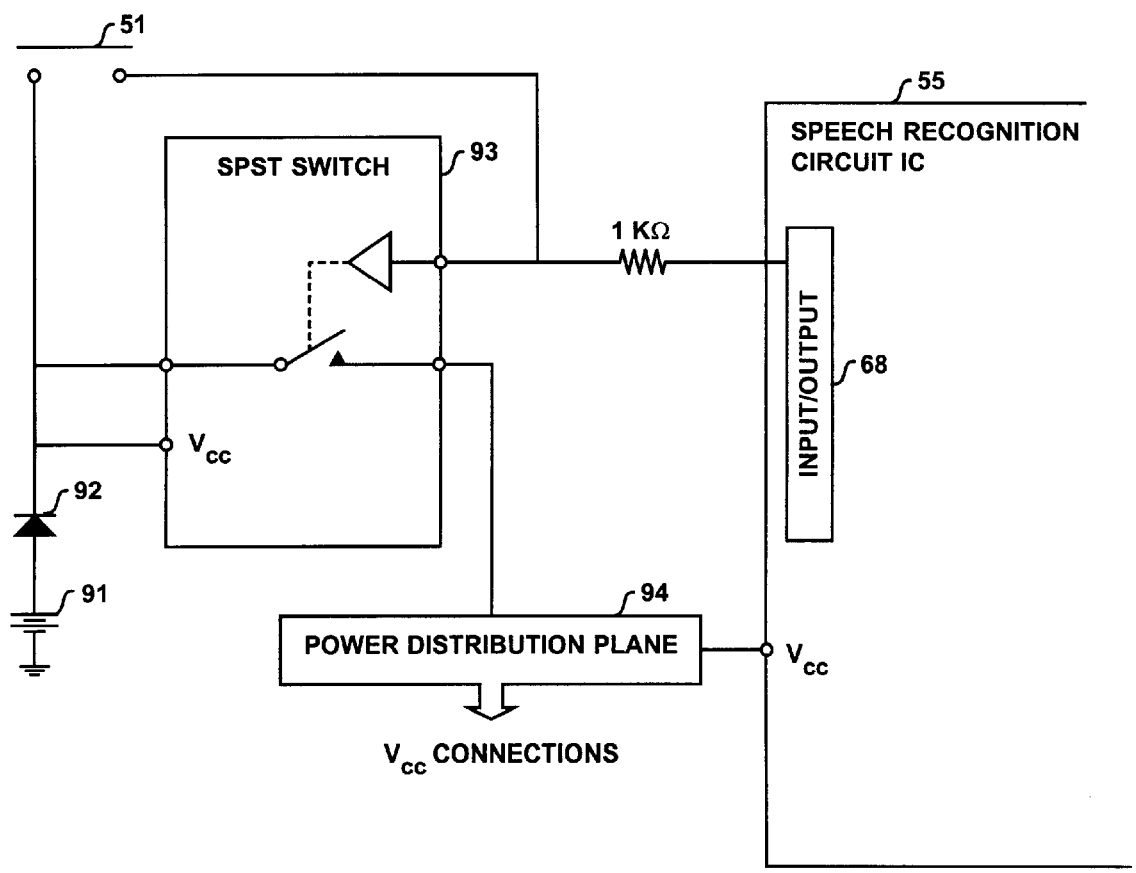
FIG. 17 is a schematic circuit diagram showing the details of the power supply circuit of one embodiment of the present invention.

Reference is made to FIG. 17 which shows the power supply circuit 90 in greater detail than that shown in FIG. 1. As previously discussed, one of the buttons present on the keypad 51 may be connected to a momentary switch, which, when depressed and held for a sufficient duration of time, establishes an electrical connection between a power source 91 and an input control pin of a digitally controlled CMOS single-pole, single-throw (SPST) analog switch 93. An example of a commercially available SPST switch for such purposes is a model number ADG701, available from Analog Devices, Inc. and described in a data sheet entitled; *CMOS Low Voltage 2Ω SPST Switches*, Rev a, pages 1–8 available from Analog Devices, Inc., hereby incorporated by reference. The input control pin responds to this electrical connection with the power source 91 in a manner equivalent to receiving a logic high digital input, resulting in a closed electrical connection between switch 93 source and drain pins and allowing a connection to be established between the power source 91 and a power distribution plane 94. When the speech recognition circuit IC 55 becomes electrically connected with the power source 91 as described above, the software stored within its ROM 61 executes a program to set a predetermined output pin 68 to a logic high state. The output pin 68 is electrically connected to the input control pin of the switch 93. Thus, the response of the speech recognition circuit IC 55 to receiving electric energy during a power up sequence is to cause switch 93 to establish a closed electrical connection between its source and drain pins. This electrical connection within switch 93 allows the power source 91 to be electrically connected to the power distribution plane 94 which distributes electric energy throughout the printed circuit board assembly 16 for use by components requiring electric energy for operation.

The software contained within the ROM 61 of the speech recognition circuit 50 may respond to the recognition of a speech command such as "Power" when the appropriate recognition vocabulary set is active and under the conditions described below by executing a command to change the logic state of said output pin 68 to a logic low condition. This logic low is then received by the input control pin of switch 93, which responds by creating an open connection between switch 93 source and drain pins, and thus disconnecting power distribution plane 94 from the power source 91. Thus, the present invention may be powered down via voice command. If the power switch 93 is open as shown in FIG. 17, the circuit elements reliant on this connection to receive energy do not receive electric energy. Also shown in FIG. 17 is a protection diode 2, for example, a commercially available 1N4001, located in series with the power source 91 and other electrical connections to prevent damage to other printed circuit board assembly 16 components in the event batteries are inserted with incorrect polarity orientation.

Figure 2A:
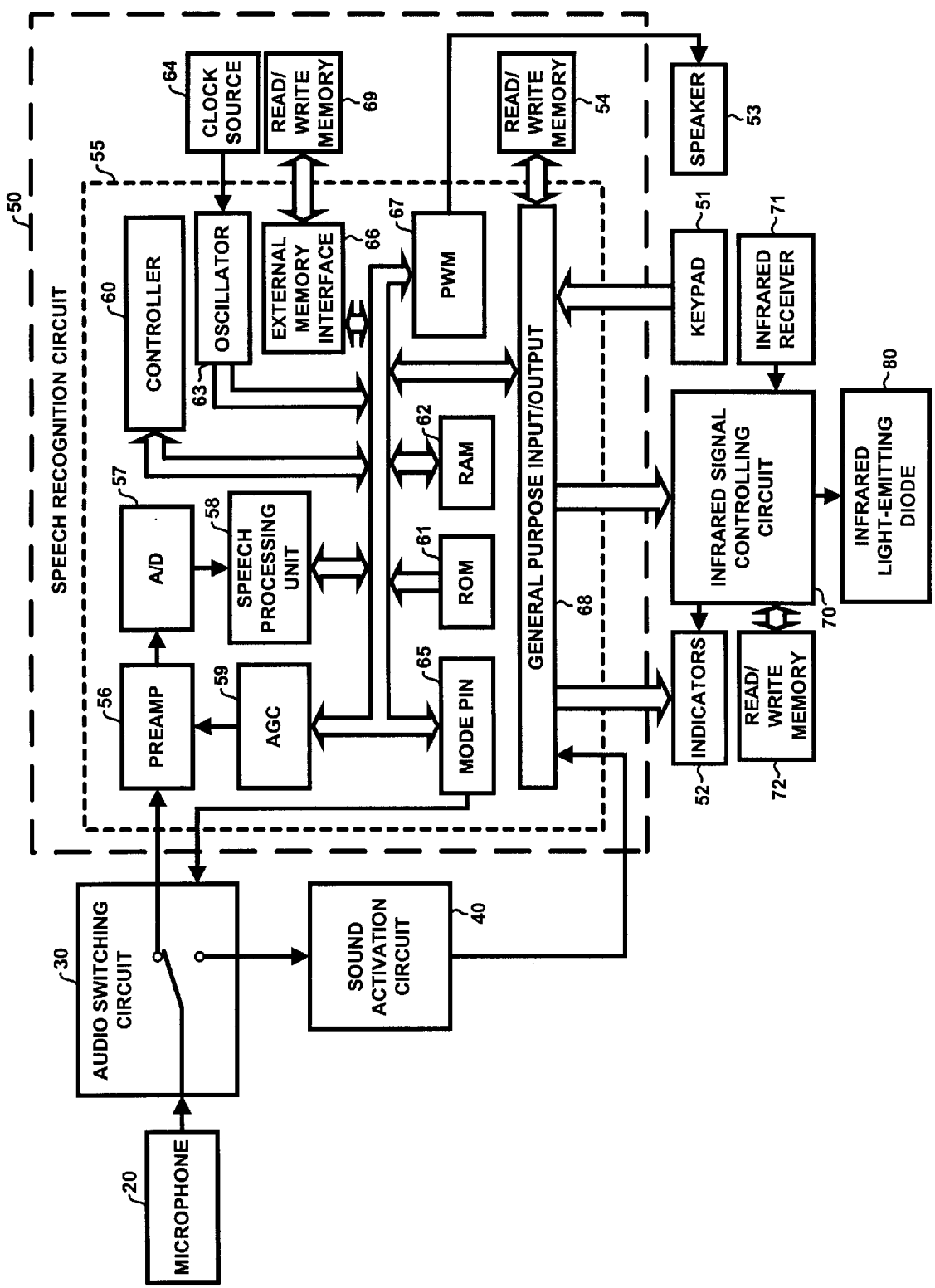
FIG. 2a is a functional block diagram showing the details of the speech recognition circuit in one embodiment of the present invention.

FIG. 2*a* illustrates the speech recognition circuit 50 in greater detail. The electronic elements of the speech recognition circuit 50 that process the microphone audio signal output received from the audio switching circuit 30 may be in the form of a microcontroller-based integrated circuit, IC chip 55. Such microcontroller-based ICs specifically designed for speech applications in consumer electronic products are well described in the prior art and are commercially available. An example of a suitable IC is a type RSC-300/364 speech recognition microcontroller as manufactured by Sensory, Inc. of Sunnyvale, Calif. and as described in a data sheet entitled; *RSC-300/364 Recognition Synthesis Control*, published by Sensory, Inc. copyright 1999, and *Data Book RSC*-300/364; pages 1–50, published by Sensory Inc, Sunnyvale, Calif., copyright August 1999, hereby incorporated by reference. Alternately, other microcontrollers can be used as well as digital signal processors. In particular, the IC 55 contains as a minimum a preamplifier 56, an analog to digital converter (A/D) 57, a speech processing unit 58, an automatic gain control (AGC) 59, a microcontroller 60, a read-only memory (ROM) 61, a random access memory (RAM) 62, a pulse width modulation (PWM) output 67 or a digital to analog converter (not shown), a mode output 65 pin, a clock 63, an external memory interface 66, and two general purpose input/output (I/O) ports 68. Also included in the speech recognition circuit 50 are a clock source 64, a read/write memory device for storage of speech reference pattern data 54, and, optionally, additional read/write memory device(s) 69 or ROM devices (not shown) connected to the external memory interface 66. The description of the operation of the speech recognition circuit 55 is provided in general terms for the specific speech recognition IC mentioned above and is specific only in areas where the present invention departs from prior art disclosures or is beneficial to the explanation of aspects of the present invention. It should also be noted that, as an alternate to the speech recognition IC 55, a conventional microprocessor or a digital signal processor capable of executing speech recognition software algorithms may be used. Any of the speech recognition circuit elements described above that are not included in said conventional processors may be provided in circuitry external to said IC.

The present invention executes pattern generation algorithms and speech recognition algorithms that are known to those skilled in the art. One speech recognition algorithm for speaker independent recognition uses a pre-trained neural network described in prior art, for example, as is provided by Sensory, Inc. as described below. One process for speaker dependent speech recognition involves creating a reference pattern for each voice command word or phrase during a user-controlled product setup process. During this set-up process, a pattern is generated when a voice command is spoken by the user. A pattern is a compact representation of the significant acoustic information in a voice command word or phrase. A speaker dependent reference pattern is created by averaging patterns generated as the voice command is spoken two or more times and the reference pattern is stored in a read/write memory 54. After the setup process is complete, speaker dependent speech recognition then involves comparing an unknown pattern generated from a voice command spoken by the user to the speaker dependent reference patterns within a specified recognition vocabulary set. This comparison may involve distance measurements and calculations of the fit of the unknown pattern to each of the reference patterns to determine the closest matching reference pattern. However, the present invention may implement one or more generally known algorithms, including but not limited to pattern matching that compares an unknown pattern with reference patterns, neural networks, and/or hidden Markov models.

One embodiment of the present invention makes both speaker independent and speaker dependent speech recognition available to the user by providing factory-programmed speaker independent commands that require no additional user voice training and providing speaker dependent command training capability to allow the user to create custom names for appliances, functions, and macro programs. Speaker independent speech recognition is designed to recognize words spoken by a plurality of users and is language dependent. Speaker independent command reference data are generally derived from recordings of the specified spoken commands from several hundred individuals with different speech characteristics and accents in conditions similar to the environment of a product's intended use. Therefore, speaker independent commands require no voice training from the user. Speaker dependent recognition generally involves a user training a product to recognize specific words, and is therefore not language dependent. The implementation of linked recognition sets as previously described also allows the user to easily access and navigate among both speaker dependent and speaker independent recognition vocabulary sets. Other embodiments of the present invention may be of the form of a speaker independent only version or a speaker dependent version where a user may follow a set-up sequence to train speaker dependent words in place of the speaker independent structure of the embodiment described herein.

When the speech recognition circuit 50 is not in a sound activation mode, the audio switching circuit 30 provides an electric connection between the microphone audio signal output and the preamplifier 56 in the speech recognition circuit 50. The preamplifier 56 provides signal amplification to a level suitable for analog to digital conversion. The analog to digital converter (A/D) 57, preferably having an accuracy of at least 12 bits, is coupled to the output of the preamplifier 56 and converts the incoming audio waveform into digital representations of the incoming signal. The digital output of the analog to digital converter 57 is directed to the speech processing unit 58. The speech processing unit 58 is controlled by the controller 60 and utilizes RAM 62 for temporary storage of data, control information and result registers, and an arithmetic logic unit (not shown) to produce band-pass-filtered representations of the input waveform in several frequency bands. The output of the speech processing unit 58 is received by the controller 60. Utilizing code stored in ROM 61 as discussed below, and register space and data space provided by the RAM 62, the controller 60 analyzes the filtered input waveforms to produce a pattern in real time that contains the significant acoustic information in the input signal. The controller 60 then executes recognition algorithm software to determine which voice command in the active recognition vocabulary set is the best match and was most likely spoken by the user. The controller 60, utilizing control code stored in the ROM 61, determines the appropriate operation of the system associated with the recognition result, such as generating appropriate outputs at general purpose input/output ports 68. An automatic gain control (ACG) 59 is controlled by the controller 60 and provides feedback to the preamplifier 56 for adjustment of the level of amplification performed on the microphone audio signal output due to variations in the input signal.

The IC 55 contains at least one oscillator which functions as a clock 63, driven by a clock source 64 external to the IC 55. The IC 55 contains an external memory bus 66 which serves as an interface for addressing additional ROM or RAM located external to the IC if additional memory capacity is needed for control code or data. The pulse width modulation (PWM) output pins 67 are electrically connected to a speaker 53 and used primarily to provide synthesized speech prompts and/or audio sounds to direct the user during product set-up sequences. The digital to analog converter (not shown) is electrically connected to an audio amplifier (not shown), and may be used as an alternate to the pulse width modulation (PWM) output 67, electrically connected to the speaker 53 to provide synthesized speech prompts.

Executing software code stored in the ROM 61, the controller 60 utilizes register space in the RAM 62 to control the logic states of predetermined control register bits to determine if the clock 63 is enabled or disabled and if the controller 60 is in a low power consuming mode or not. The controller 60 may place the speech recognition circuit 50 into a low power consuming sound activation mode by changing the logic states of said control register bits, removing the clock source 64 from the oscillator 63 of IC 55. The controller 60 software also changes the logic state of a mode output 65 pin of the speech recognition circuit 50, as it enters the sound activation mode. An input control for the audio switching circuit 30 is electrically connected to said mode output 65 pin which changes logic states as the speech recognition circuit changes modes between speech recognition mode and sound activation mode. The input control for the audio switching circuit 30 changes as the logic state of the mode output pin changes, causing the electric signal output from the microphone 20 to be electrically connected to the sound activation circuit 40. The audio switching circuit connections are shown in detail in FIG. 2c.

The speech recognition circuit 50 remains in this sound activation mode until the sound activation circuit 40 causes a bit transition at a predetermined input 68 pin. The bit transition changes the state of the previously set control register bits which removes the speech recognition circuit 50 from the low power consuming sleep or sound activation mode and enables the oscillator clock 63. Once the oscillator clock 63 is started and initialized, the code stored in the ROM 61 instructs the controller 60 to place the speech recognition circuit 50 into speech recognition mode running a continuous listening pattern generation and recognition software routine. The software also instructs the controller to change the logic state of the mode output 65 pin.

Stopping and restarting the speech recognition circuit 50 as previously described does not cause a reset of the controller 60, nor cause loss of contents of internal registers and thus allows the input/outputs 68 to remain where last set. By removing the oscillator clock source, the power requirement for the speech recognition circuit is significantly reduced, but the ability to maintain its energy supply allows the speech recognition circuit to retain the contents of its internal register and previously set input/output 68 conditions and resume operation in a relatively uninterrupted manner. Furthermore, the energized speech recognition circuit remains capable of detecting input events at the IC 55 input 68 pins even when placed in low power consuming sound activation mode, further supporting the hands-free activation capability of the sound activated circuit 40.

The present invention may also contain software code stored in the ROM 61 to provide a user with a means of navigating a vocabulary structure consisting of multiple, partitioned recognition vocabulary sets. At any one time, no more than a single recognition vocabulary set is made active by the speech recognition circuit. With the total recognition vocabulary partitioned into smaller recognition vocabulary sets, improvements in recognition time and accuracy result because, in general, as a recognition vocabulary increases in size, recognition time increases and accuracy decreases. Recognition vocabulary sets are generally created such that the voice commands, represented by the reference data within each said set, have either functional similarities or otherwise share a relationship that is intuitive to the operator. A voice command in one recognition vocabulary set may activate another recognition vocabulary set. In this fashion, a user may verbally navigate among different types of function selections and target appliance selections in an intuitive fashion, while limiting the number of alternative words among which the speech recognition circuit must discriminate during any given recognition process. Furthermore, since a pattern generated by a voice command is compared only to the words in the active recognition vocabulary set, the use of phonetically similar words is possible if such similar words are placed in different recognition vocabulary sets.

To prevent confusion that may arise with respect to the active recognition vocabulary set at any given time, the present invention monitors conditions with a time-out counter and an error counter to automatically return to a general default mode if certain conditions are met. In other words, when no match is found or a period elapses in which no recognition attempts occur, the system returns to a known default state.

When a voice command submitted by the user is recognized by speech recognition circuit 50 as a match with one of the active recognition vocabulary set reference commands, the controller 60 executes the control code instruction associated with the matching reference command. The control code instruction may direct the controller 60 to (a) activate a new recognition vocabulary set; (b) utilize IC 55 output 68 pins to communicate instructions to the infrared signal controlling circuit 70; or (c) disconnect predetermined elements of the present invention circuitry from the power supply circuit for long term deactivation of the unit. A control code instruction directing the controller 60 to activate a new recognition vocabulary set may also direct the controller 60 to enter a new operating mode utilizing different pattern generating and/or speech recognition software.

The present invention may be provided with a user selectable default recognition vocabulary set, which is appropriate for an intended appliance category, to which the software causes the controller 60 to return following the recognition of certain voice commands or as the result of other predetermined conditions such as the elapse of time-out periods or the detection of a specified number of speech recognition errors. Recognition vocabulary sets contain reference command data representing the group of voice commands the invention is expecting to receive at any time, i.e. when a particular recognition vocabulary set is active.

The software running while a default recognition vocabulary set is available for speech recognition may typically be executing a routine where the speech recognition circuitry remains continuously available to generate patterns from detected voice commands unless otherwise processing a previous voice command for recognition or measuring the silence level to provide compensation for background noise. As indicated previously, when a voice command submitted by the user is recognized by speech recognition circuit 50 as a match with one of the default recognition vocabulary set reference commands, the controller 60 executes the control code instruction(s) associated with the matching reference command. The control code instruction(s) may direct the controller 60 to activate a new recognition vocabulary set or utilize IC 55 output 68 pins to communicate instructions to the infrared signal controlling circuit 70. Control code instructions directing the controller 60 to activate a new recognition vocabulary set may also direct the controller 60 to enter a new operating mode utilizing different pattern generating and/or speech recognition software.

Figure 2B:
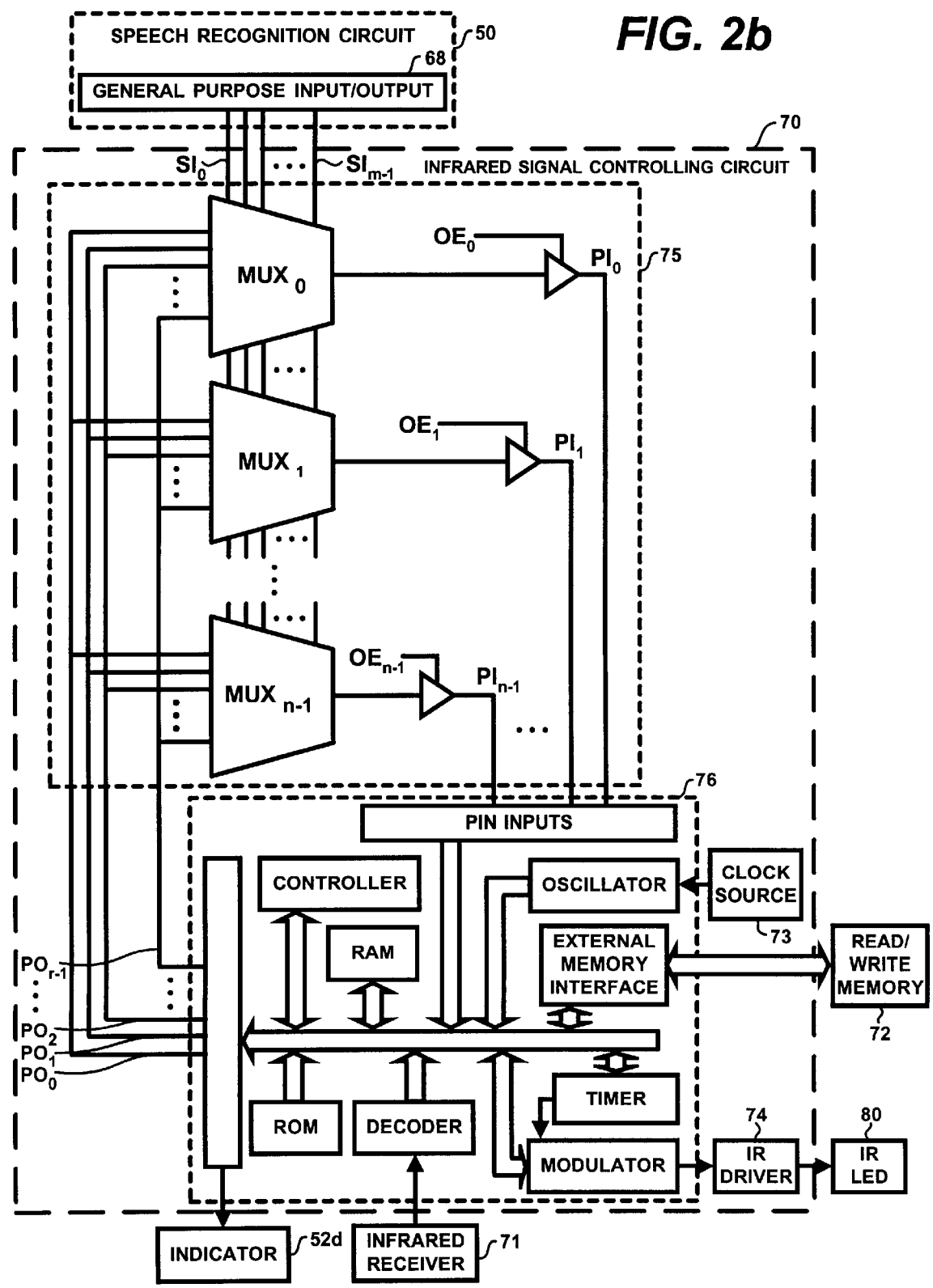
FIG. 2b is a functional block diagram showing the details of the infrared signal controlling circuit in one embodiment of the present invention.

FIG. 2b illustrates the infrared signal controlling circuit 70 in greater detail. More specifically, the infrared signal controlling circuit 70 includes a controller 76, an interface 75 to the speech recognition circuit one or more clock sources 73, and one or more infrared driver circuits 74. Preferably the electronic elements of the controller are in the form of an microcontroller integrated circuit, IC chip 76 as shown in FIG. 2b. Such microcontroller-based ICs specifically designed for infrared remote control transmitter applications which support infrared signal learning are well described in the prior art and are commercially available. An example of a commercially available controller for such purpose is a model number Z86L98, available from Zilog, Inc. and described in detailed in; *Preliminary Product Specification DS5000 701-IRX 1298, Z86 L81/86/98 28-Pin Low-Voltage Infrared Microcontroller*, pages 1–55, available from Zilog, Inc., Campbell Calif., hereby incorporated by reference. Other microcontrollers as well as digital signal processors are also suitable.

The controller IC 76 generally contains, a controller, a read-only memory (ROM), a random access memory (RAM), a clock, an external memory interface, a timer, a modulator, one or more input ports, one or more output ports, and an encoder. A plurality of stored infrared instruction codes and a plurality of program instructions are generally stored within a ROM memory. The RAM is used by controller IC 76 to store data for operations and control. The controller IC 76 oscillator derives its source from clock source 73 such as a crystal or a ceramic resonator. The controller IC 76 is electrically connected to an infrared receiver 71 that receives externally transmitted infrared function codes (from a teaching transmitter, not shown) and supplies them to controller IC 76 where they are conventionally decoded by the decoder, shown internally to controller IC 76 in FIG. 2a. The external memory interface is used by the controller IC 76 to store and access learned infrared signal codes in the external read/write memory 72. An infrared driver, which is generally transistor-based, is electrically connected to controller IC 76 and electrically connected to infrared light-emitting diode 80. An indicator light-emitting diode 52d is also connected to controller IC 76 which provides the user message prompts and other information, such as indicating operating stages and prompting desired user actions, for assisting in the programming of the present invention.

The general operation of this type of microcontrollers is well described in the prior art. Therefore, description of the operation of the infrared signal circuit controller herein is provided in general terms and is specific only in areas where the present invention departs from prior art disclosures or is beneficial to the explanation of aspects of the present invention. For conventional microcontrollers designed for remote control transmitter applications, the universal library of appliance codes are generally stored within the ROM memory of the controller IC 76 are stored within a ROM memory external to controller IC 76 and accessible through an external memory interface. Codes acquired through infrared code learning are typically stored in a read/write memory external to controller IC 76. The memory devices are typically organized into a plurality of pages with the various infrared function codes for a particular appliance model being generally assigned to a specific memory page.

As shown in FIG. 2b, an interface 75 provides electrical connections between the speech recognition circuit 50 and the controller IC 76. A plurality of output pins $PO_0, PO_1, \ldots PO_{r-1}$ at the controller IC 76 are electrically connected as data inputs to each of a series of multiplexers ($MUX_0, MUX_1, \ldots MUX_{n-1}$) within the interface 75, which in one embodiment may be a programmable logic device configured to operate a switching matrix, connecting controller IC 76 outputs to controller IC 76 inputs. A suitable programmable logic device is a MACH 4 CPLD logic device, available from Lattice Semiconductor Corporation and described in detail in Publication 17466, Rev j, May 1999, entitled; *MACH 4 CPLD FAMILY Y High Performance EE CMOS Programmable Logic*, by Lattice Semiconductor Corporation, hereby incorporated by reference. The output 68 pins of the speech recognition IC 55 are electrically connected as select inputs $SI_0, SI_1, \ldots SI_{m-1}$ to each of the multiplexers contained within the interface 75. The output of each multiplexer is electrically connected exclusively to one input pin $PI_0, PI_1, \ldots PI_{n-1}$ of controller IC 76.

In response to the speech recognition circuit 50 recognition of a voice command associated with an operation to send an instruction to the infrared signal controlling circuit 70, the output 68 pins send a binary instruction to the select pin inputs of the interface 75 multiplexers shown in FIG. 2a. Depending on the binary instruction sent, each multiplexer may select zero or one of the data inputs to be electrically connected to the multiplexer output. The interface 75 further controls the output enable of each multiplexer such that the output is enabled only if one of the data inputs has been selected for that multiplexer. This process produces an input at controller IC 76 input pins that is equivalent to that resulting from a button depress on a keypad of a conventional remote control transmitter which generates circuit connections. The controller IC 76 software interprets the instruction received at its input pin(s) and responds by (a) identifying a section of the ROM to be made available for subsequent access if the instruction is associated with an appliance category selection; (b) by identifying a memory location within its internal ROM and retrieving the control code stored therein if the instruction is associated with a command stored within the universal library of codes stored in ROM or (c) retrieving a learned infrared code stored in read/write memory 72 if the instruction is associated with a learned infrared signal. If the response to the received instruction is to transmit an infrared signal, the controller 76 utilizes its formatting program and its modulator to generate the precise carrier frequency, pulse width, pulse modulation, and overall timing format for a signal based upon the control code retrieved, and submits the signal to an infrared driver 74 which drives one or more infrared light emitting diodes 80. The infrared light emitting diode 80 converts the electrical signal received into an infrared signal which is transmitted to one or more target appliances.

Figure 2C:
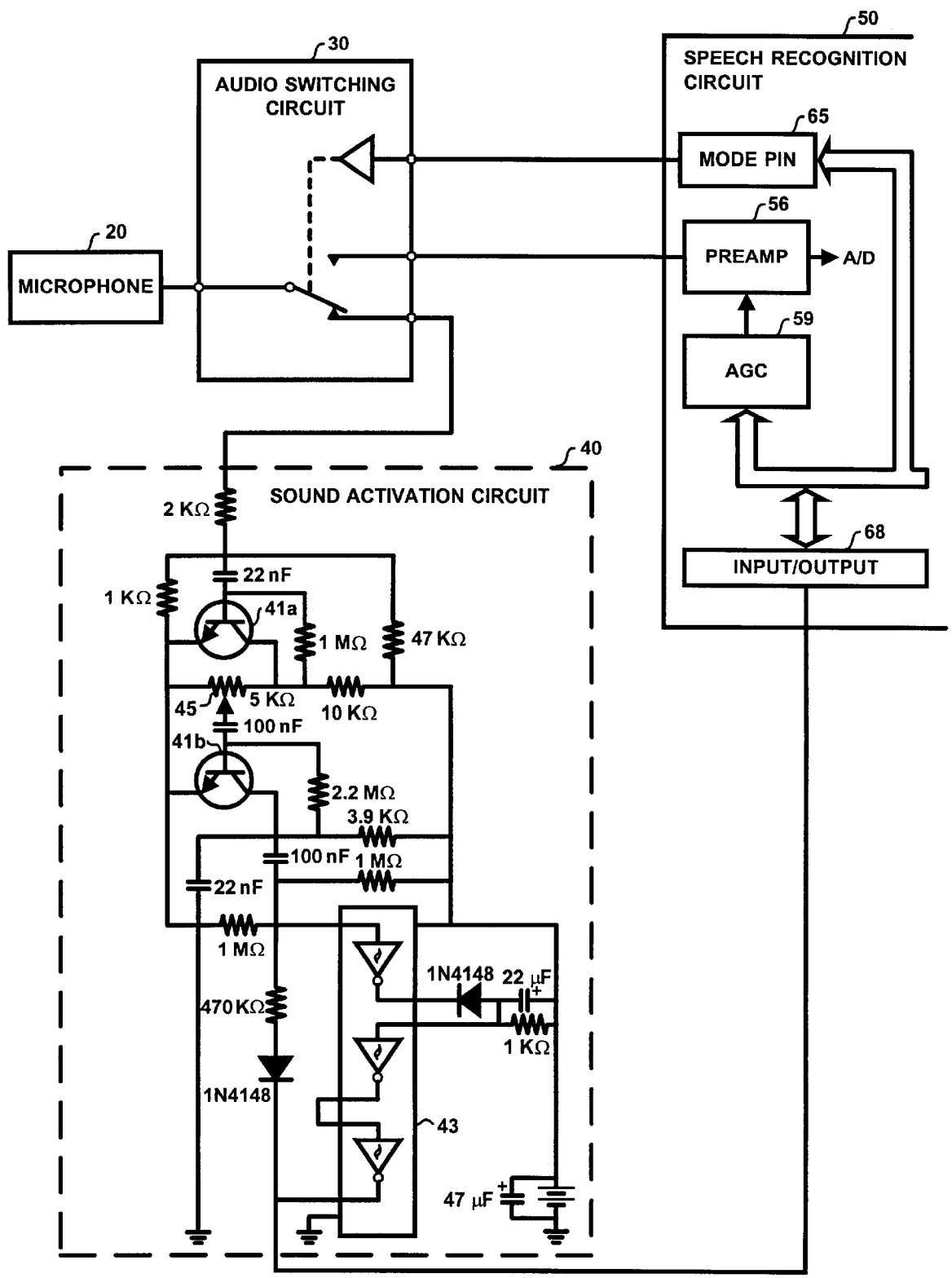
FIG. 2c is a schematic circuit diagram showing the details of the audio switching circuit and the sound activation circuit in one embodiment of the present invention.

FIG. 2c illustrates the audio switching circuit 30 and the sound activation circuit 40 in greater detail. FIG. 2c shows the present invention in the sound activation mode as indicated by the audio switching circuit 30 maintaining a switch closure and therefore electrical connection between the microphone 20 output and the sound activation circuit 40. The audio switching circuit 30 in the preferred embodiment of the present invention contains a commercially available digitally controlled, single-pole, double-throw (SPDT) analog switch, for example, a model number ADG 719 (CMOS Switch) available from Analog Devices and described in a data sheet entitled; *CMOS Low Voltage 4ΩSPDT Switch ADG* 719, Rev a, pages 1–8, available from Analog Devices, hereby incorporated by reference. The operation of the audio switching circuit 30 and the sound activation circuit 40 as shown in FIG. 2c is described in greater detail below.

Figure 18A:
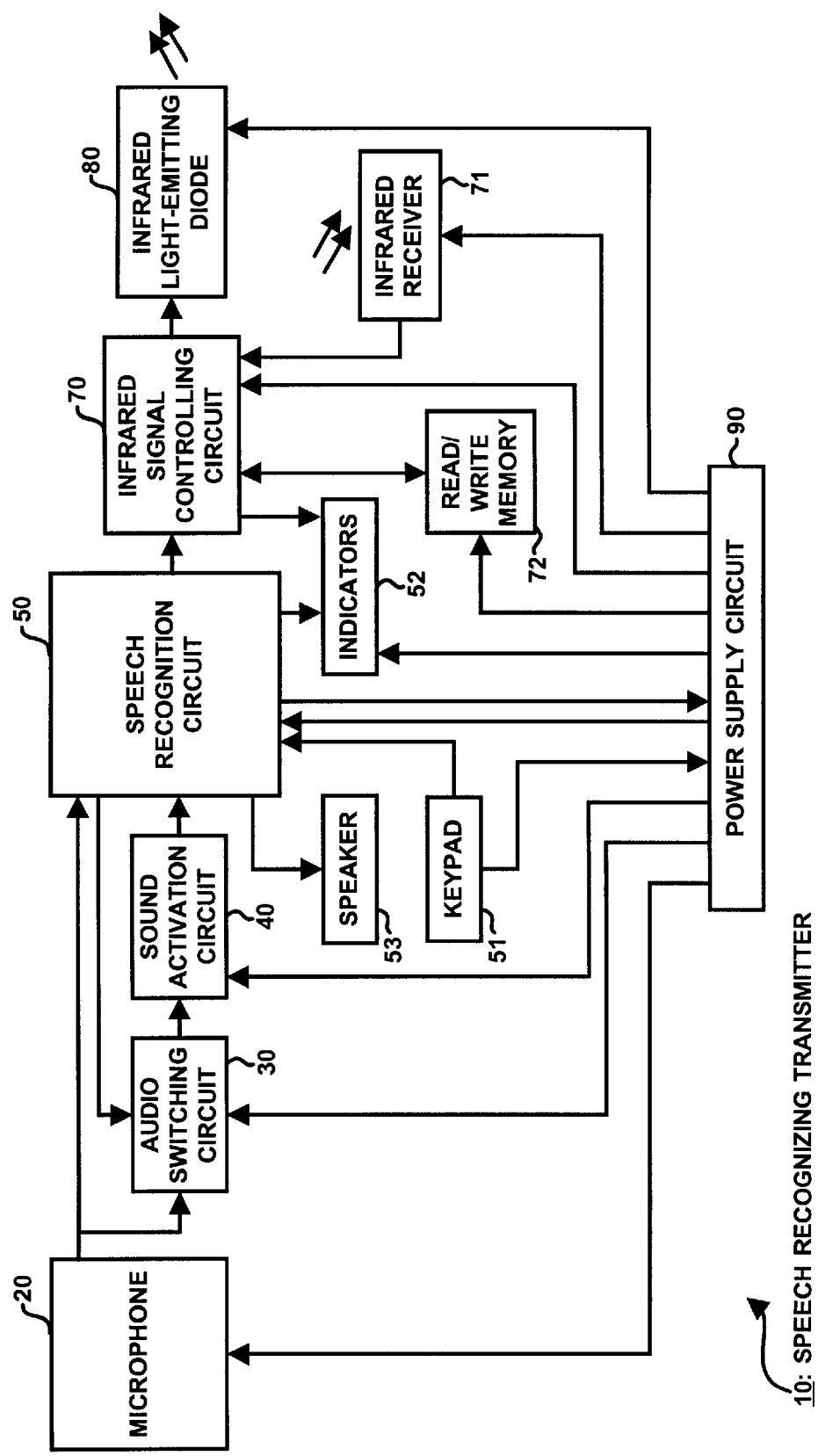
FIG. 18a is a functional block diagram of an alternative embodiment of an audio switching circuit in accordance with one embodiment of the present invention.

Alternate schemes may be employed to electrically connect microphone 20 output to the speech recognition circuit 50 and the sound activation circuit 40. One alternate embodiment is shown in FIG. 18a which employs a commercially available digitally controlled (digitally enabled input control), single-pole, single-throw (SPST) analog switch, instead of the SPDT switch employed within the embodiment described above, within the audio switching circuit 30. As shown in FIG. 18a, an electrical connection is always maintained between the microphone 20 output and the speech recognition circuit 50, but the switch is used to either electrically connect or disconnect the sound activation circuit 40 to the microphone 20 output depending on the state of the mode pin 65 of the speech recognition circuit 50. The speech recognition circuit 50 controls the mode pin 65 logic state as described in further detail below for the embodiment discussed above such that the sound activation circuit 40 is electrically connected to the microphone 20 output only when the invention is placed into sound activation mode.

Figure 18B:
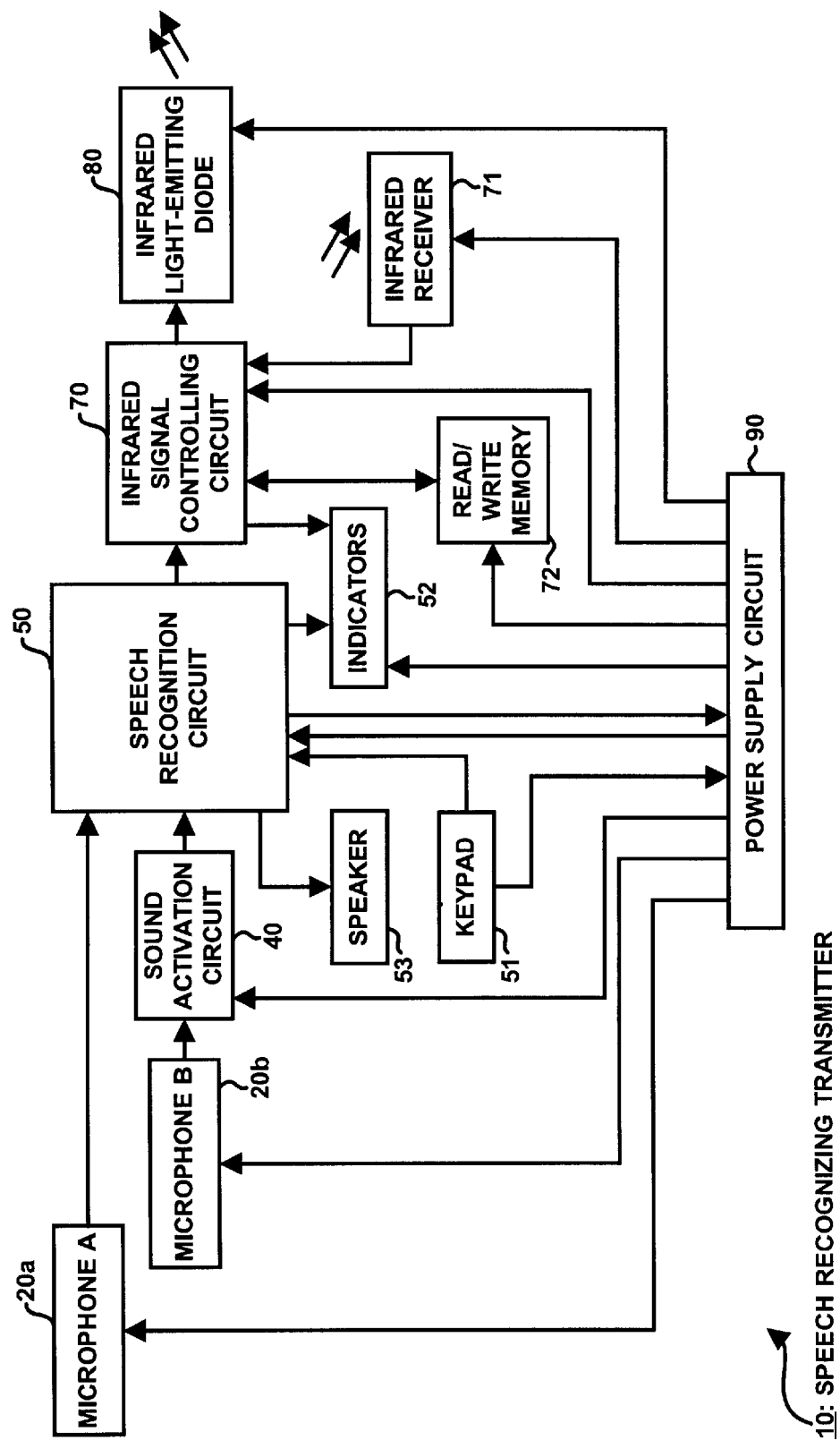
FIG. 18b is a functional block diagram of an alternate embodiment utilizing separate microphones for the sound activation circuit and speech recognition circuit in accordance with the present invention.

Another alternate embodiment is shown in FIG. 18b which employs two microphones 20a and 20b, the output of each is dedicated to the speech recognition circuit 50 or the sound activation circuit 40, respectively. Thus, the microphone outputs remain exclusively electrically connected to the speech recognition circuit 50 or the sound activation circuit 40. For this scheme, no switch is used, but an additional microphone is introduced, and the sound activation circuit 40 is allowed to harmlessly trigger during the speech recognition mode.

Figure 18C:
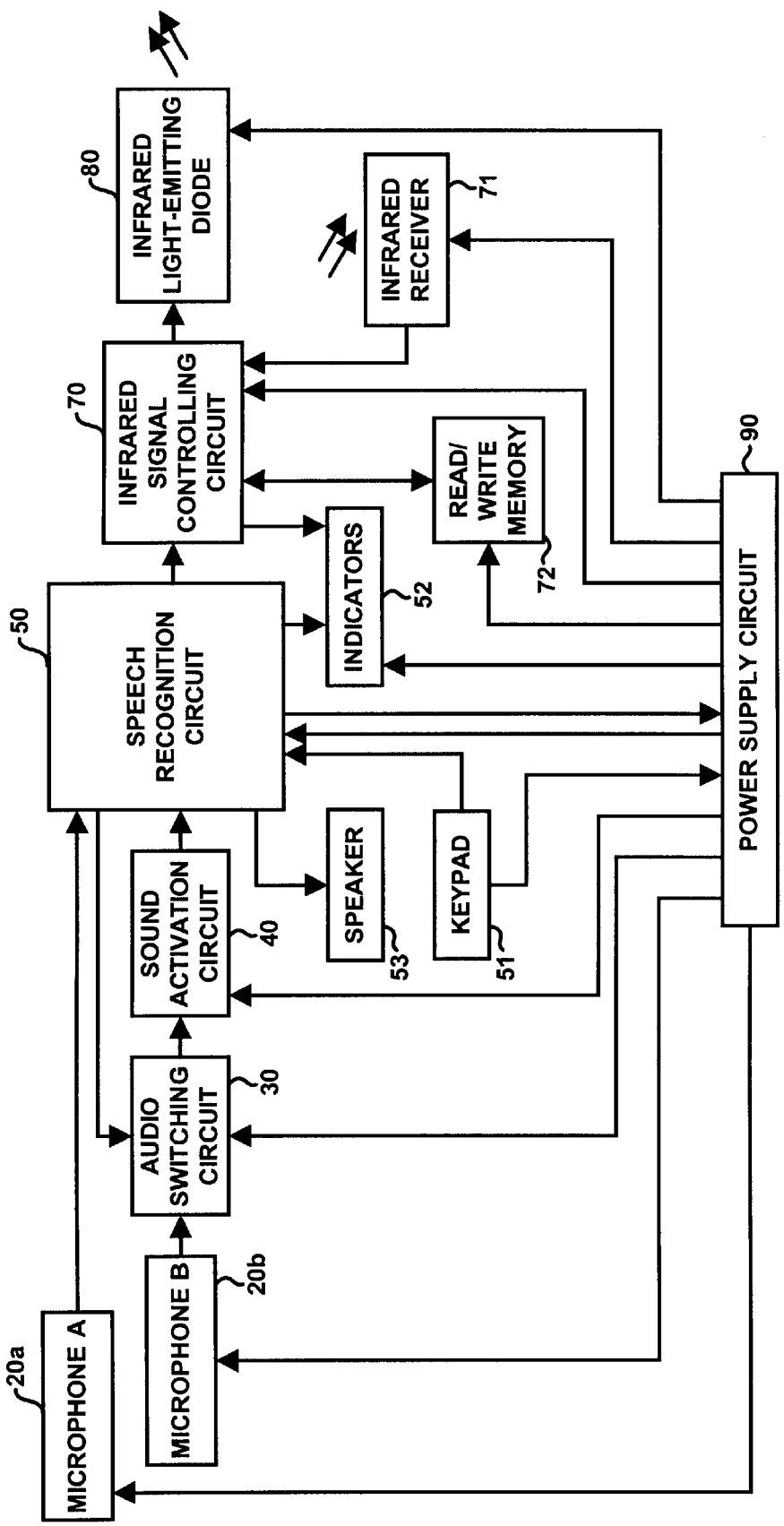
FIG. 18c is a functional block diagram of another alternate embodiment utilizing separate microphones for the sound activation circuit and speech recognition circuit in accordance with the present invention.

Another alternate embodiment is shown in FIG. 18c, which is a combination of the two alternate schemes presented above. This scheme employs two microphones 20a and 20b, the output of each is dedicated to the speech recognition circuit 50 or the sound activation circuit 40, respectively. As shown in FIG. 18c, an electrical connection is always maintained between the microphone 20a output and the speech recognition circuit 50, but an SPST switch as described above is used to either electrically connect or disconnect the sound activation circuit 40 to the microphone 20b output depending on the state of the mode pin 65 of the speech recognition circuit 50. The speech recognition circuit 50 controls the mode pin 65 logic state in the same manner as described later in further detail for the preferred embodiment such that the sound activation circuit 40 is electrically connected to the microphone 20 output only when the invention is placed into sound activation mode.

PHYSICAL UNIT

Figure 3:
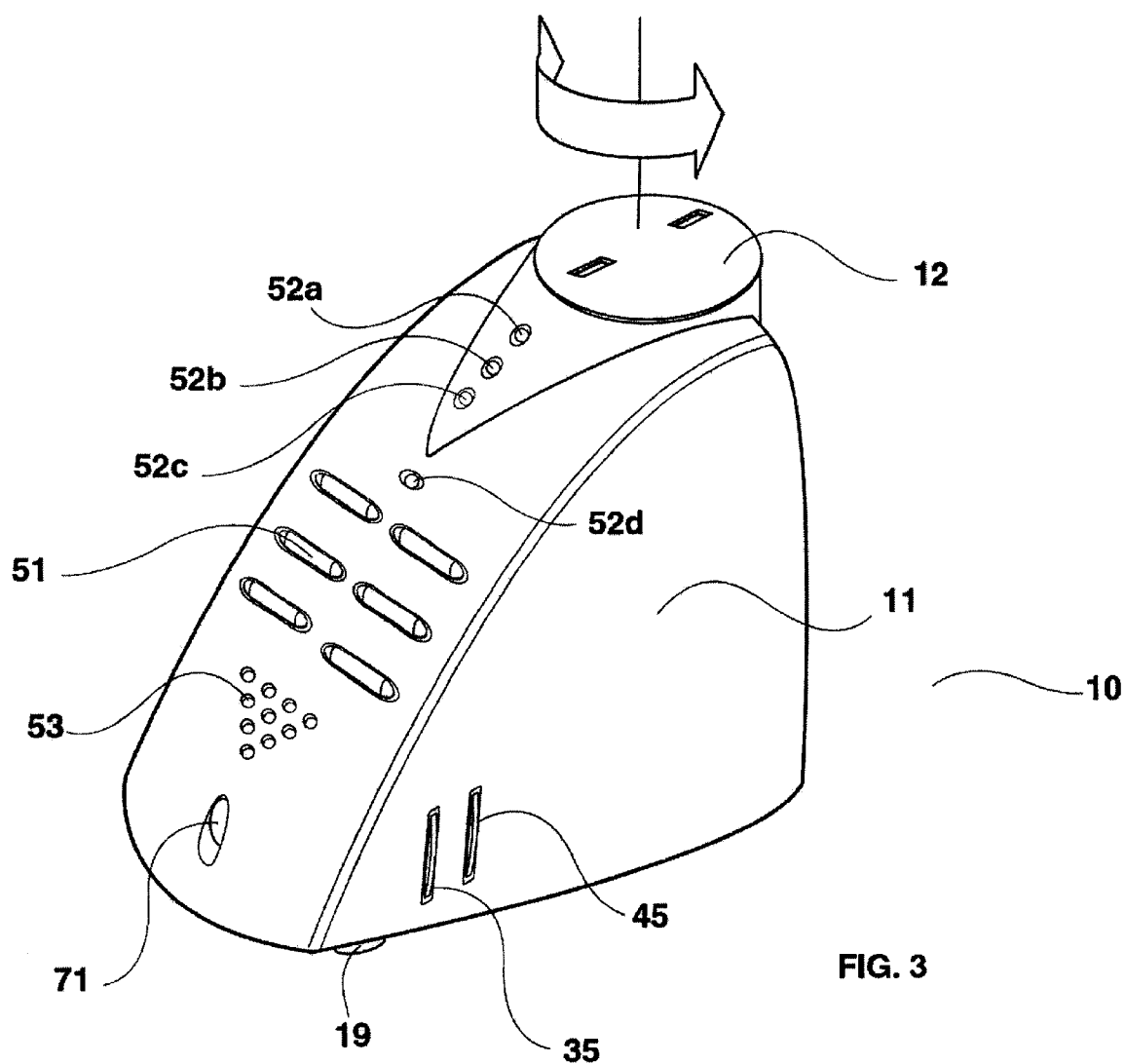
FIG. 3 is a perspective view of the physical housing for one embodiment of the present invention.

FIGS. 3 and 4a–4c illustrate an exemplary embodiment of a housing for the present invention. Referring first to FIG. 3, shown is speech recognizing transmitter 10 with a housing which includes a main housing portion 11, a microphone base 12 which holds a microphone 20 and that may be rotated independently from said main enclosure section 11, as described below and a removable battery access panel (not shown) on the bottom of the unit. Two ports 96, 98 in the form of openings are provided in the top of the microphone base 12, through which sound is received by the microphone.

An opening in the main enclosure section 11 is provided for sound generated from a speaker 53. The opening may be formed from many small openings in the indicated area which may take the form of slits or cross-hatched pattern openings through which sound generated by the speaker 53 may pass through the main enclosure section 11.

The indicators 52a, 52b, 52c and 52d are light-emitting diodes operating in visible light wavelengths that are used to communicate operating status to the user. Openings may also be provided in the main enclosure 11 for each of said indicators.

A keypad 51 may be provided to enable the user access to buttons used primarily to communicate with the system during product setup processes. Openings are provided in the main enclosure 11 for each button of said keypad.

A user-adjustable thumbwheel potentiometer 35 may also be provided to allow the microphone sensitivity adjustment for electric audio signals directed to a speech recognition circuit. A user-adjustable thumbwheel potentiometer 45 may be provided to allow adjustment of the amplification level of electric audio signals directed to a sound activation circuit. Openings may be provided in the main enclosure 11 for each of said thumbwheel potentiometers.

Four vibration-absorbing, adhesive-backed feet 19 made of rubber or similar compounds that are conducive to vibration absorption may be mounted to the bottom of main enclosure section 11.

An infrared receiver 71 or other wireless signal detecting device may be mounted within the rear portion of the main enclosure section 11 with an opening through which infrared light is received and detected.

Figure 4:
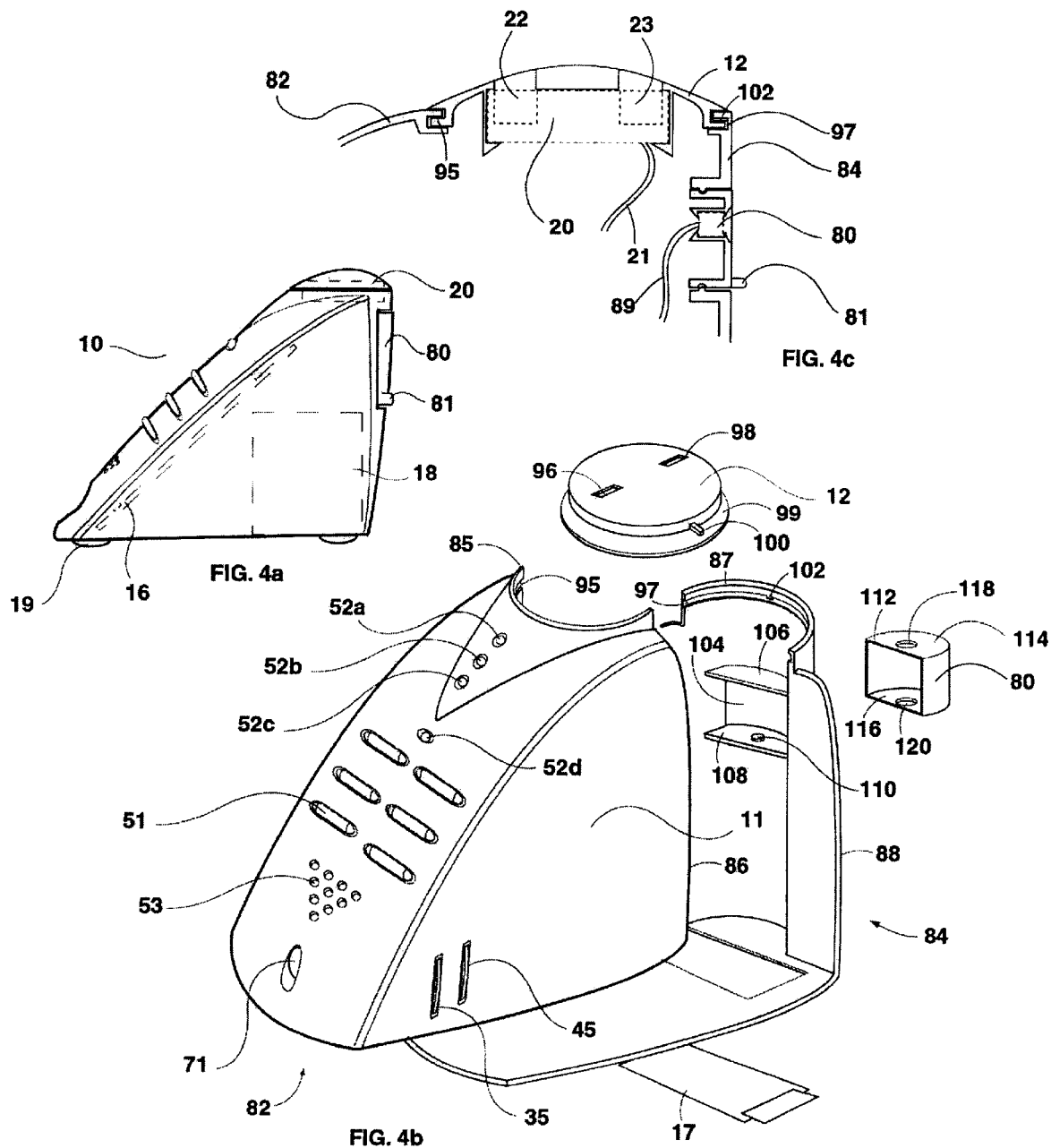
FIG. 4a is a side view of the housing illustrated in FIG. 3.
FIG. 4b is an exploded perspective view of the housing illustrated in FIG. 3.
FIG. 4c is a partial sectional view of the housing illustrated in FIG. 3.

FIG. 4a is a side elevational view of the physical structure of one embodiment of the present invention. In addition to those components shown in FIG. 3, FIG. 4a shows infrared light-emitting diode 80 and a battery holding compartment 18. Openings are provided in the main enclosure section 11 for each of the indicators and for mating of the removable battery access panel 17 (FIG. 4b) to the main enclosure section 11. Electronic components are either mounted upon or are electrically connected by wiring to a printed circuit board assembly 16 shown with hidden lines.

FIGS. 4b and 4c show the rotatable IR transmitter and rotatable microphone feature in more detail. In particular, referring first to the rotatable microphone feature, the housing 11 may be formed from a front housing portion 82 and rear housing portion 84. The front and rear housing portions 82 and 84 are formed within continuous edges 86 and 88, respectively, to enable the front 82 and rear housing portion 84 to be joined together with a suitable adhesive, such as an epoxy, or by way of ultrasonic welding or otherwise formed to be coupled together. Each of the front 82 and rear 84 housing portions includes a semi-circular opening 85, 87 formed at the top of the housing 11. Semicircular annular notches 95 and 97 are formed adjacent to each of the semicircular openings 85 and 87. As will be discussed in more detail below, these semicircular annular notches 95 and 97 are for receiving a microphone base 12 and enabling it to rotate. In particular, the microphone base 12, for example, as discussed above, includes a outer rim portion 99 formed as a disk. The outer rim portion 99 is adapted to be received in a semi-circular annular notches 95 and 97 in order to enable the microphone base 12 to be rotatably mounted with respect to the housing 11.

Electrical conductors 21 are used to connect the microphone 20 to the circuitry described above. In order to protect the electrical connection between the electrical conductors 21 and the microphone from being damaged as a result of rotation of the microphone base 12, sufficient slack is provided in the conductors 21.

As discussed above, the microphone 20 may be a directional microphone. As such, the microphone 20 is provided with a pair of sound ports 22 and 23. Rectangular openings 96 98 are provided in the microphone base 12 to allow sound to reach the microphone ports 22 and 23.

A radially extending rib 100 may be provided on the outer rim portion 99. An axially extending rib 102 may be formed in one of the semicircular annular notches 95, 97 to form a stop. In particular, the axial rib 102 is adapted to engage the radial rib 100 on the outer rim portion 99 of the microphone base 12 to limit rotation of the microphone base 12.

Another important feature of the invention relates to the fact that the infrared light emitting diode 80 may be rotatably mounted relative to the rear housing portion 84. In particular, an opening 104 may be provided in the rear housing portion 84. A pair of spaced apart plates 106 and 108 may be formed adjacent to the opening 104 and configured to extend into the rear housing portion 84 as generally shown in FIG. 4b. A pair of protuberances 110 may be formed on the upper and lower plate 106 and 108 to form a pivot axis.

The infrared light emitted diodes 80 may be carried by an irregularly shaped housing 112 having a top side 114 and a bottom side 116. The housing 112 is open on one end and contains apertures 118 and 120 in the top 114 and bottom 116 sides. The apertures 118 and 120 are configured to receive the protuberances 110 and the top 106 and bottom plates 108 disposed inward in the rear housing portion 84 to enable the housing portion 112 to rotate relative to the rear housing portion 84. An extending protuberance 81 enables a user to rotate the housing 112 to adjust the physical orientation of the light emitting diode 80.

The housing portion 112 is adapted to carry the infrared light emitting diodes 80. Electrical conductors 89 are used to provide an electrical connection between the infrared light emitting diode 80 and the balance of the circuitry. The conductors 89 are provided with sufficient slack to avoid effecting the electrical connections to the electrical conductors when the housing 112 is rotated.

Figure 14A:
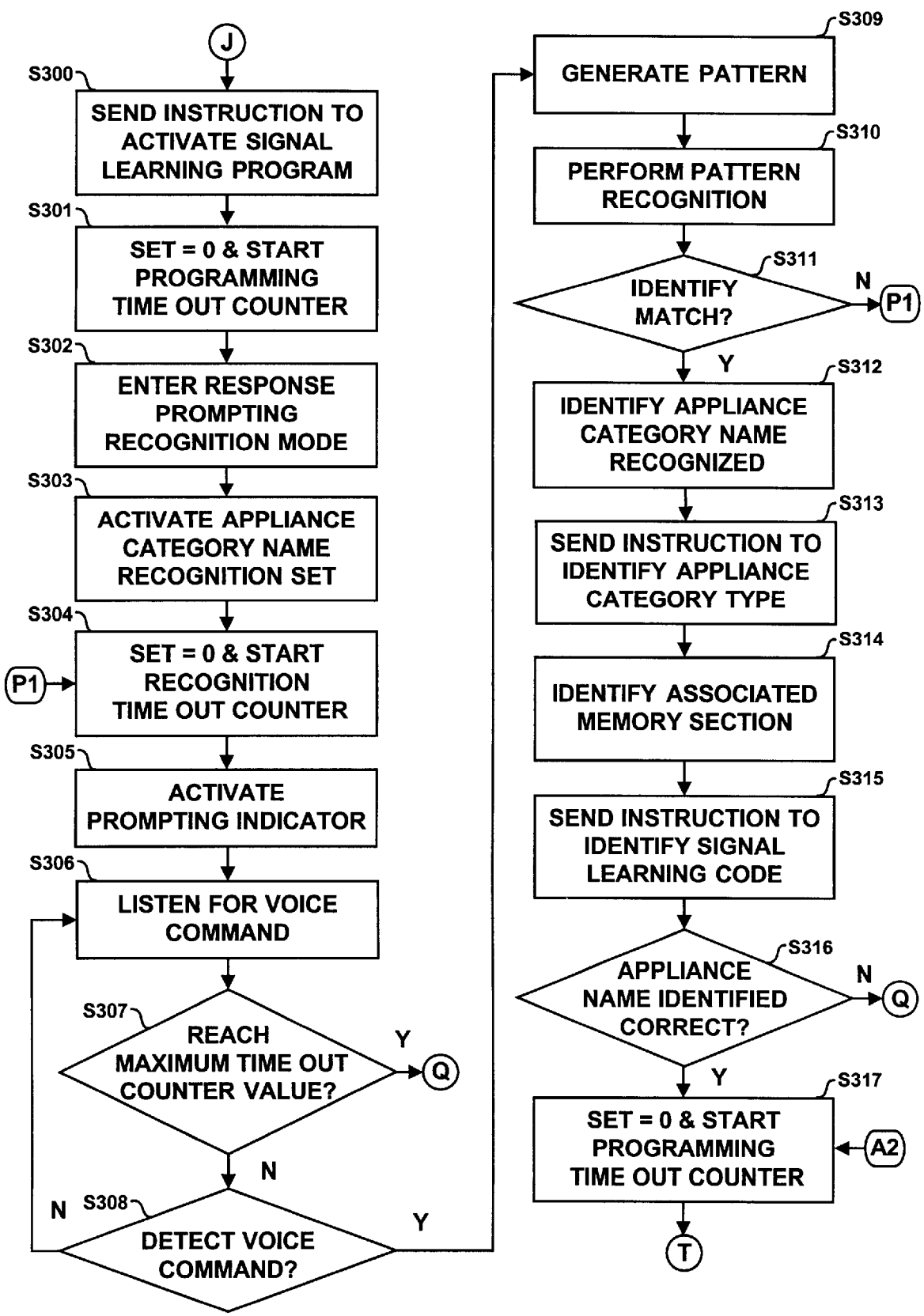
FIGS. 14A and 14B is a functional block diagram showing the sequence steps for learning an infrared signal from another remote control transmitter during a product setup process for one embodiment of the present invention.
Figure 14B:
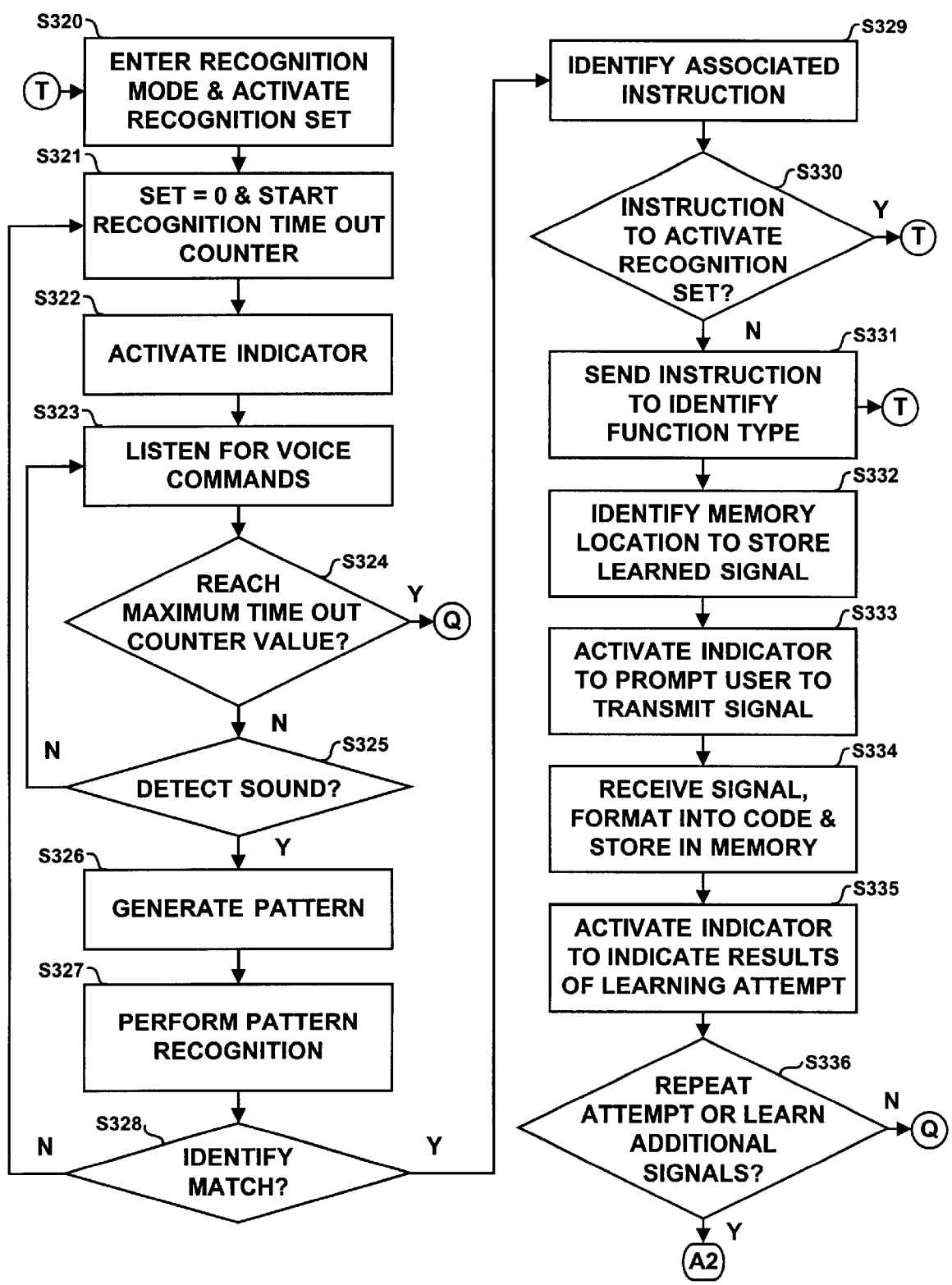

As mentioned above, the system may be AC or DC. In DC embodiments as shown in FIG. 14b, a battery access hatch 17 may be provided on the bottom of the housing 11.

SOFTWARE

Figure 5:
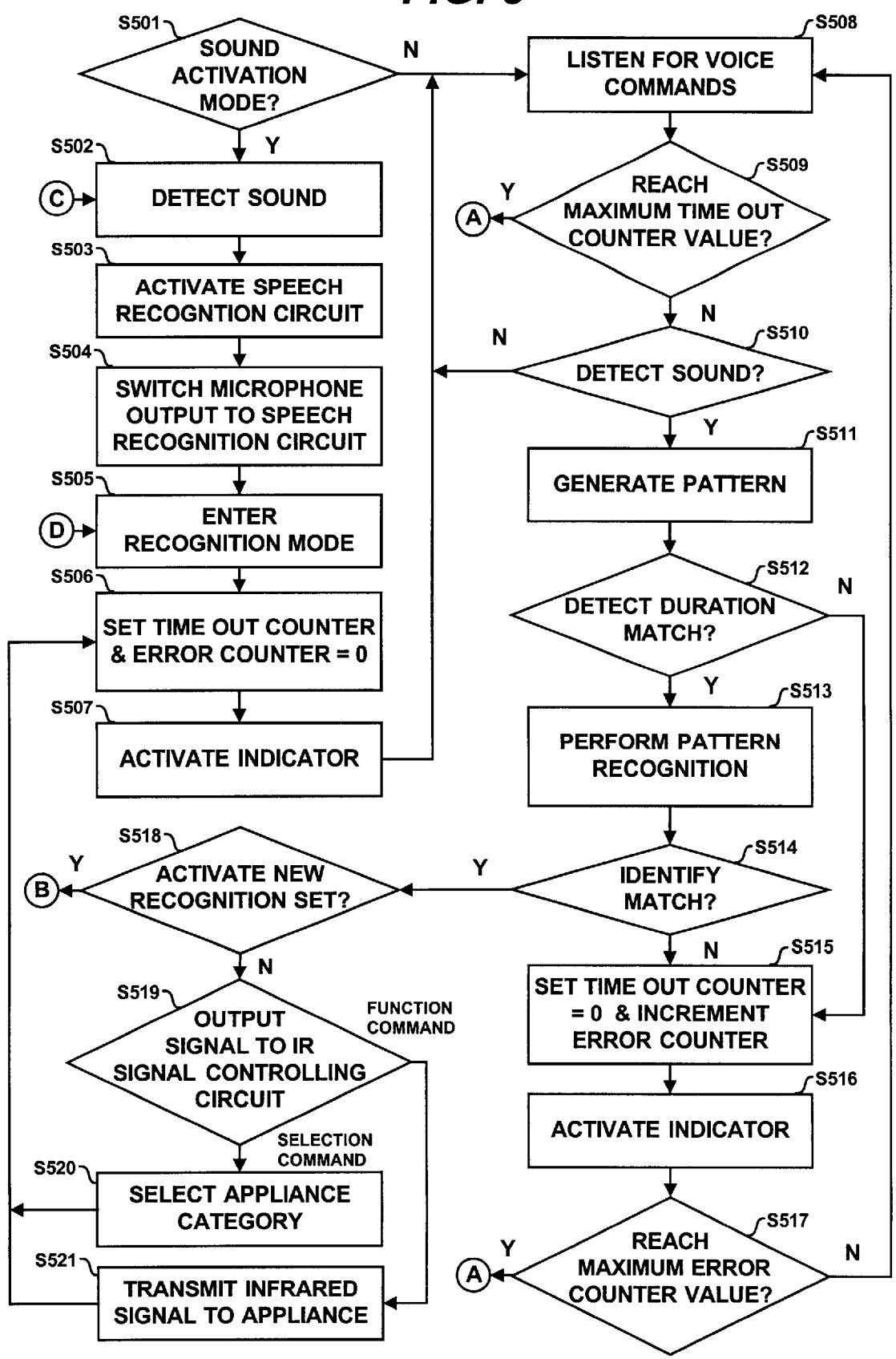
FIG. 5 is a functional block diagram showing the default operation modes of one embodiment of the present invention.

FIG. 5 is a flowchart form two default modes of the present invention. A sound activation mode is the default mode when the invention is operating in a low power consuming manner in a step S501. Otherwise, a continuous listening speech recognition mode is the default mode in a step S505 unless a user is performing product setup processes. In normal use, the speech recognition circuit 50 remains electrically connected to the power supply circuitry 90 and receives electric power while in both of these modes. It should be noted that means is also provided to electrically disconnect the electric power source from the section of the power supply circuit that distributes electric power to other electronic elements within the present invention if it is desirable to prevent unintentional activation or if the invention is not to be used for an extended period of time. The command to disconnect power from said electronic elements is not included within a default recognition vocabulary set to prevent unintentional deactivation of the invention and to prevent confusion with using the invention to power on and off controlled appliances. The command is placed in a recognition vocabulary set that must be accessed by a command in another recognition vocabulary set to ensure recognition of said command is intentional.

When the power supply electric source is electrically connected to the power supply circuit 90 section that distributes electric power to other electronic elements, the operation of the invention depends on whether or not the invention is in sound activation mode as shown in a step S501. The user can visually determine this state because no indicators 52*a*, 52*b*. 52*c* or 52*d* are illuminated during the sound activation mode. If the system is not in the sound activation mode, then it is either in the default speech recognition mode listening for voice commands as shown in a step S505 or temporarily executing a speech recognition routine involving another recognition vocabulary set. Again, it should be noted that an exception applies if the user is performing a product setup process, during which time the invention may also enter modes where it is waiting for the user to depress a button.

If it is temporarily executing a speech recognition routine involving another recognition vocabulary set, the invention will automatically return to the default speech recognition mode after the user has completed submitting voice commands within the recognition vocabulary set active at that time. The conditions under which other speech recognition routines cease and the default speech recognition mode becomes active are described later.

While in the sound activation mode as shown in a step S502, the microphone 20, the audio switching circuit 30, the sound activation circuit 40 and the speech recognition circuit IC 55, as a minimum, receive electric energy from the power supply circuit 90. The microphone 20, the audio switching circuit 30, the sound activation circuit 40 and the speech recognition circuit IC 55, as a minimum, have low power consuming characteristics while in the sound activation mode. When the microphone 20 receives an acoustic signal from an area surrounding the present invention, the microphone 20 converts the acoustic signal into an electric signal. Depending on the state of the audio switching circuit 30, the electric signal output from the microphone 20 is electrically connected to either the sound activation circuit 40 if the system is in sound activation mode or the speech recognition circuit 50 if the system is in speech recognition mode. The audio switching circuit 30 is set to one of these two possible states. As shown in FIG. 2*c*, an input control for the audio switching circuit 30 is electrically connected to a speech recognition circuit 50 mode output 65 pin which changes logic states as the speech recognition circuit changes modes between sound activation mode and speech recognition mode. The input control for the audio switching circuit 30 automatically detects the logic state of said mode output pin and changes the electrical connections for the electric signal output from the microphone 20 accordingly.

Assuming that the system is in sound activation mode, the output signal from the microphone 20 is electrically connected by the audio switching circuit 30 to the sound activation circuit 40 as shown in FIG. 2*c*. The sound activation circuit 40 contains one or more audio amplification stages that amplify the electric signal output from the microphone 20. FIG. 2*c* shows an audio signal amplification stage based upon an NPN transistor 41*a*, followed by another audio signal amplification stage based upon an NPN transistor 41*b*. The sound activation circuit 40 also contains a trigger circuit. The trigger circuit shown in FIG. 2*c* utilizes a series of three inverting Schmitt trigger circuits, shown collectively as IC 43 because IC are commercially available which integrate several such circuits into a single device package. The amplified output signal from the last audio amplification stage is electrically connected to an input of a first trigger circuit. If the resulting amplified electric audio signal representing the sound received by the microphone 20 reaches a predetermined amplitude threshold equal in magnitude to a logic state change (bit transition) at the input of the trigger circuit, the trigger circuit activates, indicating the sound has been detected as shown in a step S502. The first inverting trigger circuit then outputs a logical low, leading to a logical high output at the second inverting trigger followed by a logical low output at the third inverting trigger in IC 43. It is the output of the third inverting trigger that is electrically connected to the input pin 68 of the speech recognition circuit 50. The general operation of such signal amplification and triggering circuits are well know to those skilled in the electronics arts.

The sound activation circuit 40 also contains a potentiometer which allows resistance modification within the amplification circuit. This potentiometer is accessible to the user in the form of a thumbwheel knob 45 which the user can adjust to change a resistance value within the amplification circuit which modifies the sensitivity of the sound activation circuit.

As indicated above, the logic state change of the output pin on the trigger circuit causes a bit transition at the input 68 pin of the speech recognition circuit controller 60. This bit transition is detected by the controller 60 which responds by removing the speech recognition circuit from the low power consuming sound activation mode and enabling the controller clock 63. This activates the speech recognition circuit 50 for speech recognition processing as shown in a step S503. The software also instructs the controller 60 to change the logic state of the mode output 65 pin.

The speech recognition circuit 50 then maintains the mode output 65 pin in the logic state consistent with the speech recognition mode. As indicated previously and shown in FIG. 2*c*, an input control pin of the audio switching circuit 30 is electrically connected to said mode output 65 pin, causing the state of the audio switching circuit 30 to be controlled by said mode output pin. The logic state change at mode output 65 pin results in a logic state change at the input control pin of the audio switching circuit 30, causing said circuit to electrically connect the microphone 20 output signal to the speech recognition circuit 50, disconnecting it from the sound activation circuit 40, as shown in a step S504. This connection is maintained until the speech recognition circuit 50 determines that predetermined conditions have been met to return to the sound activation mode.

After the controller clock 63 is initialized and stabilized, and the audio switching circuit 30 has connected the microphone 20 signal output to the speech recognition circuit 50, the controller 60 utilizes the ROM 61 to activate the speech recognition mode software as shown in a step S505. A sound activation mode time-out counter and a recognition error counter are set to zero as shown in a step S506. The sound activation time-out counter tracks elapsed time between attempts made by the speech recognition circuit 50 to recognize sounds and if a predetermined time value TMAX elapses between recognition attempts, the speech recognition circuit software initiates a routine to enter sound activation mode and changes the logic states of the previously described control registerbits. The recognition error counter tracks the number attempts made by the speech recognition circuit 50 to recognize sounds for which no match is identified. The use of the recognition error counter is further described later. Each time a match is identified during speech recognition processing, the sound activation time-out counter value and the recognition error counter value are reset to zero value.

A green light-emitting diode 52a is activated and remains illuminated in a step S507 while the speech recognition mode is available to execute a pattern generation algorithm to provide a visual indicator to the operator that the invention is ready to receive a voice command. It should be noted that this indicator will briefly deactivate during a silence level detection period, pattern generation or during speech recognition processing to inform the user that the speech recognition circuit 50 is temporarily unavailable to receive a voice command, but the green light-emitting diode 52a re-illuminates after the silence level detection period is completed or recognition processing routine returns a result.

When the speech recognition circuit 50 is activated from a sound activation mode, the default speech recognition mode software executes a continuous listening routine. The green light-emitting diode 52a illuminates while the speech recognition circuit is waiting to detect sounds for which to create patterns and submit for recognition processing as shown in step S508. During this mode, the speech recognition circuitry executes a software routine that cycles among states where it monitors environmental sound level until a suitable silence level is detected, generates a pattern for a detected sound, compares the duration of the acquired pattern representing the detected sound to a defined duration for the active recognition vocabulary set commands, and when the duration of the detected sound pattern is consistent with said active recognition vocabulary set duration, executes a recognition algorithm to determine if a match can be identified for the acquired unknown pattern and one of the commands in the active recognition vocabulary set. Acquired patterns that are not consistent in duration with recognition vocabulary set commands (too long or too short) are ignored, and the speech recognition circuit software returns to execute the silence level detection routine. The silence level detection routine listens (remains in a detection mode) until the noise level drops below a predetermined threshold, meaning a certain silence level is achieved. During this silence level detection routine, result codes are returned and compared to a noise threshold value until a result code is returned indicating the noise level has dropped below the predetermined threshold. Pattern generation can then be performed if a sound is detected. This cycle is shown as steps S508 through S517. Such continuous listening software routines are well known to those skilled in the art.

Figure 6:
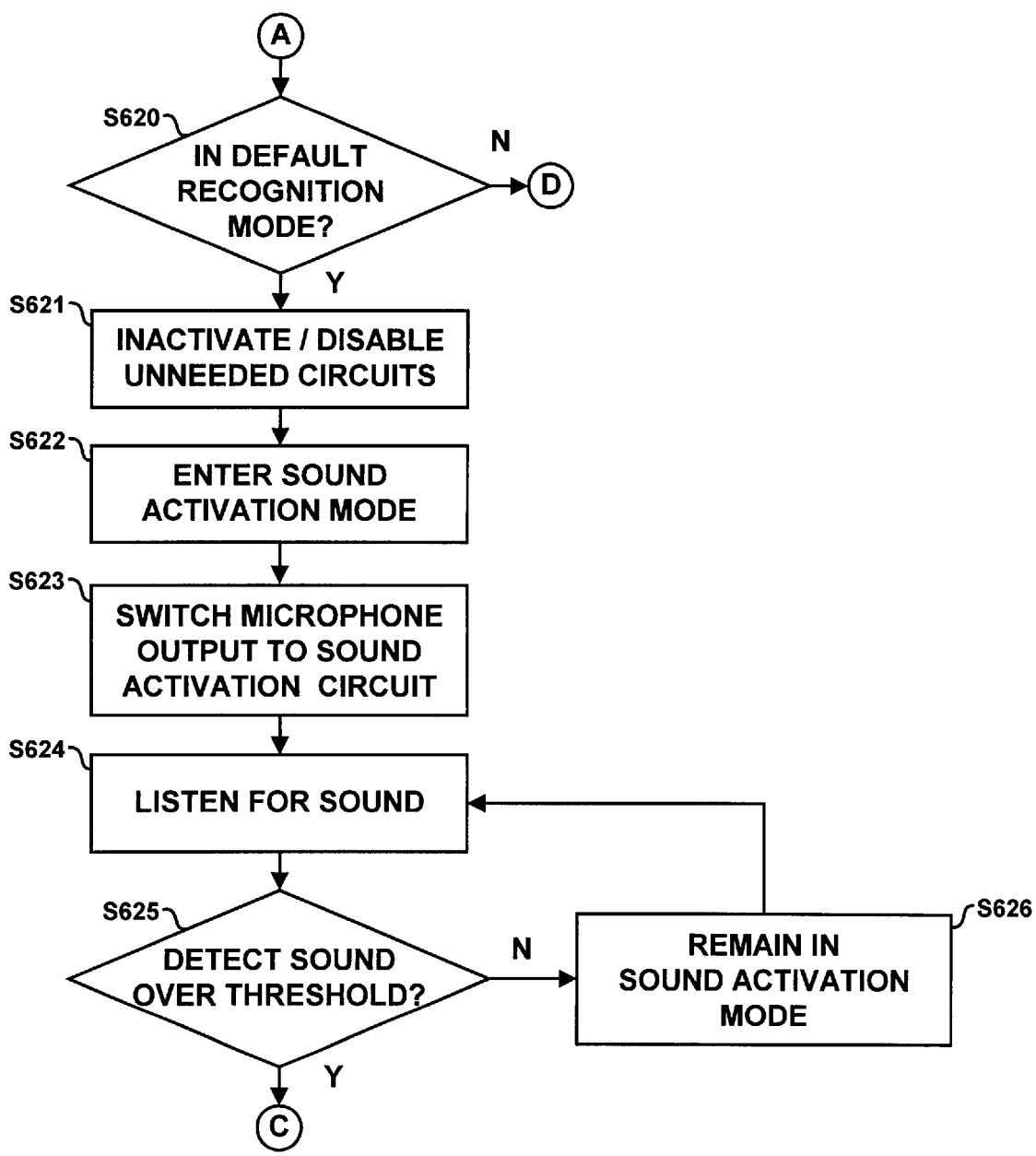
FIG. 6 is a functional block diagram showing the sound activation mode sequence steps for one embodiment of the present invention.

The default mode speech recognition circuit software cycles between a silence level detection routine and a listening (ready for pattern generation) routine shown in steps S508, S509 and S510 while waiting for the detection of a sound. The sound activation time-out counter value is periodically compared to the predetermined value TMAX in a step S509. If the time-out period elapses before a sound is detected, the speech recognition circuit 50 executes software code to enter the sound activation mode and disable the clock 63 from the clock source 64 as shown in FIG. 6. If the time-out period has not elapsed, the speech recognition circuit 50 continues to cycle between a sound level detection routine and a listening (ready for pattern generation) routine, returning to steps S508, S509 and S510.

If sound is detected in a step S510, the green light-emitting diode 52a ceases to illuminate and a pattern is generated to represent the acoustically significant elements of the sound in a step S511. The duration of the acquired unknown pattern for the detected sound is compared to determine if its duration is consistent with the duration of the recognition vocabulary set commands in a step S512. The duration check obviates the need to complete the speech recognition process if the pattern generated for the unknown sound, word, or phrase is either shorter or longer in duration than the commands in the active recognition vocabulary set, thus serving as a quick filter to allow the speech recognition circuit 50 to remain available for pattern generation for a increased proportion of the time. If an acquired pattern for a sound is found to be inconsistent in duration with the commands in the active recognition vocabulary set, the value of the recognition error counter is incremented by one and the value of TMAX is reset to zero in a step S515 and a red light-emitting diode 52c illuminates briefly to provide a visual indicator to the operator in a step S516. The recognition error counter value is then compared to a value EMAX, which is a predetermined value for the maximum number of recognition errors allowed, to determine if the two values are equal in a step S517. If the recognition error counter value is equal to value EMAX, the speech recognition circuit 50 executes software to enter the sound activation mode and disable the controller clock 63 from the clock source and shown in FIG. 6. If the recognition error counter value is not equal to value EMAX, the green light-emitting diode 52a is activated and remains illuminated and the speech recognition circuit 50 executes software which cycles between the silence level detection routine and the listening (ready for pattern generation) routine in steps S508, S509 and S510.

If a pattern generated in a step S511 is found to be consistent in duration with the recognition vocabulary set command duration in a step S512, then the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold in a step S513. The result of this comparison is identified in a step S514.

If a match for the acquired pattern is not identified in a step S514, the value of the recognition error counter is incremented by one and the value of TMAX is reset to zero in a step S515 and the red light-emitting diode 52c illuminates briefly to provide a visual indicator to the operator that no match was identified in a step S516. The recognition error counter value is then compared to value EMAX in a step S517. If the recognition error counter value is equal to value EMAX, the speech recognition circuit 50 executes software stored in its ROM 61 to enter the sound activation mode and disable the clock 63 from the clock source 64 and as shown in FIG. 6. If the recognition error counter value is not equal to value EMAX, the green light-emitting diode 52a is activated and remains illuminated and the speech recognition circuit 50 executes software which cycles between the silence level detection routine and the listening (ready for pattern generation) routine in steps S508, S509 and S510.

If a match for the acquired pattern is identified in a step S514, the speech recognition circuit 50 software identifies the operation associated with the matching recognition vocabulary set command in a step S518 and determines if the operation is to send an instruction to the speech recognition circuit controller 60 to activate a new recognition set vocabulary or to output a signal to the infrared controlling circuit 70 using the speech recognition circuit input/output 68 pins. The signal to the infrared controlling circuit communicates either a appliance category selection command in a step S520 or a command to transmit one or more infrared signals for specified functions to the currently controlled appliance in a step S521.

Figure 7:
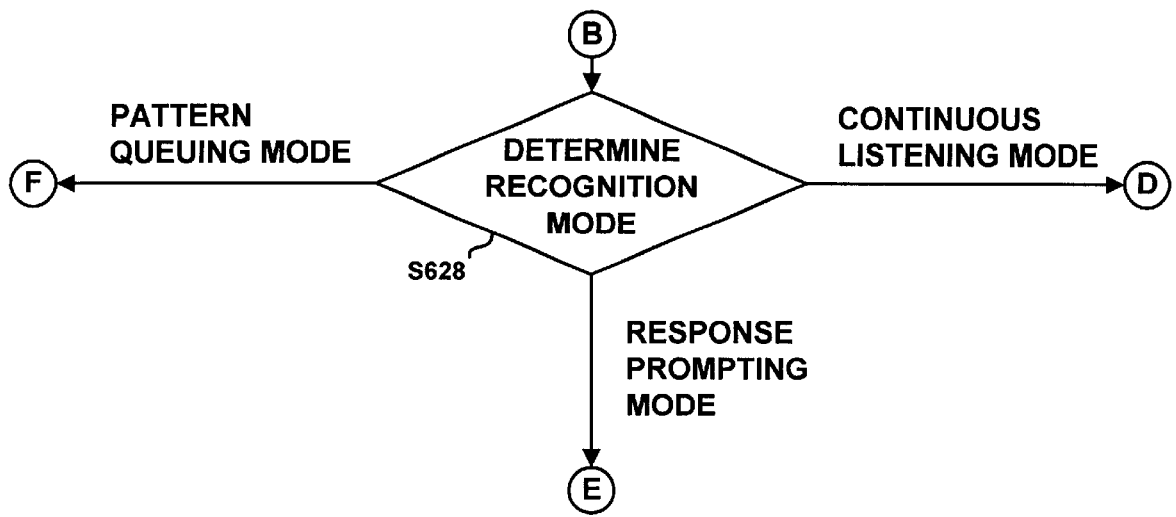
FIG. 7 is a functional block diagram showing the different recognition modes that may be utilized when different recognition vocabulary sets are activated in one embodiment of the present invention.

Following the submission of a signal to the infrared signal controlling circuit 70, the speech recognition circuit controller 60 executes software stored in its ROM 61 to reset the values TMAX and EMAX to zero in a step S506, activates the green light-emitting diode 52a in a step S107 and returns to a continuous listening routine which cycles between the silence level detection routine and the listening (ready for pattern generation) routine in steps S508, S509 and S510. FIG. 7 shows the steps followed when the speech recognition circuit controller 60 receives a signal instructing it to activate a new recognition set.

The present invention uses conventional silence level detection, continuous listening, pattern generation, and speech recognition algorithms to perform the aforementioned software routines. These algorithms are well documented in the prior art and are familiar to those skilled in the electronics arts. For example, exemplary speech recognition algorithms are available from Sensory, Inc., Sunnyvale, Calif., under their brand name Sensory Speech 5.0 Technology. Other speech recognition algorithms which contain some of the features in the present invention include Voice Direct™ TSSP and Voice Activation™ software, all available from Sensory, Inc. Other speech recognition algorithms are also suitable.

As indicated in steps S509 and S517 in FIG. 5, the speech recognition circuit software periodically monitors the status of two counter values that are independently controlled by the software. If either of these two values, the sound activation time-out counter value or the recognition error counter value, has reached its maximum allowed value TMAX or EMAX, respectively, the speech recognition circuit 50 changes the mode of the system from speech recognition mode to sound activation mode. Otherwise, as indicated in steps S506 and S515 shown in FIG. 5, these counters are also reset to zero.

FIG. 6 shows in a step S620 the sound activation mode is entered only from a default recognition mode. If the active recognition vocabulary set is not a default recognition vocabulary set operating in a default recognition mode, then upon attainment of a maximum allowed counter value for a time-out counter or a recognition error counter, the software will return to a default recognition mode before the sound activation mode is entered as shown by a step S620 in FIG. 6 referring to a step S505 in FIG. 5.

Reference is made to FIG. 6. A step S621 shows that when operating in a default recognition mode, and upon the attainment of the value TMAX for the sound activation time-out counter value or the value EMAX for the recognition error counter value, the speech recognition circuit 50 inactivates or disables the electronic elements that are not needed during sound activation mode such as indicators 52a, 52b, 52c and 52d to reduce power consumption during the sound activation mode. In a step S622, the system enters a sound activation mode as described previously by changing the states of control register bits that disable the clock oscillator 63 from its clock source 64 and place the speech recognition circuit in a low power consuming mode and setting the mode output 65 pin to the logic state defined for sound activation mode.

As shown in a step S623 an input control for the audio switching circuit 30 is electrically connected to said mode output 65 pin which changes logic states as the speech recognition circuit changes modes between speech recognition mode and sound activation mode. The input control for the audio switching circuit 30 detects the logic state of said mode output pin and electrically connects the electric signal output from the microphone 20 to the sound activation circuit 40.

As shown in steps S624, S625 and S626, the speech recognition circuit remains in this sound activation mode, listening for sound. While in the sound activation mode, the microphone 20, the audio switching circuit 30, the sound activation circuit 40 and the speech recognition circuit IC 55, as a minimum, receive electric energy from the power supply circuit 90. The microphone 20, the audio switching circuit 30, the sound activation circuit 40 and the speech recognition circuit IC 55, as a minimum, have low power consuming characteristics at least while in the sound activation mode. When the microphone 20 receives an acoustic signal from an area surrounding the present invention, the microphone 20 converts the acoustic signal into an electric signal. The state of the audio switching circuit 30 is set to electrically connect the electric signal output from the microphone 20 to the sound activation circuit 40. The sound activation circuit 40 contains one or more audio amplification stages, shown in FIG. 2c, that amplify the electric signal output from the microphone 20. The sound activation circuit 40 also contains a trigger circuit 43 shown in FIG. 2c. The amplified output signal from the last audio amplification stage is electrically connected to an input of the trigger circuit. If the resulting amplified electric audio signal representing the sound received by the microphone 20 reaches a predetermined amplitude threshold equal in magnitude to a logic state change (bit transition) at the input of the trigger circuit, the sound activation circuit activates, indicating the sound has been detected at a step S625 in FIG. 6 and referring to a step S502 in FIG. 5. The sound activation circuit is shown in detail in FIG. 2c.

As indicated in a step S518 shown in FIG. 5, when a match is identified during the pattern recognition process and the operation associated with the recognized command is an instruction to activate a different recognition vocabulary set, the software will execute the instruction to enter the appropriate recognition mode for the indicated recognition vocabulary set in a step S628 shown in FIG. 7. Recognition modes are commercially available that are capable of executing software that involves different recognition routines such as continuous listening, pattern queuing and response prompting recognition as described below.

The continuous listening recognition mode was described previously in the explanation of FIG. 5 steps. A continuous listening routine may also be executed for a non-default recognition vocabulary set. For brevity, an additional description of this mode is not provided. Instead, the system returns to step S505 in FIG. 5, after which the same basic process follows. The primary exception being that when the maximum allowed time-out or recognition error counter value is attained, the speech recognition circuit 50 will not enter sound activation mode, but will instead enter the default continuous listening recognition mode as indicated in a step S620 in FIG. 6.

Figure 8:
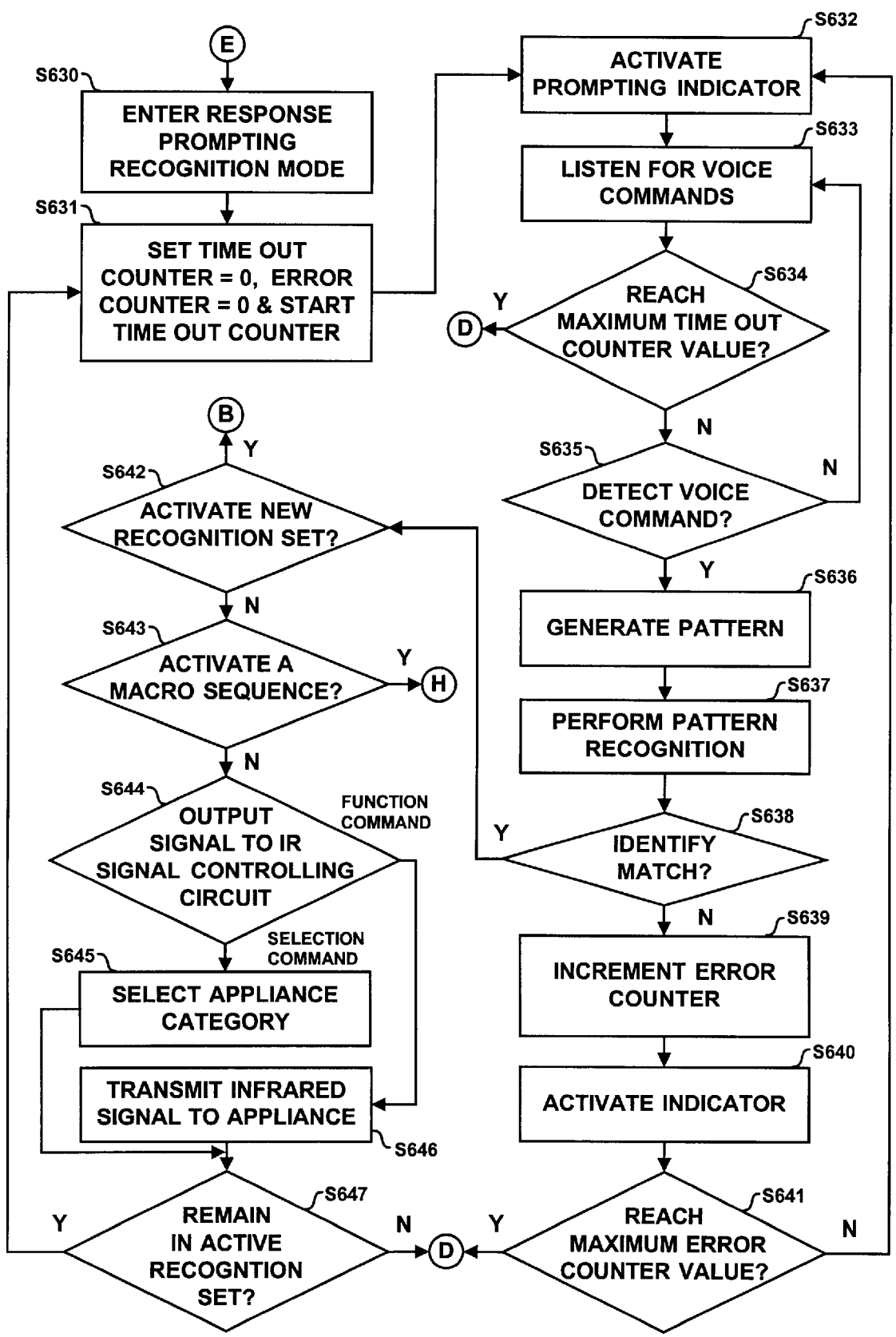
FIG. 8 is a functional block diagram showing the sequence of steps for the response prompting recognition mode for one embodiment of the present invention.

A response prompting recognition mode is shown in FIG. 8. When the speech recognition circuit software activates a recognition vocabulary set and executes a response prompting routine as shown in a step S630, the user is expected to select a voice command from the active recognition vocabulary set and respond when prompted by an illuminated green light emitting diode 52b. A green light emitting diode 52a remains illuminated in this mode when the speech recognition circuit 50 is available to generate patterns to indicate to the user that the active recognition mode is not the default recognition mode. As defined previously for the continuous listening recognition mode, a time-out counter and a recognition error counter are set to zero when the response prompting recognition mode is activated. However, the maximum allowed values for both of these counters are typically less than those for continuous listening recognition mode.

Following the prompting of the user by the illumination of a green light emitting diode 52b in a step S632, the software enters a pattern generating mode in a step S633, waiting for a voice command to be detected. If a maximum allowed time-out value TMAX1 is attained before a voice command is detected, the software will terminate the response prompting routine and return to the default continuous listening recognition mode as shown in a step S634. Until time TMAX1 has expired, the speech recognition circuit remains available to generate a pattern when a voice command is detected as shown in steps S635, S633 and S634. If a voice command is detected in a step S635, a pattern is generated in a step S636 and submitted for pattern recognition processing in a step S637.

During step 637 the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold. The result of this comparison is identified in a step S638.

If a match for the acquired pattern is not identified, the value of the recognition error counter is incremented by one in a step S638 and the red light-emitting diode 52c illuminates briefly to provide a visual indicator to the operator that no match was identified in a step S640. The recognition error counter value is then compared to a maximum allowed recognition error counter value EMAX1 in a step S641. If the recognition error counter value is equal to value EMAX1, the speech recognition circuit 50 executes software stored in its ROM 61 to terminate the response prompting routine and return to a default continuous listening recognition mode as shown in a step S641 and a step S505 in FIG. 5. If the recognition error counter value is not equal to value EMAX1, the green light-emitting diode 52b is activated and remains illuminated and the speech recognition circuit 50 executes software to enter a pattern generating mode, returning to a step S633 and waiting for a voice command to be detected. As previously indicated, until time TMAX1 has expired, the speech recognition circuit remains available to generate a pattern when a voice command is detected as shown in steps S635, S633 and S634.

If a match for the acquired pattern is identified in a step S638, the speech recognition circuit 50 software identifies the operation associated with the matching recognition vocabulary set command in a step S642 and determines if the operation is to send an instruction to the speech recognition circuit controller 60 to activate a new recognition vocabulary set or not. If a new recognition vocabulary set is to be activated, the software executes the instruction to enter the appropriate recognition mode for the indicated recognition vocabulary set in a step S628 shown in FIG. 7.

Figure 11:
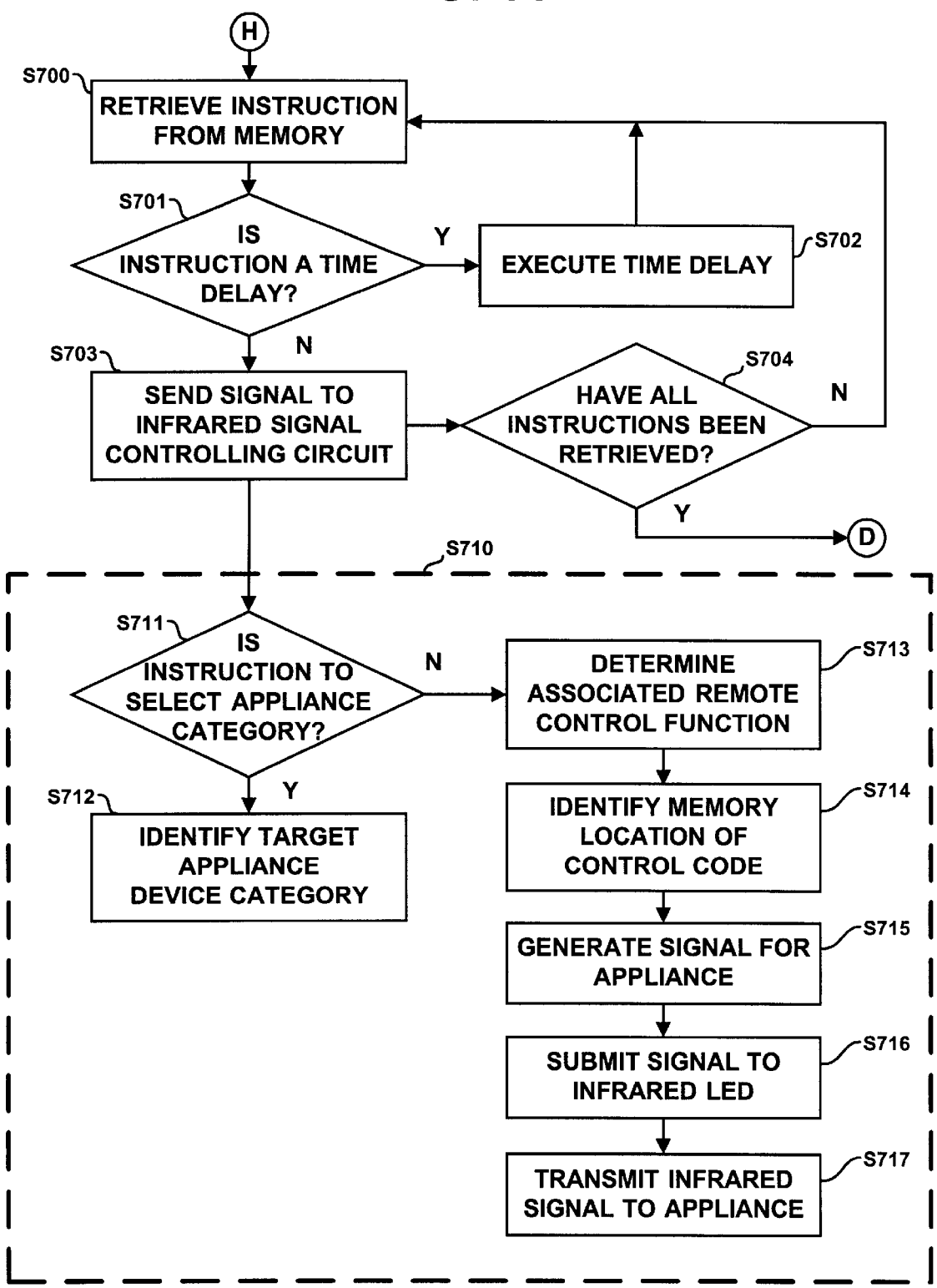
FIG. 11 is a functional block diagram showing the sequence steps for executing a macro program in one embodiment of the present invention.

If the operation associated with the recognized command is to send an instruction to the speech recognition circuit controller 60 to activate a macro sequence of commands, then software begins to execute the macro program as indicated in a step S700 in FIG. 11, which is described later.

As shown in a step S644, if the operation associated with the recognized command is to send an instruction to the speech recognition circuit controller 60 to output a signal to the infrared controlling circuit 70, the software uses the speech recognition circuit input/output 68 pins. The signal to the infrared controlling circuit communicates either a appliance category selection command in a step S645 or a command to transmit an infrared signal for a specified function to the currently controlled appliance in a step S646.

Following the submission of a signal to the infrared signal controlling circuit 70, the speech recognition circuit controller 60 executes software stored in its ROM 61 to determine whether to remain in the active recognition vocabulary set to receive additional voice commands or to terminate the response prompting routine and return to a default continuous listening recognition mode as shown in a step S647 and a step S505 in FIG. 5. If remaining in the active recognition vocabulary set, the software resets the values TMAX1 and EMAX1 to zero in a step S631, activates the response prompting green light-emitting diode 52b in a step S632 and enters a pattern generating mode in a step S633, waiting for a voice command to be detected until either TMAX1 or EMAX1 counter values are attained, at which time the software will terminate the response prompting routine and return to a default continuous listening recognition mode as shown in steps S634 or S641, followed by a step S505 in FIG. 5.

Figure 9:
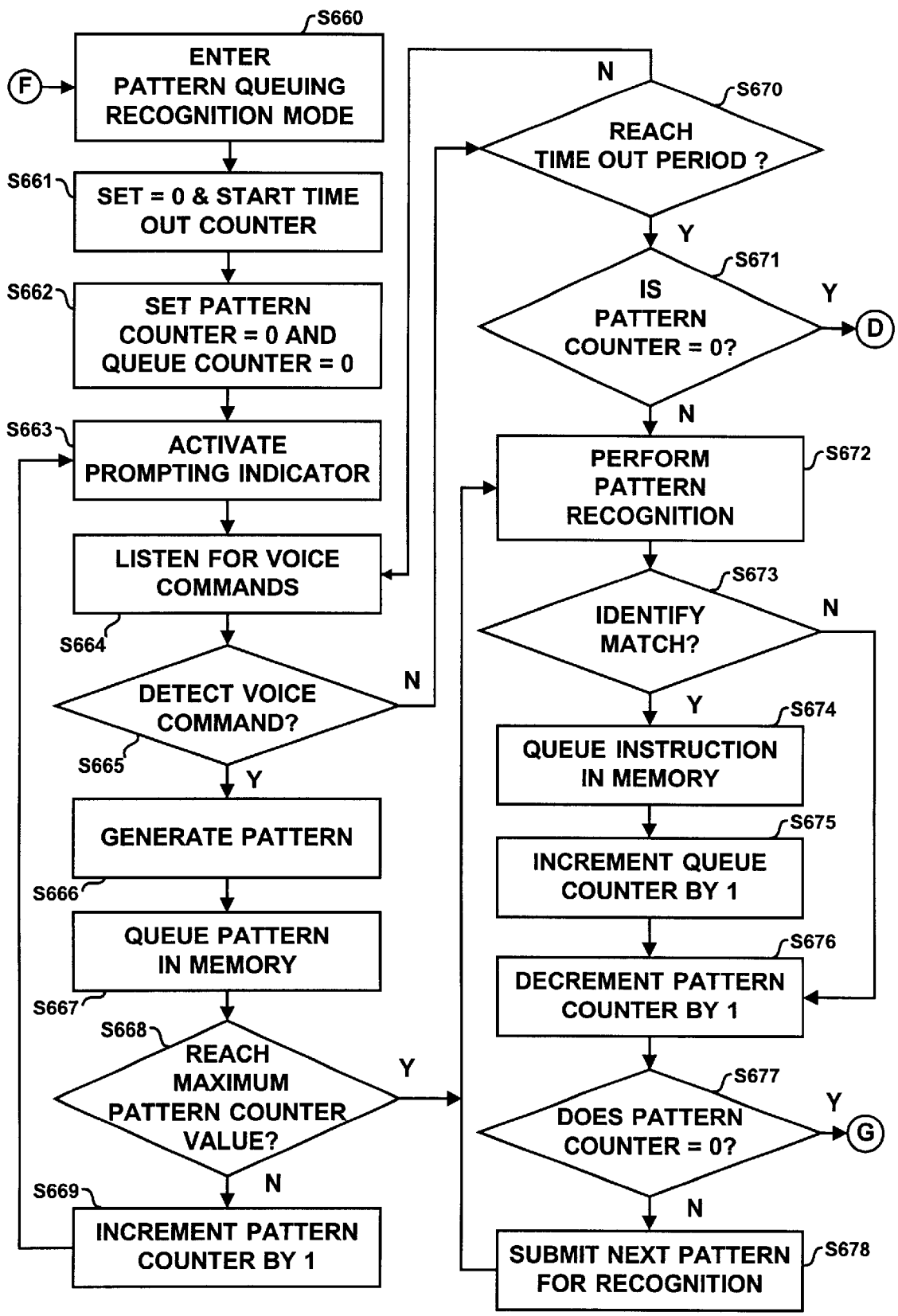
FIG. 9 is a functional block diagram showing the sequence of steps for the pattern queuing recognition mode for one embodiment of the present invention.

A pattern queuing recognition mode is shown in FIG. 9. Generally, pattern queuing involves the user providing a voice command after each prompt within a series of prompts. The number of prompts in the series is predetermined. A pattern is generated for each voice command as it is received, and the pattern is queued into memory. After patterns have been generated and queued into memory for all received voice commands, the voice commands are submitted one by one for recognition. Following recognition of each pattern, the operation instruction associated with the command in the active recognition vocabulary set identified as a match with the unknown pattern is queued into memory. When all patterns within the series have been recognized, and all associated operation instructions have been queued into memory, the controller 60 performs each of the operation instructions in a defined order.

For example, the system utilizes a pattern queuing routine to allow a user to submit a string of consecutive voice commands, which may be separated by brief pauses, selected from a vocabulary recognition set which includes the names of digits zero through nine. In this example, a user submits the word "channel" during the continuous listening default routine. When the word "channel" is recognized, the software activates said recognition vocabulary set including digit names and initiates a pattern queuing routine, prompting the user to submit one, two or three digit names to identify a desired channel number for an appliance.

When the speech recognition circuit software activates a recognition vocabulary set and executes a pattern queuing routine as shown in a step S660, the user is expected to select a voice command from the active recognition vocabulary set and respond when prompted by an illuminated green light emitting diode 52b. The green light emitting diode 52a remains illuminated in this mode when the speech recognition circuit 50 is available to generate patterns to indicate to the user that the active recognition mode is not the default recognition mode. As defined previously for the continuous listening recognition mode, a time-out counter is set to zero when the pattern queuing recognition mode is activated as shown in a step S661. However, the maximum allowed value TMAX2 for this counter is typically less than that for continuous listening recognition mode. Also at this time, a pattern counter and a queue counter are set to zero in a step S662.

The pattern counter value is incremented each time after a pattern is generated until a maximum pattern counter value MAXP is attained. In this manner each pattern counter number value is representative of a single generated pattern and the maximum number attained by said counter is equal to the number of patterns generated. The value MAXP represents the maximum number of patterns the routine will generate before terminating the pattern generation process and beginning a speech recognition process. The minimum value for the pattern counter before the routine will generate speech recognition processing is one. If no patterns are generated within the time allowed, then the software returns to the default continuous listening mode.

The queue counter is utilized in a similar manner to the pattern counter, except that it is used to track operation instructions identified during a speech recognition process. As a match is identified for an unknown pattern during the pattern recognition process, the operation instruction of the associated recognition vocabulary set command determined to be the best match is queued into memory until all generated patterns are processed through the speech recognition process. In this manner each queue counter number value is representative of an operation instruction now associated with a single generated pattern and is useful in retaining sequential order during the storage and retrieval of said instruction from memory. The maximum value attained by said queue counter is equal to the number of patterns generated. Unknown patterns for which no match is identified during the speech recognition process are ignored, in which cases the queue counter is not incremented.

Following the production of a visual prompt by the green light emitting diode 52b in a step S663, the speech recognition circuit 50 software begins a listening routine (ready to generate a pattern) awaiting a voice command in a step S664. As shown in steps S664, S665 and S670, the speech recognition circuit 50 system remains in this routine until either a voice command is detected in a step S665 or the time-out counter value reaches the value TMAX2 in step S670. As shown in a step S666 a pattern is generated by the speech recognition circuit 50 when a voice command is detected in a step S665. The generated unknown pattern is queued into RAM 62 in a step S667.

As shown in a step S668, the value of the pattern counter is then compared with the value MAXP. If the pattern counter value is less than the value of MAXP, then the pattern counter value is incremented by one and the green light emitting diode 52b provides a visual prompt in a step S663 for the user to submit another voice command. This process continues to cycle through these steps S663 through S669 until either the pattern counter reaches the value MAXP in step S668, indicating the maximum number of patterns allowable have been generated, or until a time-out occurs as described previously. If a time-out does occur at a step S670, the value of the pattern counter is compared to the value zero in a step S671. If the pattern counter value is equal to zero, then the system returns to the default continuous listening mode as shown in a step S505 in FIG. 5. If the pattern counter value is not equal to zero, then patterns have been generated.

Generated patterns are then submitted by the system for processing by the pattern recognition algorithm in a step S672, one pattern at a time, in reverse order from the pattern generation order. Suitable pattern recognition algorithms have been described above.

If a match for an acquired pattern is identified in a step S673, the speech recognition circuit 50 software identifies the operation associated with the matching recognition vocabulary set command and queues this operation instruction into RAM 62 in a step S674. The queue counter is then incremented by the value one in a step S675. The pattern counter is then decremented by the value one in a step S676. The pattern counter value is then compared to the value zero in a step S677 to determine if there are any unknown patterns queued in RAM 62 which have not been submitted for speech recognition processing. If the pattern counter value is not equal to zero, then the software submits the next unknown pattern for speech recognition processing in a step S678 and returns to step S672 to perform pattern recognition. The software continues to cycle through steps S672 through step S678 until the pattern counter value is equal to value zero in step S677. If a match for an acquired pattern is not identified in a step S673, the pattern counter value is decremented by one in a step S676 before proceeding to step S677.

Figure 10:
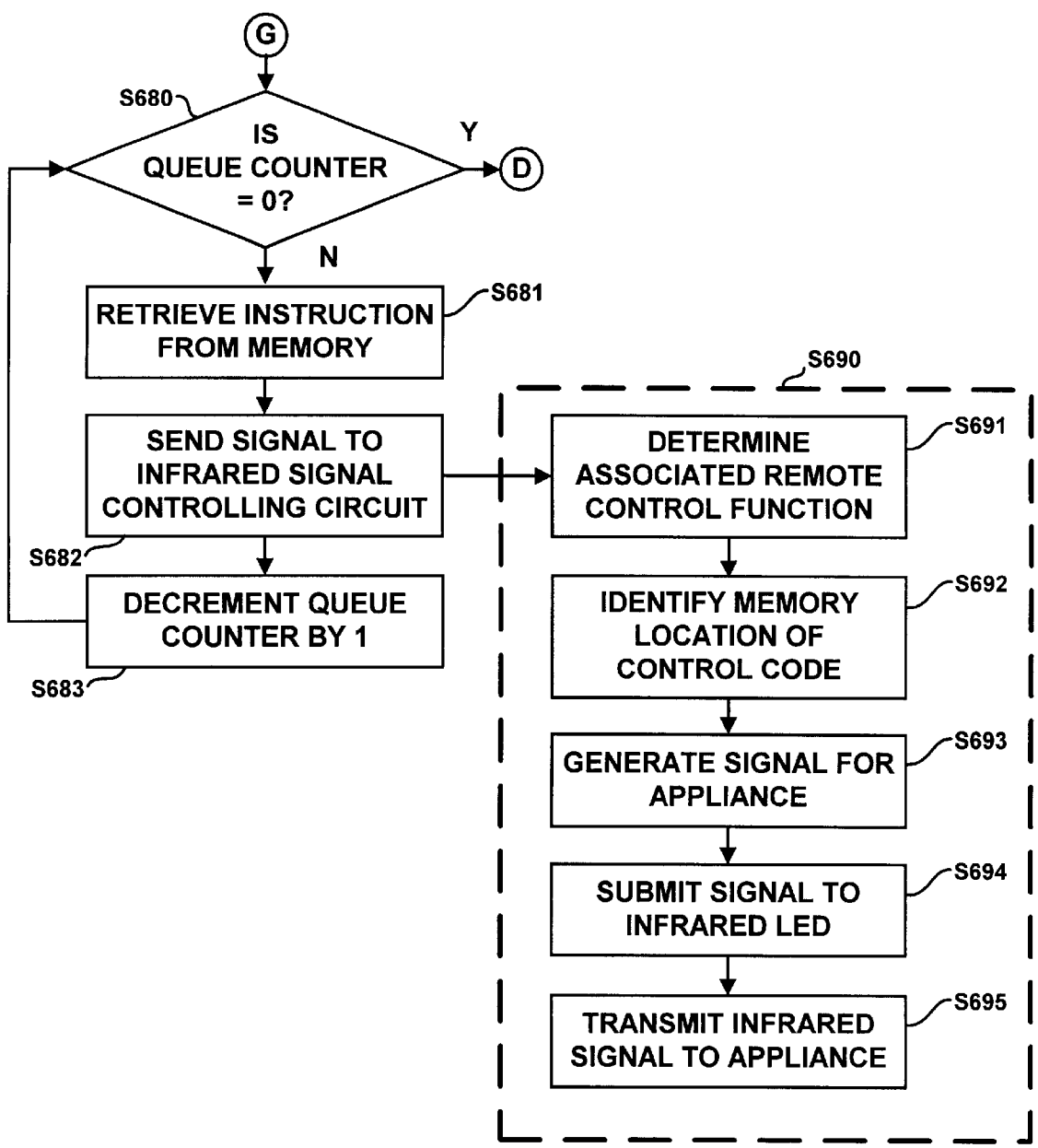
FIG. 10 is a functional block diagram showing a continuation of the sequence of steps for pattern queuing recognition mode for one embodiment of the present invention shown in FIG. 9.

When the pattern counter value is equal to value zero in step S677 in FIG. 9, the software compares the queue counter value to the value zero in a step S680 in FIG. 10 to determine if there are any operation instructions queued in the RAM 62. If the value of the queue counter is not equal to the value zero, the software retrieves from RAM 62 the operation instruction associated with the current value of the queue counter in a step S681. The speech recognition circuit 50 executes the operation instruction in a step S682 by sending a signal through the input/outputs 68 pins to the infrared signal controlling circuit 70. The processing of said signal received by the infrared signal controlling circuit is described later. The speech recognition circuit 50 software then decrements the queue counter value by the value one in a step S683 and returns to step S680 to determine if all operation instructions have been retrieved from RAM 62. The software continues to cycle through steps S680 through step S683 until the queue counter value is equal to value zero in step S680 at which time the system returns to the default continuous listening mode as shown in a step S505 in FIG. 5.

As shown in a step S682, the operation instruction associated with the recognized command is processed by the speech recognition circuit controller 60 to determine an output signal to the infrared controlling circuit 70, which is sent via the speech recognition circuit input/output 68 pins.

The routine S690 identifies the processing steps performed within the infrared signal controlling circuit 70. The signal from the speech recognition circuit output 68 pins is received by inputs of the infrared signal controlling circuit 70 and processed to determine the associated remote control function in a step S691. The output from the speech recognition circuit output 68 pins provides a signal that is the informational equivalent to that of a signal generated when a button is depressed on a keypad of a conventional remote control transmitter. Thus the input to the controller of the infrared signal controlling circuit 70 can be uniquely associated with a function similarly to the input received from a conventional keypad generated circuit connection. The controller of the infrared signal controlling circuit 70 interprets the signal received at its input pin(s) by identifying a memory location in a step S692 and retrieving the control code stored therein. This controller generates a signal based upon the control code in a step S693 and submits the signal to an infrared driver 74, which drives one or more infrared light emitting diodes 80 in a step S694. The infrared light emitting diode 80 converts the electrical signal into an infrared signal which is transmitted to one or more target appliances in a step S695.

In one embodiment of the invention, as discussed above, an interface is provided as part of the infrared signal controlling circuit 70. The interface simulates the function of a switch matrix, connecting one or more inputs of the controller of the infrared signal controlling circuit 70 to one or more of its outputs as typically results when a keypad button is depressed. When the speech recognition circuit 50 sends a signal to this interface, the interface allows electrical connections to be established, similar to a keypad button depression, between inputs and outputs of the controller of the infrared signal controlling circuit 70. One embodiment of the interface includes a programmable logic device as discussed above and is shown in FIG. 2b, described above. The interface provides an advantage since it is programmable and thus can be easily modified for use with a variety of controllers for infrared signal controlling circuits 70.

As indicated in a step S643 in FIG. 8, the recognition of a single voice command may generate a series of control signals to one or more target appliances. Such a sequence of control signals is hereafter referred to as a macro. Each macro must be created by the user during a product setup process described below. Macros may contain operation instructions for appliance category selection, infrared signal codes and/or time delays. Macros are stored in the read/write memory 54 controlled by the speech recognition circuit 50 and may be associated with a user trained speaker dependent command.

As indicated in a step S700, once a macro name is recognized, the speech recognition circuit 50 software retrieves the first instruction stored in the read/write 54 memory location associated with the recognized command. If the instruction retrieved is determined to be a time delay in a step S701, the software executes a time delay in a step S702 and returns to step S700 to retrieve the next instruction from memory. If the instruction is not a time delay, the speech recognition circuit 50 software sends a signal utilizing the speech recognition circuit input/output 68 pins to the infrared signal controlling circuit 70 in step S703. As indicated in a step S704, after a signal is sent to the infrared signal controlling circuit 70, the software returns to the read/write 54 memory location associated with the recognized command to determine if another instruction is to be retrieved and processed. If so, the system retrieves the instruction, returning to step S700. The system continues to cycle through steps S700 through step S704 until an end marker is reached by the software in the memory location in a step S704, at which time the system returns to the default continuous listening mode as shown in step S505 in FIG. 5.

As previously indicated, the output from the speech recognition circuit input/output 68 pins provides sufficient information to the infrared signal controlling circuit 70 to generated a signal that is equivalent to that generated when a button is depressed on a keypad of a conventional remote control transmitter. The routine S710 identifies the processing steps performed within the infrared signal controlling circuit 70. The signal from the speech recognition circuit input/output 68 pins is received by inputs of the infrared signal controlling circuit 70. If the signal contains an instruction to select an appliance category in a step S711, the infrared signal controlling circuit 70 responds in a step S712 by making the memory locations associated with said appliance category active for subsequent access. If the signal contains an instruction to identify, generate and submit an infrared signal to a target appliance, then the infrared signal controlling circuit 70 performs these processes as indicated in steps S713 through S717. The controller of the infrared signal controlling circuit 70 interprets the signal received at its input pins in a step S713 and identifies a memory location in a step S714, retrieving the control code stored therein. This controller generates a signal based upon the control code in a step S715 and submits the signal to an infrared driver 74, which drives an infrared light emitting diode 80 in a step S716. The infrared light emitting diode 80 converts the electrical signal into an infrared signal which is transmitted to one or more target appliances in a step S717.

PRODUCT SETUP

Figure 12A:
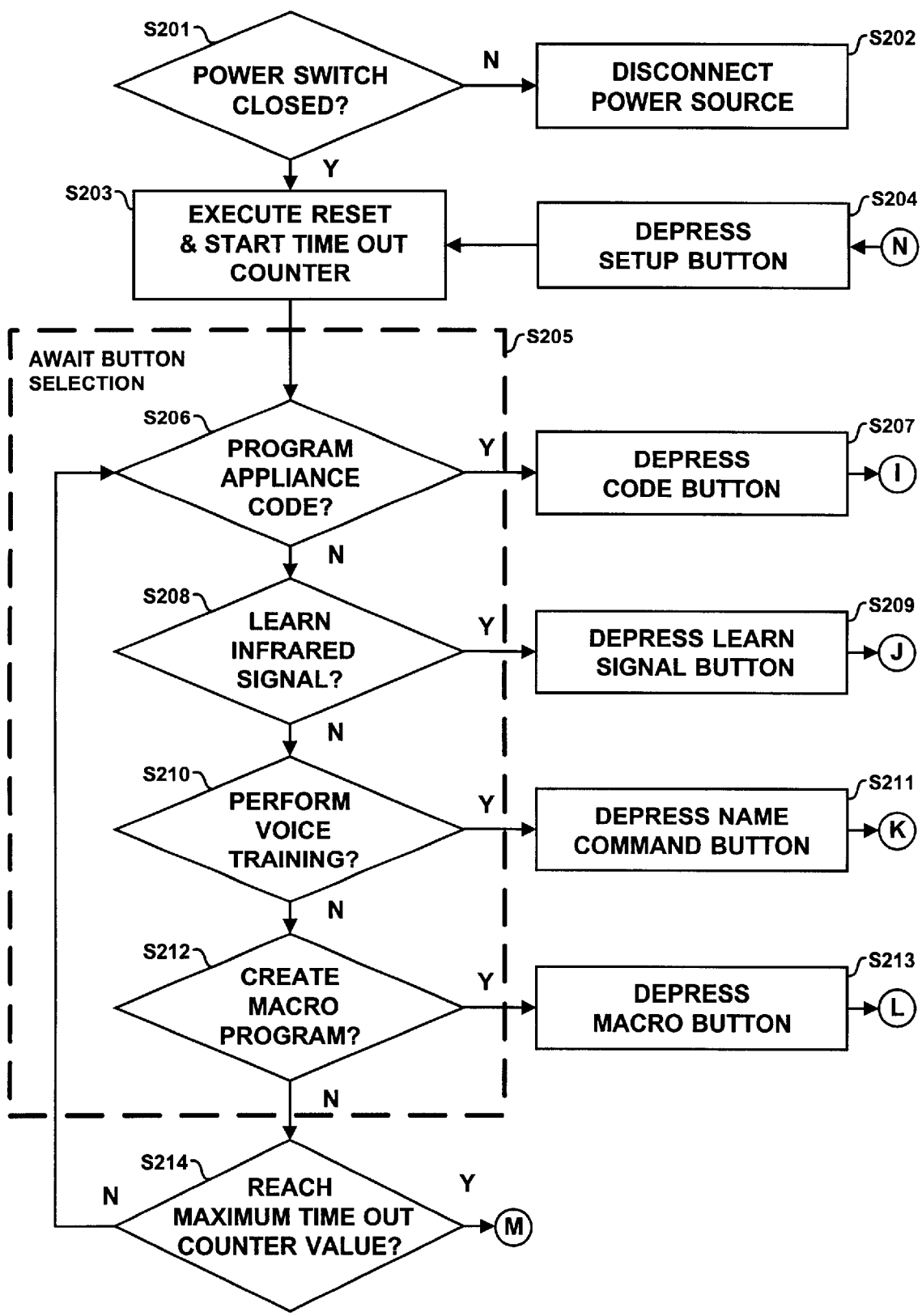
FIGS. 12A and 12B is a functional block diagram showing the sequence steps for initiating the product setup process for one embodiment of the present invention.

As indicated in a step S201 in FIG. 12a, one of the buttons present on keypad 51 controls the state of a power switch, If the power switch is open as shown in a step S202, the power source is not electrically connected to sections of the power supply circuit 90 which have electrical connections to certain circuit elements and therefore, these circuit elements do not receive electric energy. When this power switch is closed, the power source is electrically connected to sections of the power supply circuit 90 which have electrical connections to certain circuit elements and therefore, these circuit elements do receive electric energy. Step S203 shows that when the power supply button is momentarily depressed and the power switch is placed into a closed state, the speech recognition controller 60 executes a reset, sets a time-out counter to value zero and starts the time-out counter, which increments as time elapses. As shown in a step S205, controller 60 enters a waiting state where it monitors input 68 pins to determine if inputs are received from depressed buttons located on keypad 51.

If no inputs are detected, i.e. no buttons are depressed, before the time-out counter reaches its maximum value SMAX as shown in step S214, the controller 60 executes code stored in ROM 61 to enter an appliance category selection routine shown in step S220 in FIG. 12b, which is described later.

Figure 13A:
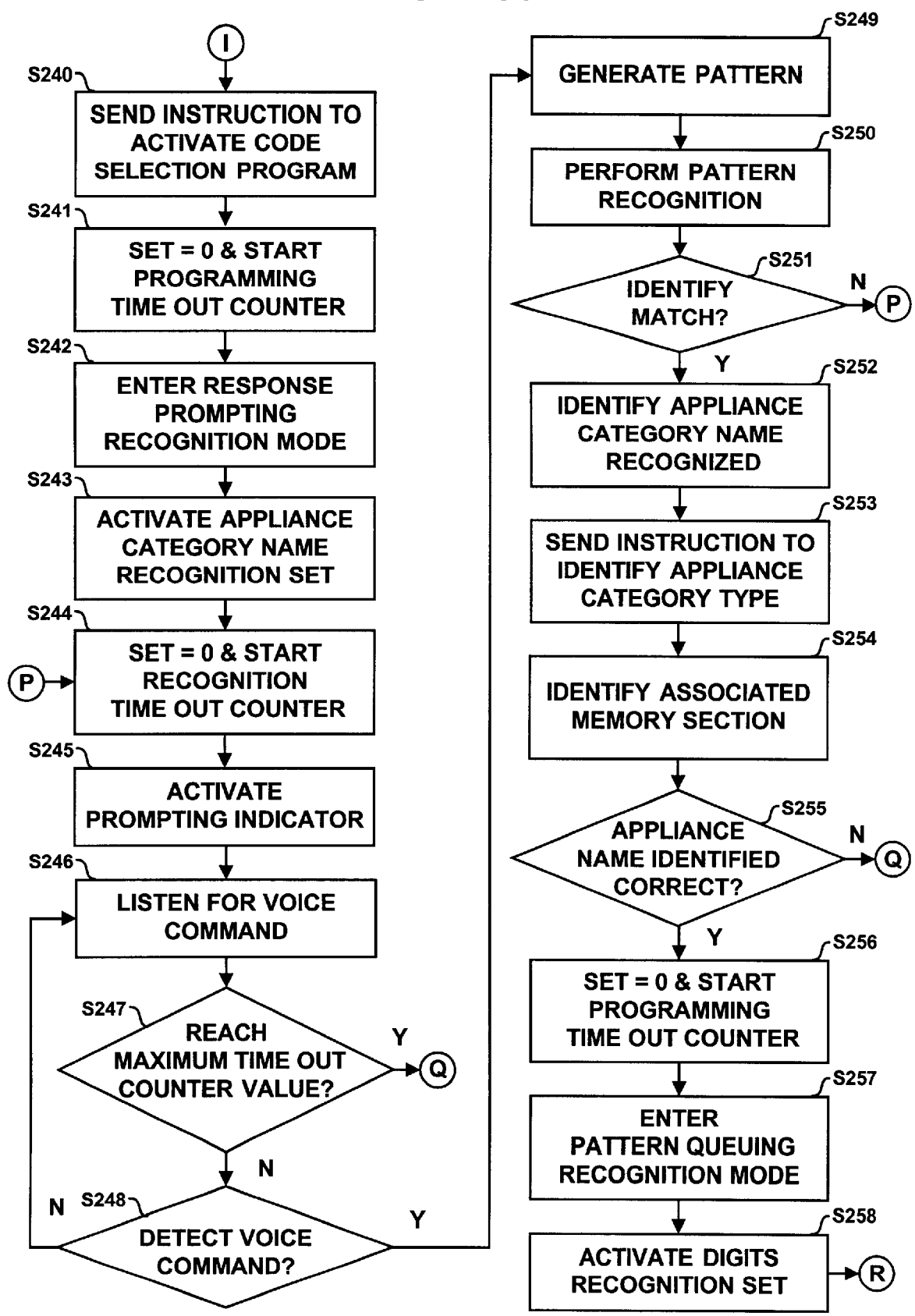
FIGS. 13A–13C is a functional block diagram showing the sequence steps for selecting a controlled appliance code during a product setup process for one embodiment of the present invention.
Figure 13B:
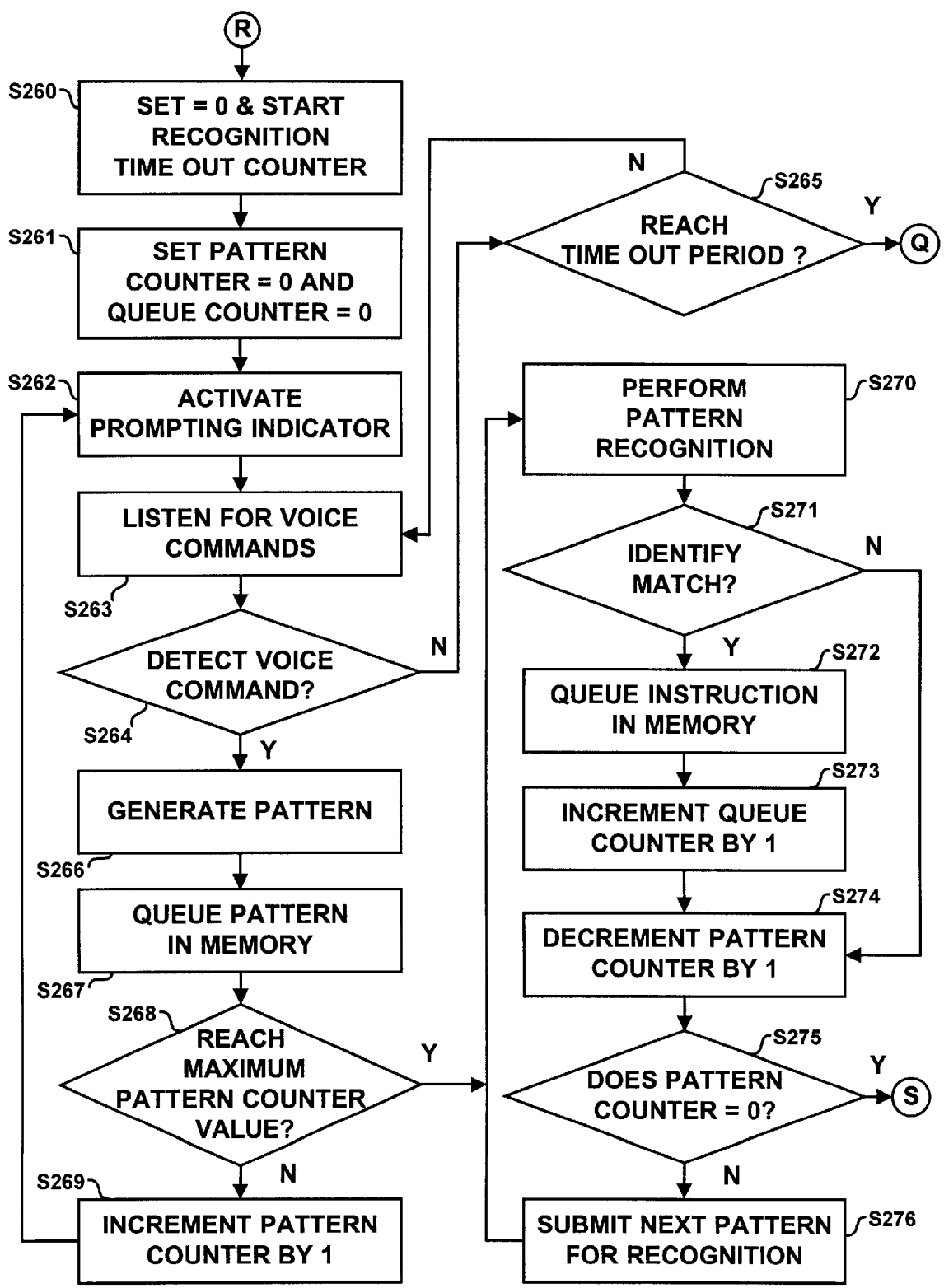
Figure 13C:
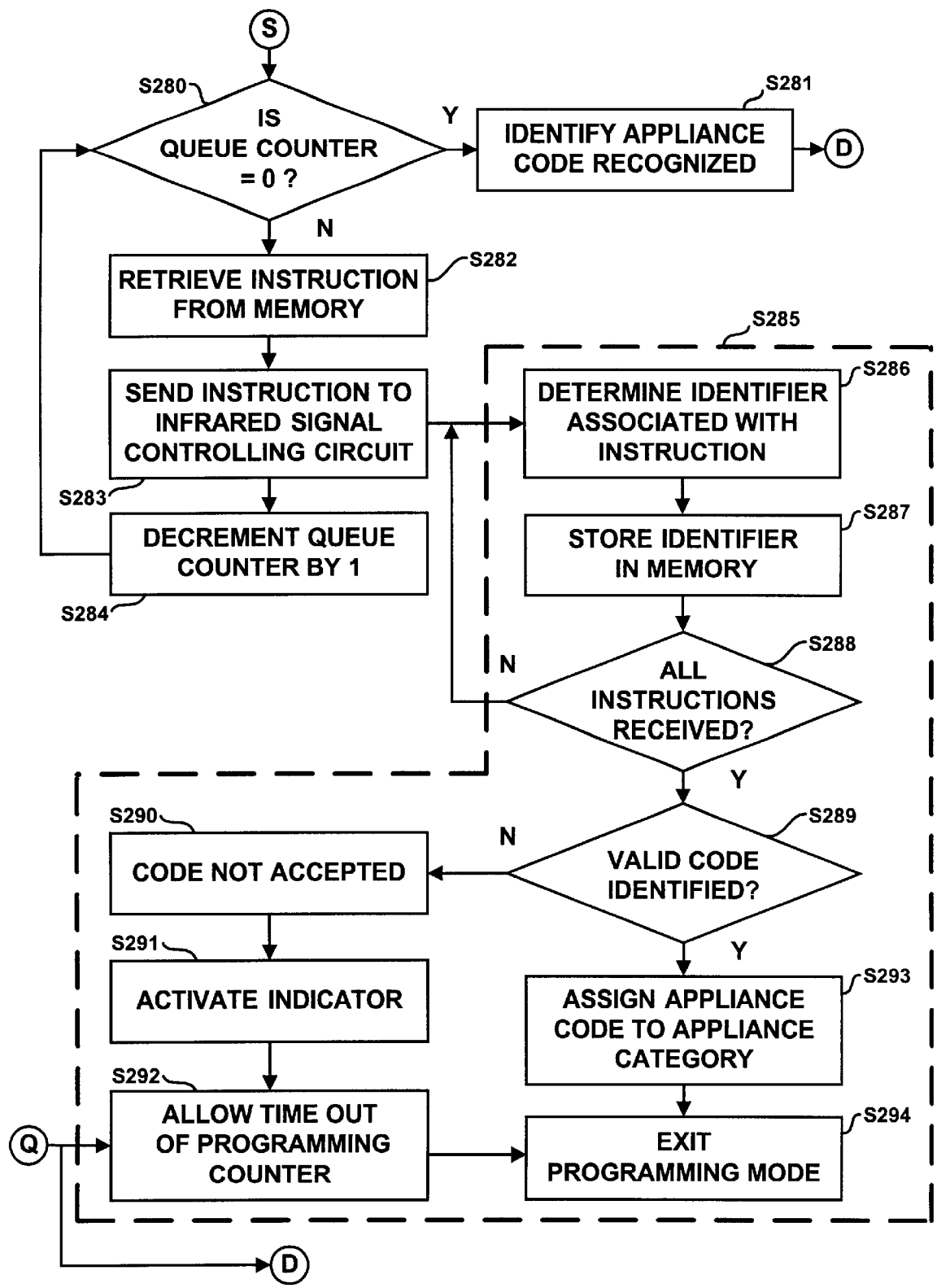

If the user desires to enter an appliance code to select a specific appliance manufacturer's control codes from the universal appliance code library as shown in a step S206, the user presses the code button as shown in step S207. FIG. 13a through FIG. 13c show the sequence of steps involved in programming such appliance codes.

If the user desires to teach the system infrared signals from another remote control transmitter as shown in a step S208, the user presses the learn signal button as shown in step S209. FIG. 14a and FIG. 14b show the sequence of steps involved in learning infrared codes.

Figure 15:
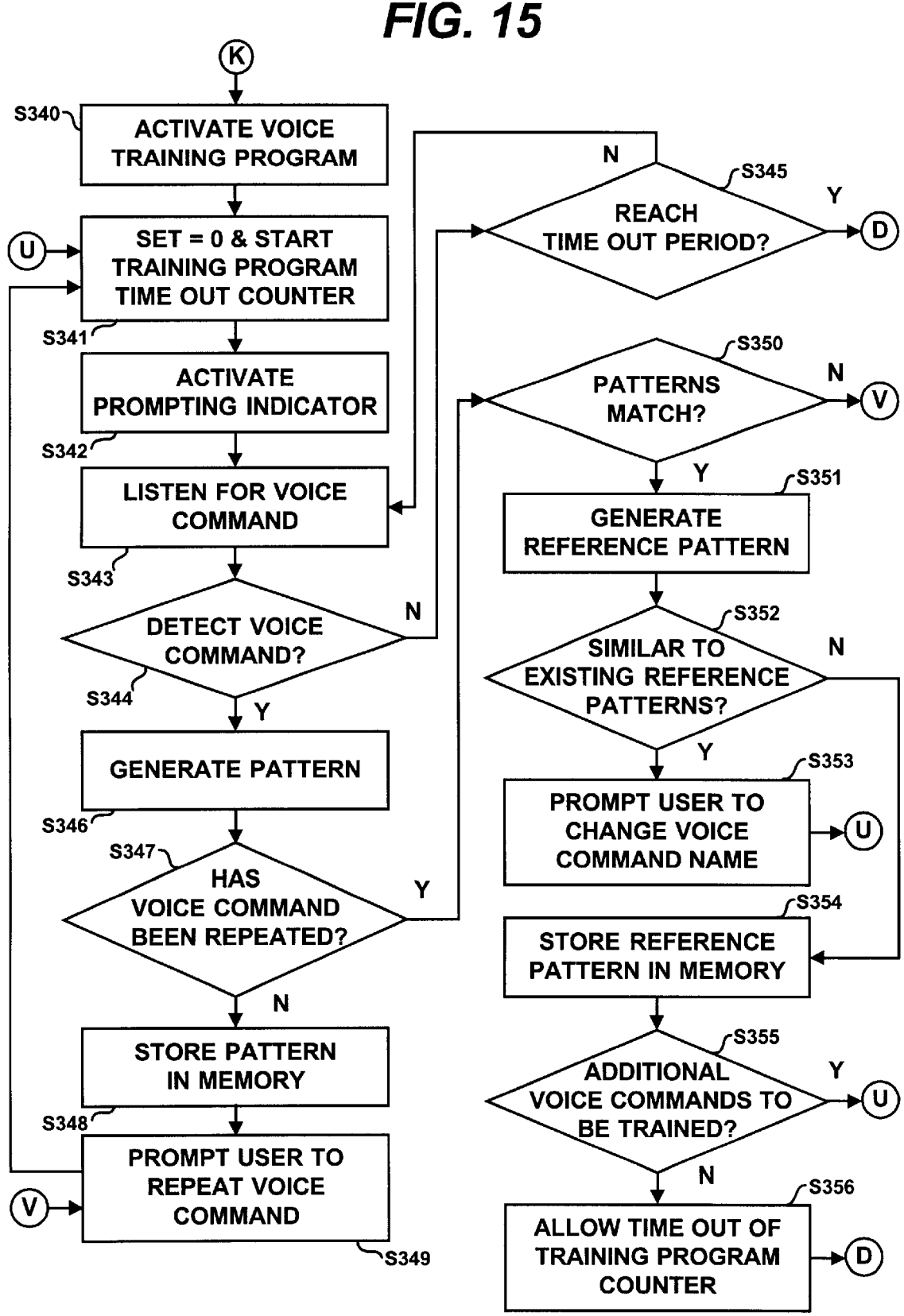
FIG. 15 is a functional block diagram showing the sequence steps for teaching custom, speaker dependent voice command names during a product setup process for one embodiment of the present invention.

If the user desires to teach the system custom speaker dependent names to be later associated with devices, functions or macros as shown in a step S210, the user presses the name command button as shown in step S211. FIG. 15 shows the sequence of steps involved in user voice training for custom names.

Figure 16A:
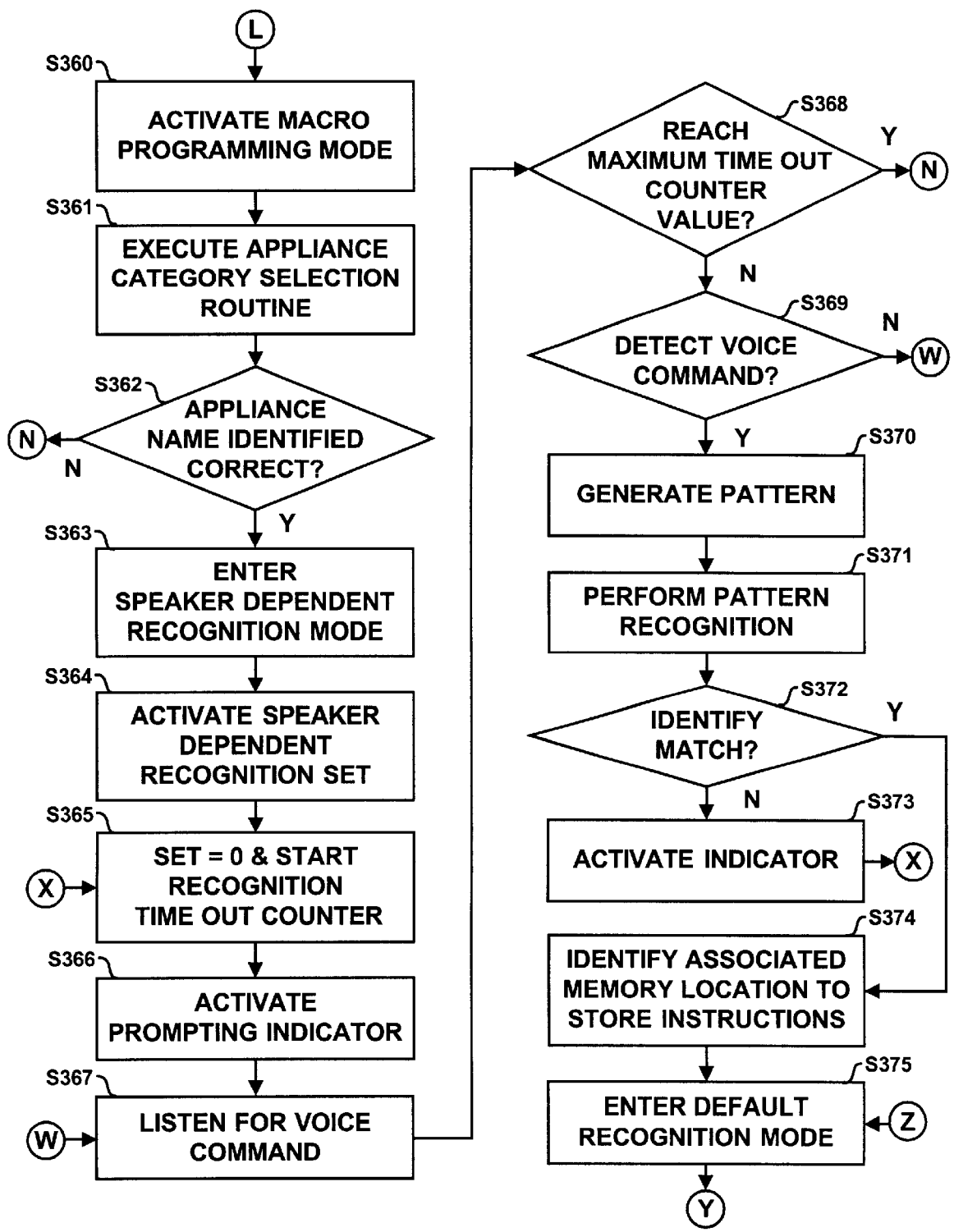
FIGS. 16A and 16B is a functional block diagram showing the sequence steps for creating a macro program during a product setup process for one embodiment of the present invention.
Figure 16B:
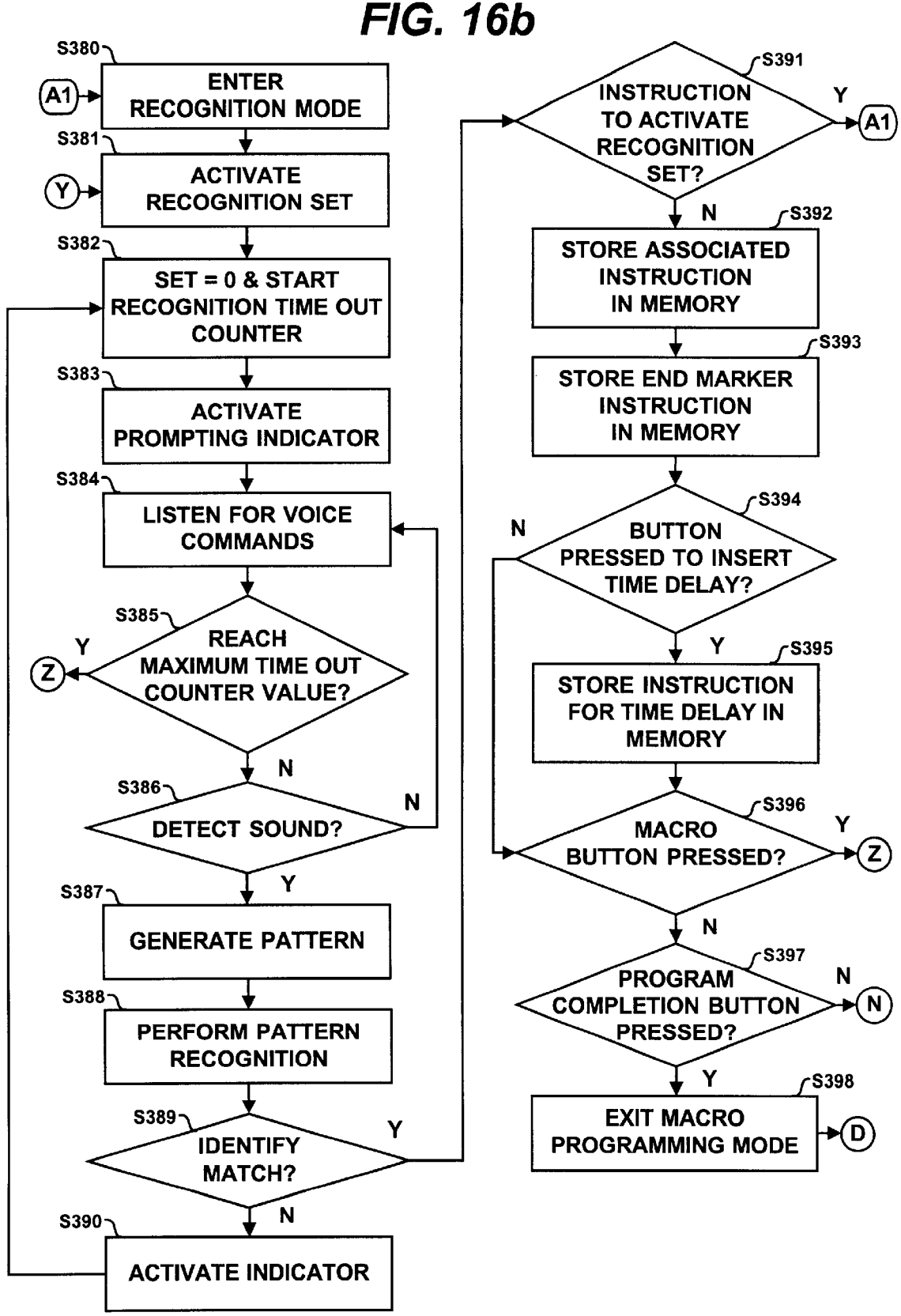

If the user desires to create a macro program as shown in a step S212, the user presses the macro button as shown in step S213. FIG. 16a and FIG. 16b show the sequence of steps involved in creating macro programs.

A reset as shown in step S203 may also be initiated when the invention is powered up and operating by depressing the setup button as shown in step S204. This reset follows the same sequence as that resulting from an initial power up as shown in steps S203 through in FIG. 12a and FIG. 12b.

Figure 12B:
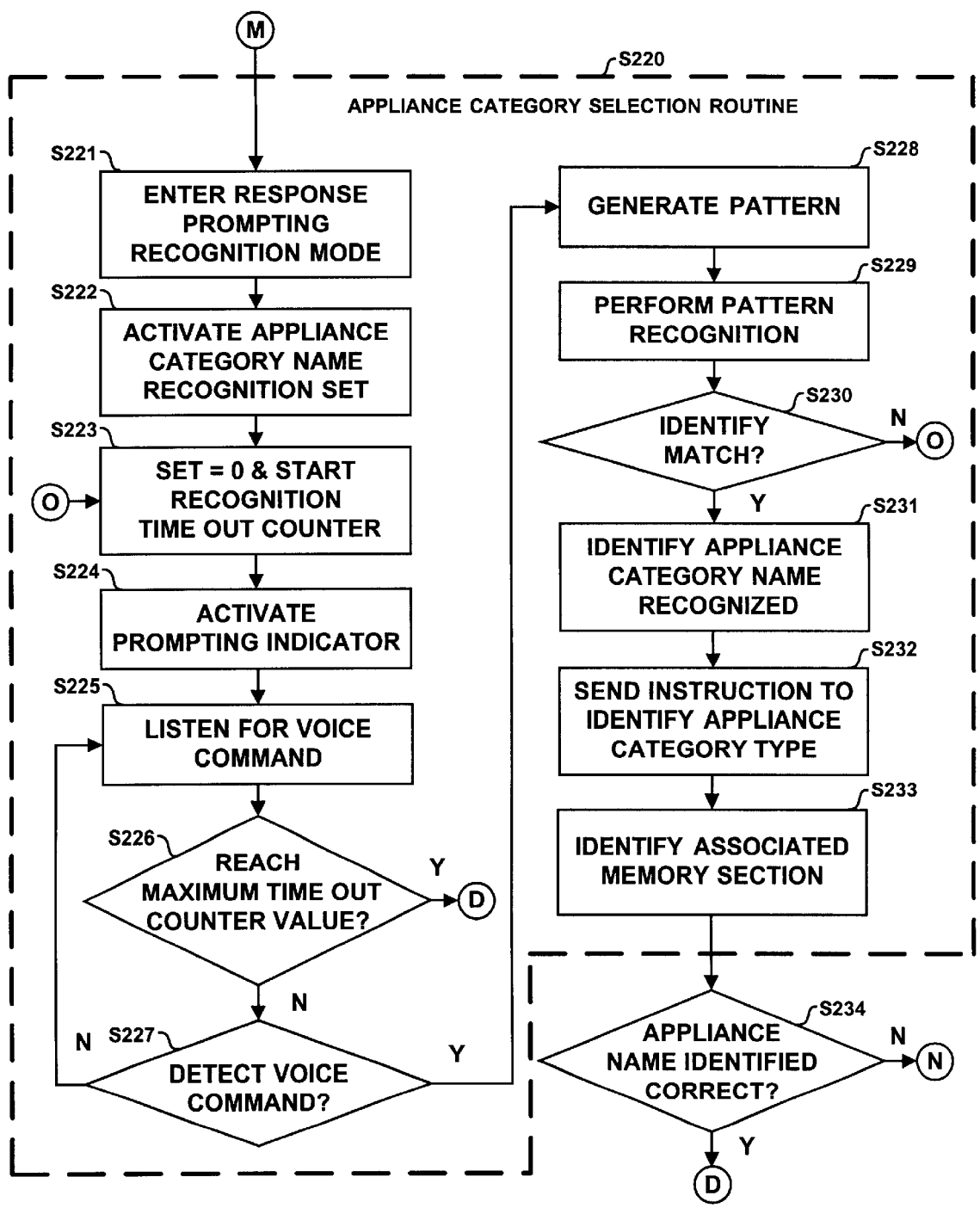

If no inputs are detected, i.e. no buttons are depressed, before the time-out counter reaches its maximum value SMAX as shown in step S214 in FIG. 12a, the controller 60 executes code stored in ROM 61 to enter an appliance category selection routine shown in step S220 in FIG. 12b.

A response prompting recognition mode for appliance category selection is shown in FIG. 12b. The speech recognition circuit 50 software executes a response prompting routine as shown in a step S221 and activates the appliance category name recognition vocabulary set as shown in step S222. As defined previously for speech recognition modes, a time-out counter is set to zero and started in a step S223 when the response prompting recognition mode is activated. The user is then expected to select a voice command from the appliance category name recognition set and respond when prompted by an illuminated green light emitting diode 52a as shown in a step S224. For example, the appliance category name recognition set may be comprised of such voice command options as "television," "video," "satellite," and "cable" among which the user may select.

Following the prompting of the user by the illumination of a green light emitting diode 52a in a step S224, the system enters a pattern generating mode in a step S225, waiting for a voice command to be detected. If a maximum allowed time-out value TMAXD is attained before a voice command is detected, the software will terminate the response prompting routine and enter the default continuous listening recognition mode as shown in a step S226. Until time TMAXD has expired, the speech recognition circuit remains available to generate a pattern when a voice command is detected as shown in steps S225, S226 and S227. If a voice command is detected in a step S227, a pattern is generated in a step S228 and submitted for pattern recognition processing in a step S229.

During step S229 the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold. The result of this comparison is identified in a step S230.

If a match for the acquired pattern is not identified, the red light-emitting diode 52c illuminates briefly to provide a visual indicator to the operator that no match was identified and the value of the recognition time-out counter is reset to the value zero and restarted as shown in a step S223. The green light-emitting diode 52a is then activated and remains illuminated as shown in step S224 and the speech recognition circuit 50 executes software to enter a pattern generating mode, returning to a step S225 and waiting for a voice command to be detected. As previously indicated, until time TMAXD has expired, the speech recognition circuit remains available to generate a pattern when a voice command is detected as shown in steps S225, S226 and S227.

If a match for the acquired pattern is identified in a step S230, the speech recognition circuit 50 software identifies the instruction associated with the matching recognition vocabulary set command, and issues a prompt, which may be a speech synthesis prompt, an audio sound or light-emitting diode indication, in a step S231 to identify the appliance category name recognized. The speech recognition circuit 50 then outputs a signal to the infrared controlling circuit 70, using output 68 pins to communicate the appliance category selection command in a step S232. The infrared controlling circuit 70 receives the signal and responds as shown in step S233 by making the memory section associated with the appliance category selected available for access.

Following the submission of a signal to the infrared signal controlling circuit 70, the speech recognition circuit controller 60 executes software stored in its ROM 61 to return to a default continuous listening recognition mode as shown in a step S234 and a step S505 in FIG. 5. If the appliance category name identified in step S231 is incorrect, step S234 also shows that the user may elect to press the setup button, returning to step S204 in FIG. 12a and begin the process again.

APPLIANCE CODE SELECTION

If the controller 60 detects an input corresponding to a depress of the code button shown in step S207 in FIG. 12a, a signal is sent to the infrared signal controlling circuit 70, using output 68 pins to instruct the infrared signal controlling circuit to enter a programming mode. As shown in step S240 in FIG. 13a, the controller of the infrared controlling circuit executes a programming routine from software stored within its ROM, which includes setting to value zero and starting a programming time-out counter in a step S241. The programming routine prepares the controller of the infrared signal controlling circuit 70 for subsequent receipt of a series of instructions. A first instruction identifies the intended appliance category, which is then followed by a series of instructions, where each instruction represents an identifier digit of an appliance code. The appliance code is comprised of a predetermined number of said identifier digits and uniquely identifies a specific control code set of the remote control command codes for a particular appliance. When the controller of the infrared signal controlling circuit 70 receives instructions identifying all the identifier digits of an appliance code, it is capable of identifying the memory location within the universal appliance code library stored within its ROM where the remote control command codes for the intended appliance type are stored. The control codes are then made available for subsequent signal transmission and resulting control of the intended appliance. As indicated previously, universal remote controls employing such universal appliance code libraries are well documented in prior art. The controller of the infrared controlling circuit 70 illuminates red light-emitting diode 52d during the programming mode period.

The speech recognizing circuit controller 60 executes code stored in ROM 61 to enter a response prompting recognition mode for appliance category selection shown in step S242. The speech recognition circuit 50 software executes a response prompting routine and activates the appliance category name recognition vocabulary set as shown in step S243. As defined previously for speech recognition modes, a time-out counter is set to zero and started in a step S244 when the response prompting recognition mode is activated. The user is then expected to select a voice command from the appliance category name recognition set and respond when prompted by an illuminated green light emitting diode 52a as shown in a step S245. As indicated previously, the appliance category name recognition set may be comprised of such voice command options as "television," "video," "satellite," and "cable" among which the user may select.

Following the prompting of the user by the illumination of a green light emitting diode 52a in a step S245, the software enters a pattern generating mode in a step S246, waiting for a voice command to be detected. If a maximum allowed time-out value TMAXD is attained before a voice command is detected, the software will terminate the response prompting routine, and the programming time-out counter is allowed to expire as shown in step S292. Until time TMAXD has expired, the speech recognition circuit remains available to generate a pattern when a voice command is detected as shown in steps S246, S247 and S248. If a voice command is detected in a step S248, a pattern is generated in a step S249 and submitted for pattern recognition processing in a step S250.

During step S250 the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold. The result of this comparison is identified in a step S251.

If a match for the acquired pattern is not identified, the red light-emitting diode 52c illuminates briefly to provide a visual indicator to the operator that no match was identified and the value of the recognition time-out counter is reset to the value zero and restarted as shown in a step S244. The green light-emitting diode 52a is then activated and remains illuminated as shown in step S245 and the speech recognition circuit 50 executes software to enter a pattern generating mode, returning to a step S246 and waiting for a voice command to be detected. As previously indicated, until time TMAXD has expired, the speech recognition circuit remains available to generate a pattern when a voice command is detected as shown in steps S246, S247 and S248.

If a match for the acquired pattern is identified in a step S251, the speech recognition circuit 50 software identifies the instruction associated with the matching recognition vocabulary set command, and issues a prompt, which may be a speech synthesis prompt, an audio sound or light-emitting diode indication, in a step S252 to identify the appliance category name recognized. The speech recognition circuit 50 then outputs a signal to the infrared controlling circuit 70, using output 68 pins to communicate the appliance category selection command in a step S253. The infrared controlling circuit 70 receives the signal and responds by making the memory section associated with the appliance category selected available for access in a step S254. The infrared controlling circuit 70 then sets equal to value zero and restarts the programming time-out counter in a step S256.

Following the submission of a signal to the infrared signal controlling circuit 70, the speech recognition circuit controller 60 executes software stored in its ROM 61 to enter a pattern queuing recognition mode as shown in a step S257 and to activate the digits recognition set as shown in step S258. If the appliance category name identified in step S252 is incorrect, step S255 shows that the programming time-out counter is allowed to expire as shown in step S292, before returning to step S204 in FIG. 12a and beginning the process again.

As shown in steps S257 and S258 in FIG. 13a, the speech recognition circuit software executes a pattern queuing routine and activates the digit name recognition vocabulary set. For example, the digit name recognition set may be comprised of such voice command options as "zero," "one," "two,". . . "nine" among which the user may select.

As defined previously, a time-out counter is set to value zero and started when the pattern queuing recognition mode is activated as shown in a step S260 in FIG. 13b. Also at this time, a pattern counter and a queue counter are set to value zero in a step S261. The user selects an appliance code from a listing of the universal library of code supplied with the system and issues a spoken command identifying the first digit of the code when prompted by an illuminated green light emitting diode 52b as shown in a step S262.

The pattern counter value is incremented each time after a pattern is generated until a maximum pattern counter value MAXC is attained. In this manner each pattern counter number value is representative of a single generated pattern and the maximum number attained by said counter is equal to the number of patterns generated. The value MAXC represents the maximum number of patterns the routine will generate before terminating the pattern generation process and beginning a speech recognition process. The minimum value for the pattern counter before the routine will generate speech recognition processing is one. If no patterns are generated within the time allowed, then the software returns to the default continuous listening mode as described later.

The queue counter is utilized in a similar manner to the pattern counter, except that it is used to track operation instructions identified during a speech recognition process. As a match is identified for an unknown pattern during the pattern recognition process, the operation instruction of the associated recognition vocabulary set command determined to be the best match is queued into memory until all generated patterns are processed through the speech recognition process. In this manner each queue counter number value is representative of an operation instruction now associated with a single generated pattern and is useful in retaining sequential order during the storage and retrieval of said instruction from memory. The maximum value attained by said queue counter is equal to the number of patterns generated. Unknown patterns for which no match is identified during the speech recognition process are ignored, in which cases the queue counter is not incremented.

Following the production of a visual prompt by the green light emitting diode 52b in a step S262, the speech recognition circuit 50 software begins a listening routine (enters a state where it remains ready to generate a pattern) awaiting a voice command in a step S263. As shown in steps S263, S264 and S265, the speech recognition circuit 50 software remains within said routine until either a voice command is detected in a step S264 or the time-out counter value reaches the value TMAX2 in step S265. As shown in a step S266 a pattern is generated by the speech recognition circuit 50 when a voice command is detected in a step S264. Said generated unknown pattern is queued into RAM 62 in a step S267.

As shown in a step S268, the value of the pattern counter is then compared with the value MAXC. If the pattern counter value is less than the value of MAXC, then the pattern counter value is incremented by one in a step S269 and the green light emitting diode 52b provides a visual prompt in a step S262 for the user to submit another voice command. This process continues to cycle through these steps S262 through S269 until either the pattern counter reaches the value MAXC in step S268, indicating the maximum number of patterns allowable have been generated, or until a time-out occurs as described previously. If a time-out does occur at a step S265, the user allows the programming time-out counter to expire as shown in step S292 in FIG. 13c, before returning to step S204 in FIG. 12a and beginning the process again or allowing the invention to automatically enter the default recognition mode.

Generated patterns are then submitted by the software for processing by the pattern recognition algorithm in a step S270, one pattern at a time, in reverse order from the pattern generation order.

If a match for an acquired pattern is identified in a step S271, the speech recognition circuit 50 software identifies the operation associated with the matching recognition vocabulary set command and queues this operation instruction into RAM 62 in a step S272. The queue counter is then incremented by the value one in a step S273. The pattern counter is then decremented by the value one in a step S274. The pattern counter value is then compared to the value zero in a step S275 to determine if there are any unknown patterns queued in RAM 62 which have not been submitted for speech recognition processing. If the pattern counter value is not equal to zero, then the software submits the next unknown pattern for speech recognition processing in a step S276 and returns to step S270 to perform pattern recognition. The software continues to cycle through steps S270 through step S276 until the pattern counter value is equal to value zero in step S275. If a match for an acquired pattern is not identified in a step S271, the pattern counter value is decremented by one in a step S274 before proceeding to step S275.

When the pattern counter value is equal to value zero in step S275 in FIG. 13b, the software compares the queue counter value to the value zero in a step S280 in FIG. 13c to determine if there are any operation instructions queued in the RAM 62. If the value of the queue counter is not equal to the value zero, the software retrieves from RAM 62 the operation instruction associated with the current value of the queue counter in a step S282. The speech recognition circuit 50 executes said operation instruction in a step S283 by sending a signal through the outputs 68 pins to the infrared signal controlling circuit 70. The processing of said signal received by the infrared signal controlling circuit is described later. The speech recognition circuit 50 software then decrements the queue counter value by the value one in a step S284 and returns to step S280 to determine if all operation instructions have been retrieved from RAM 62. The software continues to cycle through steps S280 through step S284 until the queue counter value is equal to value zero in step S280 at which time the software issues a prompt, which may be a speech synthesis prompt, an audio sound or light-emitting diode indication, in a step S281 to identify the appliance code recognized, and then enters the default continuous listening mode as shown in a step S505 in FIG. 5.

As shown in a step S283, the operation instruction associated with the recognized command is processed by the speech recognition circuit controller 60 to determine an output signal to the infrared controlling circuit 70, which is sent via the speech recognition circuit output 68 pins.

S285 identifies the processing steps performed within the infrared signal controlling circuit 70. The signal from the speech recognition circuit output 68 pins is received by inputs of the infrared signal controlling circuit 70 and processed to determine an identifier associated with a recognized digit name in a step S286. The output from the speech recognition circuit output 68 pins is equivalent to a signal generated when a button is depressed on a keypad of a conventional remote control transmitter. Thus the input to the controller of the infrared signal controlling circuit 70 is essentially the same as received from keypad generated circuit connections which are well documented in prior art. The controller of the infrared signal controlling circuit 70 stores the identifier associated with the signal received in a memory location in a step S287. Identifiers are determined and stored for each instruction received from the speech recognition circuit 50 until all instructions are received as determined in a step S288. The set of identifiers are then analyzed by the controller of the infrared controlling circuit 70 to determine if a they collectively comprise a valid appliance code in a step S289. If a valid code exists, the remote control functions associated with that code are assigned to the previously identified appliance category in a step S293 and the programming mode is terminated in a step S294.

If the code is not valid, the code is not accepted in a step S290 and any previously established code remains active. Light-emitting diode 52d illuminates in a step S291 and the programming time-out counter is allowed to expire in a step S292. FIG. 13c also shows that, as the programming time-out counter is allowed to expire, the time-out counter for the speech recognition circuit 50 is also allowed to expire, after which the speech recognition circuit 60 executes software stored in its ROM 61 to return to a default continuous listening recognition mode.

Following the submission of the last signal to the infrared signal controlling circuit 70, the speech recognition circuit controller 60 executes software stored in its ROM 61 to return to a default continuous listening recognition mode as shown in a steps S281 in FIG. 13c and a step S505 in FIG. 5. If the appliance category name identified in step S281 is incorrect, the user may elect to press the setup button, returning to step S204 in FIG. 12a and begin the process again.

INFRARED SIGNAL LEARNING

If the controller 60 detects an input corresponding to a depress of the learn signal button shown in step S209 in FIG. 12a, a signal is sent to the infrared signal controlling circuit 70, using output 68 pins to instruct the infrared signal controlling circuit to enter infrared signal learning program mode. As shown in step S300 in FIG. 14a, the controller of the infrared controlling circuit executes a learning program routine from software stored within its ROM, which includes setting to value zero and starting a programming time-out counter in a step S301. The signal learning program routine prepares the controller of the infrared signal controlling circuit 70 for subsequent receipt of a series of instructions. A first instruction identifies the intended appliance category, which is then followed by instructions to enter infrared signal learning mode. As indicated previously, learning remote controls are well documented in prior art, for example as disclosed in U.S. Pat. Nos. 4,905,279 and 5,959,751, hereby incorporated by reference. The controller of the infrared controlling circuit illuminates red light-emitting diode 52d in different manners to communicate the status of the signal learning process to the user during this programming mode.

The speech recognizing circuit controller 60 executes code stored in ROM 61 to enter a response prompting recognition mode for appliance category selection shown in step S302. The speech recognition circuit 50 software executes a response prompting routine and activates the appliance category name recognition vocabulary set as shown in step S303. As defined previously for speech recognition modes, a time-out counter is set to zero and started in a step S304 when the response prompting recognition mode is activated. The user is then expected to select a voice command from the appliance category name recognition set and respond when prompted by a speech synthesis prompt, an audio sound and/or the illumination of a green light emitting diode 52a as shown in a step S305. As indicated previously, the appliance category name recognition set may be comprised of such voice command options as "television," "video," "satellite," and "cable" among which the user may select.

Following the prompting of the user, the software enters a pattern generating mode in a step S306, waiting for a voice command to be detected. If a maximum allowed time-out value TMAXD is attained before a voice command is detected, the software will terminate the response prompting routine and return to a default continuous listening recognition mode, and the programming time-out counter is allowed to expire as shown in step S292 as shown in FIG. 13c. Until time TMAXD has expired, the speech recognition circuit remains available to generate a pattern when a voice command is detected as shown in steps S306, S307 and S308. If a voice command is detected in a step S308, a pattern is generated in a step S309 and submitted for pattern recognition processing in a step S310.

During step S310 the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold. The result of this comparison is identified in a step S311.

If a match for the acquired pattern is not identified, the red light-emitting diode 52c illuminates briefly to provide a visual indicator to the operator that no match was identified and the value of the recognition time-out counter is reset to the value zero and restarted as shown in a step S304. The green light-emitting diode 52a is then activated and remains illuminated as shown in step S305 and the speech recognition circuit 50 executes software to enter a pattern generating mode, returning to a step S306 and waiting for a voice command to be detected. As previously indicated, until time TMAXD has expired, the speech recognition circuit remains available to generate a pattern when a voice command is detected as shown in steps S306, S307 and S308.

If a match for the acquired pattern is identified in a step S311, the speech recognition circuit 50 software identifies the instruction associated with the matching recognition vocabulary set command, and issues a prompt, which may be a speech synthesis prompt, an audio sound or light-emitting diode indication, in a step S312 to identify the appliance category name recognized. The speech recognition circuit 50 then outputs a signal to the infrared controlling circuit 70, using output 68 pins to communicate the appliance category selection command in a step S313. The infrared controlling circuit 70 receives the signal and responds by making the memory section associated with the appliance category selected available for access in a step S314. The infrared controlling circuit 70 then sets equal to value zero and restarts the programming time-out counter in a step S317.

Following the submission of a signal to the infrared signal controlling circuit 70, the speech recognition circuit controller 60 executes software stored in its ROM 61 to enter a default recognition mode and to activate a default recognition set as shown in a step S320 in FIG. 14b. If the appliance category name identified in step S312 is incorrect, step S316 shows that the programming time-out counter is allowed to expire as shown in step S292 shown in FIG. 13c, before returning to step S204 in FIG. 12a and beginning the process again. FIG. 13 c also shows that, as the programming time-out counter is allowed to expire, the time-out counter for the speech recognition circuit 50 is also allowed to expire, by reaching the value TMAXD, after which the speech recognition circuit 60 executes software stored in its ROM 61 to return to a default continuous speech recognition mode.

As indicated above, once the appliance category is identified and communicated to the infrared signal controlling circuit 70, the speech recognition circuit controller 60 executes software stored in its ROM 61 to enter a default recognition mode and to activate a default recognition vocabulary set as shown in a step S320 in FIG. 14b. This default recognition vocabulary set is made available to enable the user to navigate the recognition vocabulary structure via spoken commands to identify a command with which to associate the next infrared signal to be learned.

As described previously for speech recognition modes, a recognition time-out counter is set to zero and started in a step S321 when the default recognition mode is activated. The user is then expected to select a voice command from the default recognition vocabulary set and respond when a green light emitting diode 52a is illuminated as shown in a step S322. The default recognition vocabulary set may be comprised of such voice command options as "power," "channel," "change," "volume," "sound," "control" and "private" among which the user may select.

Following the prompting of the user by the illumination of a green light emitting diode 52a in a step S322, the software enters a mode where it is available for pattern generating in a step S323, waiting for a voice command to be detected. If a maximum allowed time-out value TMAXL is attained before a voice command is detected, the software will terminate the speech recognition routine and return to a default continuous listening recognition mode, and the programming time-out counter is allowed to expire as shown in step S292 shown in FIG. 12c. Until time TMAXL has expired, the speech recognition circuit remains available to generate a pattern when a voice command is detected as shown in steps S323, S324 and S325. If a voice command is detected in a step S325, a pattern is generated in a step S326.

As shown in a step S327, the acquired unknown pattern is analyzed by the speech recognition circuit controller 60, utilizing a recognition algorithm stored in its ROM 61, to determined if it can be classified as a match with any of the reference commands within the default recognition vocabulary set and if the likelihood of correctly recognizing the unknown pattern exceeds a predetermined threshold. The result of this comparison is identified in a step S328.

If a match for the acquired pattern is not identified, the red light-emitting diode 52c illuminates briefly to provide a visual indicator to the operator that no match was identified and the value of the recognition time-out counter is reset to the value zero and restarted as shown in a step S321. The green light-emitting diode 52a is then activated and remains illuminated as shown in step S322 and the speech recognition circuit 50 executes software to enter a pattern generating mode, returning to a step S323 and waiting for a voice command to be detected. As previously indicated, until time TMAXL has expired, the speech recognition circuit remains available to generate a pattern when a voice command is detected as shown in steps S323, S324 and S325.

If a match for the acquired pattern is identified in a step S328, the speech recognition circuit 50 software identifies the operation associated with the matching recognition vocabulary set command in a step S329 and determines if the operation is to send an instruction to the speech recognition circuit controller 60 to activate a different recognition set vocabulary or to output a signal to the infrared controlling circuit 70 using the speech recognition circuit output 68 pins. If the instruction is to activate a different recognition vocabulary set, step S330 shows that the routine returns to a step S320. The user may continue to navigate through different linked, recognition vocabulary sets until a voice command is recognized that is associated with a remote control function that is associated with a read/write memory 72 location. If the operation involves sending a signal to the infrared signal controlling circuit as shown in a step S331, said signal communicates an instruction for a remote control function type that is associated with a memory location within read/write memory 72, controlled by the infrared signal controlling circuit 70. The controller of the infrared signal controlling circuit 70 identifies said memory location and targets this memory location for storage of an infrared code to be received as shown in a step S332.

The controller of the infrared signal controlling circuit 70 activates a red light-emitting diode 52*d* in a step S333 to prompt a user that it is ready to receive a transmitted infrared code and enables one or more of its input pins to detect and receive signals generated by the infrared receiver 71, which is electrically connected to one or more of said input pins. For one embodiment of the invention, infrared receiver 71 is a commercially available photo IC capable of providing digital output to the controller of the infrared signal controlling circuit 70. Alternative schemes, utilizing other infrared light detecting devices with or without signal processing circuitry, may also be used as the IR receiver 71. As shown in a step S334, the infrared signal is received from the IR receiver 71 of the present invention by the controller of the infrared signal controlling circuit 70 as digital data. The controller of the infrared signal controlling circuit 70 decodes and converts the received digital data into a control code format and stores the resulting control code into a memory location within read/write memory 72, controlled by the infrared signal controlling circuit 70. The memory location is associated with the remote control function type associated with the recognized voice command spoken by the user.

The controller of the infrared signal controlling circuit 70 activates a red light-emitting diode 52*d* in a step S335 to inform the user if the infrared signal learning process was capable of successfully receiving, formatting and storing the infrared signal or not. This red light-emitting diode 52*d* provides prompts in different manners to distinguish between a successful learning process and a process during which an error was encountered. A successfully learned and stored infrared signal may be later transmitted by the invention while in an operation mode upon recognition of the voice command with which the learned infrared signal is associated.

Following an attempt to learn an infrared signal, the controller of the infrared signal controlling circuit executes software stored within its ROM to reset to value zero and start the programming time-out counter, returning to a step S317 shown in FIG. 14*a*. Also, following the submission of a signal to the infrared signal controlling circuit 70, the speech recognition circuit controller 60 executes software stored in its ROM 61 to return to the default recognition mode and reset the value TMAXL to zero as shown in steps S331 and S320. As shown in a step S336, a user may elect to either return to the previous process steps to repeat a previously failing signal learning attempt or to attempt to learn additional infrared signals or the user may elect to allow the programming time-out counter of the infrared signal controlling circuit 70 to expire as shown in step S292 shown in FIG. 12*c*.

After the time-out counters have reached their respective maximum values, the invention exits this setup programming mode and enters a default recognition mode, where it becomes available to receive spoken commands from the user and respond by transmitting infrared control signals to appliances, including any infrared signals learned during a infrared signal learning setup process as described above.

VOICE TRAINING

If the controller 60 detects an input corresponding to a depress of the name command button shown in step S211 in FIG. 12*a*, a speaker dependent command voice training routine is initiated and executed by said controller as shown in a step S340 in FIG. 15. This training routine generates and stores into read/write memory 54 a user-specific reference pattern for each voice command to be included in a speaker dependent recognition vocabulary set. The speech recognition circuit controller 60 executes software stored in its ROM 61 to set to value zero and start a training program time-out counter as shown in a step S341.

Following the prompting of the user by a speech synthesis prompt, an audio sound and/or the illumination of a green light emitting diode 52*a* in a step S342, the software enters a mode where it is available for pattern generating in a step S343, waiting for a voice command to be detected. If a maximum allowed time-out value TMAXV is attained before a voice command is detected, the software will terminate the voice training as shown in step S345 and enter a default speech recognition operation mode which is described previously. Until time TMAXV has expired, the speech recognition circuit remains available to generate a pattern when a voice command is detected as shown in steps S343, S344, S345 and S346. If a voice command is detected in a step S344, a pattern is generated in a step S346.

One embodiment of the invention executes a speaker dependent reference pattern generation algorithm that is well known to those familiar with speech recognition art. The algorithm involves the generation of a pattern each time a voice command is spoken by a user. A pattern is a compact representation of the significant acoustic information in a voice command word or phrase. A reference pattern may be, for example, created by averaging patterns generated as the voice command is spoken two or more times. The reference pattern is then stored in a read/write memory 54. As shown in a step S347 and S348, the first pattern generated is stored into a read/write memory 54 location. The user is then prompted in a step S349 to repeat the voice command, returning to step S341 and continuing through step S346 to perform the pattern generation process for the repeated voice command.

Following the generation of the second pattern, the second pattern is then compared to the first pattern which is stored in read/write memory 54 to determine if the two patterns match sufficiently to satisfy a predetermined matching criteria as shown in a step S350. If the matching criteria is not satisfied, the two patterns are determined to not match, and the first pattern generated is replaced by storing the second pattern generated into the previously identified read/write memory 54 location, and thus overwriting the first pattern. The user is then prompted in a step S349 to repeat the voice command, returning to step S341 and continuing through step S346 to perform the pattern generation process for the repeated voice command. As shown by steps S341 through S350 this process cycle may be continued until two patterns are generated which are capable of meeting said matching criteria.

Once two patterns are generated which are capable of meeting said matching criteria, a reference pattern is generated as shown in step S351. A pattern recognition routine is then executed to compare the resulting reference pattern to any other previously generated reference patterns within the intended recognition vocabulary set which are stored in read/write memory 54 to determine if the new reference pattern is sufficiently different than said previously generated reference patterns. This comparison is performed to prevent the acceptance of similar voice commands, which may reduce the recognition accuracy rate. The comparison may calculate distance measurements of the fit of the newly generated reference pattern to the previously generated reference patterns within the intended recognition vocabulary set. The distance measurements between the newly generated reference pattern and the closest matching previously generated reference pattern(s) may then be compared to a predetermined comparison criteria to determine the degree of similarity. If the newly generated reference pattern is too similar to an existing reference pattern, the newly generated reference pattern is rejected, and the user is prompted in a step S353 to select a different voice command name, returning to step S341.

If the newly generated reference pattern is not found to be too similar to an existing reference pattern, the newly generated reference pattern is compressed and stored into read/write memory 54 as shown in a step S354. In a step S355, the speech recognition circuit controller 60 executes software stored in its ROM 61 to determine if sufficient capacity remains in read/write memory 54 to allow additional voice commands to be trained. If there is sufficient capacity in the memory 54, the system returns to step S341, where the user is prompted to enter another voice command by a speech synthesis prompt, an audio sound and/or the illumination of a green light emitting diode 52a. If the user desires to exit this voice training mode, the user allows the training program time-out counter to expire as shown in a step S356. If there is insufficient capacity in the memory 54, the user is informed accordingly by a speech synthesis prompt, an audio sound and/or the illumination of a red light emitting diode 52c and the training program terminates.

The contents of the read/write memory 54 may be erased by depressing and simultaneously holding the name command button and the code button for a brief period of time.

Depressing and momentarily holding two predetermined buttons on keypad 51 may cause the address pointer for the read/write memory 54 to be set to zero, allowing any data previously stored within said memory to be overwritten during subsequent write operations to said memory. This enables a user to effectively "erase" this memory and store different data in a form of speech command reference pattern data and macro program instruction data.

The read/write memory 54 utilized in the preferred embodiment of the present invention may be a commercially available I²C™ Serial EEPROM, for example a model number 24LC64 available from MicroChip Technology Inc. and described in a data sheet entitled; 24AA64/24LC64 64K I²C™ MOS Serial EEPROM, document number DS21189C published by MicroChip Technology Inc. copyright 1999, pages 1–12, available from MicroChip Technology Inc., hereby incorporated by reference. When the two said buttons are simultaneously depressed, two input pins 68 of IC 55 which are electrically connected to said buttons are brought to a logical low state. The software stored in ROM 61 of the speech recognition circuit 50 executes a program which detects this condition and responds by setting the address pointer for the next available address location for memory 54 to value zero and storing this value in the predetermined address pointer location of said memory 54. The next attempt by the speech recognition circuit software to store data to said memory 54 will retrieve the value of the address pointer for the next available location from said predetermined location within memory 54, and interpret the value zero as an instruction to begin storing data in the first address configured to accept data.

MACRO PROGRAMMING

If the controller 60 detects an input corresponding to a depress of the macro button shown in step S213 in FIG. 12a, a macro programming routine is initiated and executed by said controller as shown in a step S360 in FIG. 16a. As indicated in a step S361, the system executes an appliance category selection routine as described in step S220 in FIG. 12b to identify the appliance category from which the macro will be activated when the macro name is later recognized by the speech recognition circuit 50 as a voice command. If the appliance category name identified during the execution of the appliance category selection routine is incorrect, step S362 shows that the user may elect to press the setup button, returning to step S204 in FIG. 12a and begin the process again.

If the appliance category name identified during the execution of the appliance category selection routine is correct, the user allows the software routine to continue. A step S362 shows that the software enters a speaker dependent recognition mode in a step S363 and a speaker dependent recognition vocabulary set is activated in a step S364. The speaker dependent recognition vocabulary set activated may contain one or more macro names, and possibly other speaker dependent voice commands for non-macro uses, previously trained by the user in accordance with the process steps described in FIG. 15. The speech recognition circuit controller 60 executes software stored in its ROM 61 to set to value zero and start a recognition time-out counter as shown in a step S365.

Following the prompting of the user by a speech synthesis prompt, an audio sound and/or the illumination of a green light emitting diode 52a in a step S366, the software enters a mode where it is available for pattern generating in a step S367, waiting for a voice command to be detected. If a maximum allowed time-out value TMAXM is attained before a voice command is detected, the software will terminate the macro programming routine as shown in step S368 and the user may elect to press the setup button, returning to step S204 in FIG. 12a and begin the process again. Until time TMAXM has expired, the speech recognition circuit remains available to generate a pattern when a voice command is detected as shown in steps S367, S368, and S369. If a voice command is detected in a step S369, a pattern is generated in a step S370 and submitted for pattern recognition processing in a step S371.

During step S371 the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold. The result of this comparison is identified in a step S372.

If a match for the acquired pattern is not identified a red light-emitting diode 52c illuminates briefly to provide a visual indicator to the operator that no match was identified in a step S373 and returns to step S365 to set to value zero and start a recognition time-out counter. The software then re-enters a mode where it is available for pattern generating, waiting for a voice command to be detected. As previously indicated, until time TMAXM has expired, the speech recognition circuit remains available to generate a pattern when a voice command is detected as shown in steps S367, S368 and S369.

If a match for the acquired pattern is identified in a step S372, the speech recognition circuit 50 software identifies a read/write memory 54 location associated with the matching recognition vocabulary set command in a step S374. Said memory 54 location is used to store the sequence of commands instructions to be associated with the macro name identified by the preceding voice command. As shown in a step S375, the software executed by the speech recognition circuit controller 60 then activates the default recognition mode associated with the appliance device type previously selected.

As indicated previously, once the macro name is identified, the speech recognition circuit controller 60 executes software stored in its ROM 61 to enter a default recognition mode and to activate a default recognition vocabulary set as shown in a step S381 in FIG. 16b. This default recognition vocabulary set is made available to enable the user to navigate the recognition vocabulary structure via spoken commands to identify a voice command for which the associated instruction is to be stored within the read/write memory 54 location associated with said macro name voice command.

As described previously for speech recognition modes, a recognition time-out counter is set to zero and started in a step S382 when a recognition mode is activated. The user is then expected to select a voice command from the default recognition vocabulary set and respond when prompted by a speech synthesis prompt, an audio sound and/or the illumination of a green light emitting diode 52a as shown in a step S383. As also indicated previously, the default recognition vocabulary set may be comprised of such voice command options as "power," "channel," "change," "volume," "sound," "control" and "private" among which the user may select.

Following the prompting of the user by the illumination of a green light emitting diode 52a in a step S383, the software enters a mode where it is available for pattern generating in a step S384, waiting for a voice command to be detected. If a maximum allowed time-out value TMAXM is attained before a voice command is detected, the software will return to a known default continuous listening recognition mode and the user may continue generating the macro as shown in step S385. Until the time TMAXM has expired, the speech recognition circuit remains available in the active recognition mode to generate a pattern when a voice command is detected as shown in steps S384, S385 and S386. If a voice command is detected in a step S386, a pattern is generated in a step S387.

As shown in a step S388, the acquired unknown pattern is analyzed by the speech recognition circuit controller 60, utilizing a recognition algorithm stored in its ROM 61, to determined if it can be classified as a match with any of the reference commands within the active recognition vocabulary set and if the likelihood of correctly recognizing the unknown pattern exceeds a predetermined threshold. The result of this comparison is identified in a step S389.

If a match for the acquired pattern is not identified, the red light-emitting diode 52c illuminates briefly to provide a visual indicator to the operator that no match was identified as shown in a step S390 and the value of the recognition time-out counter is reset to the value zero and restarted as shown in step S382. The green light-emitting diode 52a is then activated and remains illuminated as shown in step S383 and the speech recognition circuit 50 executes software to enter a pattern generating mode, returning to a step S384 and waiting for a voice command to be detected. As previously described, until the time-out counter value of the currently active recognition mode reaches its respective maximum valve, the speech recognition circuit remains in the active recognition mode available to generate a pattern when a voice command is detected as shown in steps S384, S385 and S386.

If a match for the acquired pattern is identified in a step S389, the speech recognition circuit 50 software identifies the operation associated with the matching recognition vocabulary set command in a step S391 and determines if the operation is to send an instruction to the speech recognition circuit controller 60 to activate a different recognition set vocabulary or to output a signal to the infrared controlling circuit 70 using the speech recognition circuit output 68 pins. If the instruction is to activate a different recognition vocabulary set, step S391 shows that the routine returns to a step S380 to enter the appropriate recognition mode and activate the recognition vocabulary set associated with the recognized voice command in step S381. The user may continue to navigate through different linked, recognition vocabulary sets until a voice command is recognized that is associated with an instruction to output a signal to the infrared controlling circuit 70.

If a voice command is recognized that is associated with an instruction to output a signal to the infrared controlling circuit 70, the associated instruction is stored within the read/write memory 54 location associated with said macro name voice command as shown in a step S392. In the memory 54 location sequentially following the memory location where the instruction is stored, an end marker instruction may be automatically stored by the speech recognition circuit 50 software as shown in step S393. The user must then determine if this is the last instruction to be added to the macro program or not. If another instruction is to be added, the user must determine if it is desirable to insert a time delay between the execution of the currently identified instruction and a following macro instruction to be selected. As shown in a step S394, if the insertion of a time delay is desirable, the user may depress a keypad 51 designated as a time delay button one or more times, where each button depress increases the length of the time delay by a brief period (typically 0.5 seconds or less) by storing one or a series of time delay instructions within the read/write memory 54 location associated with said macro name voice command as shown in a step S395. The time delay instructions are stored into said memory 54 location in a section sequentially following the section of the instruction previously identified via voice command.

If the user determines that another instruction is be added to the macro program, then the user depresses the macro button as shown in a step S396, the software returns to a step S375 shown in FIG. 16a, and the software executed by the speech recognition circuit controller 60 then activates the default recognition mode associated with the appliance device type previously selected. As indicated previously, this default recognition vocabulary set is made available to enable the user to navigate the recognition vocabulary structure via spoken commands to identify another voice command for which the associated instruction is also to be stored within the read/write memory 54 location associated with said macro name voice command.

Each additional instruction added to a macro is stored in the same memory 54 location as that of the previously stored end marker instruction, which was stored by the software after the previous macro instruction was stored, thus overwriting the end markers. This process for adding instructions to said memory location 54 associated with said macro continues until the user determines the last instruction has been identified via voice command. At this time, the user depresses a keypad 51 button designated as a program completion button as shown in a step S397 to instruct the speech recognition circuit controller 60 to execute software stored in its ROM 61 terminate the macro programming routine and enter the default recognition mode associated with the previously identified appliance category as shown in step S398.

The macro program resulting from this process is stored in a read/write memory 54 location comprised of multiple, sequential bytes of memory. Each byte may contain an instruction to output a signal to the infrared controlling circuit 70, an instruction to execute a time delay, or an instruction in the form of an end marker to instruct the speech recognition circuit controller 60 software that the last macro instruction has been retrieved. When a macro name is spoken by a user and recognized by the speech recognition circuit controller 60 software, said software retrieves and sequentially executes each of the instructions stored within the read/write memory 54 location associated with said macro name in the same order which the instructions were stored.

Within this macro programming software routine, the use of keypad 51 buttons other than the macro button, such as the code button and signal learning button, may be used for such functions as time delay insertion and end marker insertion into the macro sequence. This approach allows for a reduction of the required button count, and is particularly useful for such relatively infrequently used functions as those identified above.

Reference is made to FIG. 17 which shows the power supply circuit 90 in greater detail than that shown in FIG. 1. This circuit is described previously in the section describing the process steps of FIG. 12a.

DESCRIPTION OF OPERATION

Once successfully setup, the present invention typically remains in a sound activation mode until sound pressure exceeding a defined threshold (sound activation sensitivity setting) initiates a "wake up" event. Once the oscillator is started and stabilized, the system enters a continuous listening default recognition mode awaiting detection and recognition of one of the default menu words associated with a selected target appliance.

Control functions for the target appliance can then be activated via voice commands. Once an appliance has been selected, its default menu remains the active recognition vocabulary set until changed by the user. Voice commands may then be selected from the available recognition vocabulary set. The vocabulary options made available by the default menu vary depending upon the category of the appliance selected (for example, a VCR may have different options available than a TV). Voice commands may instruct the invention to initiate a control signal to the target appliance or activate a function sub-menu in the form of a different recognition vocabulary set (which may include access, for example, to different appliance control functions, macro functions, speaker dependent commands or device selection commands).

The unit then remains in a continuous listening default recognition mode for a defined period of time or until a defined number of consecutive unsuccessful recognition attempts occur, whichever occurs first. If any default menu word is recognized, the invention executes the appropriate command. If no default menu words are recognized, the unit returns to sound activation mode. Upon returning to default recognition mode from sound activation mode, the software remains in default recognition mode until a defined period of time where no recognition (successful) activity has elapsed after the last recognized command (a "user settling period") or until a defined number of consecutive unsuccessful recognition attempts occur, whichever occurs first.

When in a continuous listening default recognition mode, a green LED 52a remains illuminated to provide a visual cue to the user when the device is ready to receive commands for recognition and a red LED 52c will illuminate when unavailable. Following activation from sound activation mode, the invention returns to the default menu of the most recently selected appliance. Default Menu Vocabulary for a Television:

As an example, Table 1 below identifies seven words comprising a default menu recognition vocabulary set available for a television. FIG. 5 shows the process steps associated with the software executed during this mode.

If the speaker independent command "Power" is recognized, the invention transmits the IR signal for the Power command, turning the currently controlled appliance on or off.

Recognition Vocabulary—Television

TABLE 1

| Power | Channel | Change | Volume | Sound | Control | Private |
|-------|---------|--------|--------|-------|---------|---------|

Table 2 below identifies words (digit names) comprising a channel number recognition vocabulary set. If the word "Channel" is recognized, a pattern queuing routine is initiated, as shown in FIG. 9, and makes the following speaker independent sub-menu available for recognition:

Recognition Vocabulary—Television

TABLE 2

| Power | Channel | Change | Volume | Sound | Control | Private |
|---|---|---|---|---|---|---|
| | Zero | | | | | |
| | One | | | | | |
| | Two | | | | | |
| | Three | | | | | |
| | Four | | | | | |
| | Five | | | | | |
| | Six | | | | | |
| | Seven | | | | | |
| | Eight | | | | | |
| | Nine | | | | | |

The green LED 52a then prompts a user to say a digit name. After detecting the first digit, the invention's green LED 52b then quickly prompts the user for another digit name. In one embodiment of the invention, the routine prompts the user for up to 3 digit names. If a second digit (or third) is not detected within a predetermined period of time, the invention performs the speech recognition process and transmits the IR signal(s) associated with any recognized channel number names and returns to the default recognition mode.

Table 3 below identifies words comprising a directional channel changing recognition vocabulary set. If the word "Change" is recognized, the invention enters a response prompting recognition mode as shown in FIG. 8 and the following speaker independent sub-menu is made available for recognition:

Recognition Vocabulary—Television

TABLE 3

| Power | Channel | Change | Volume | Sound | Control | Private |
|---|---|---|---|---|---|---|
| | | Up | | | | |
| | | Down | | | | |
| | | Back | | | | |

"Up" and "Down" are instructions to advance forward or in reverse order to the next sequentially available channel number, respectively. "Back" is an instruction to return to the channel number established prior to the current channel number.

If the words "Up," "Down" or "Back" are recognized, the invention transmits the associated IR signal associated with the indicated channel directional change and awaits, for a predetermined period of time, for another Up/Down/Back command before returning to the default menu recognition mode. This sequence continues until no Up/Down/Back commands are recognized within said predetermined period of time of a previous command, at which time the software returns to the default menu recognition mode.

Table 4 identifies words comprising the volume changing recognition vocabulary set. If the word "Volume" is recognized, the invention enters a response prompting recognition mode as shown in FIG. 8 and the following speaker independent sub-menu is made available for recognition:

Recognition Vocabulary—Television

TABLE 4

| Power | Channel | Change | Volume | Sound | Control | Private |
|---|---|---|---|---|---|---|
| | | | | Up | | |
| | | | | Down | | |

"Up" and "Down" are instructions to increment or decrement the volume level, respectively. If the words "Up" or "Down" are recognized, the invention transmits the associated IR signal associated with the indicated volume level change and awaits, for a predetermined period of time, for another Up/Down command before returning to the default menu recognition mode. This sequence continues until no Up/Down commands are recognized within said predetermined period of time of a previous command, at which time the software returns to the default menu recognition mode.

Table 5 below identifies a word in the default recognition vocabulary for the muting function. If the word "Sound" is recognized, the invention transmits the IR signal for the muting command and returns to default recognition mode.

Recognition Vocabulary—Television

TABLE 5

| Power Channel Change Volume | Sound | Control Private |
|---|---|---|

Table 6 below identifies the words comprising the device selection/control recognition vocabulary set. If the word "Control" is recognized, the invention enters a response prompting recognition mode as shown in FIG. 8 and the following speaker independent sub-menu is made available for recognition:

Recognition Vocabulary—Television

TABLE 6

| Power Channel Change Volume Sound | Control | Private |
|---|---|---|
| | Television | |
| | Video | |
| | Satellite | |
| | Cable Box | |
| | Switch | |
| | Power . . . | |

If the words "Television," "Video," "Satellite" or "Cable Box" are recognized, the invention makes the specified appliance type available for subsequent control. If the word "Switch" is recognized, the invention transmits an IR signal associated with the "TV/Video" switching function and returns to the default recognition mode.

If the word "Power" is recognized, the software returns to response prompting recognition mode, awaiting a repeat of this command to ensure the invention is not accidentally powered down. If a second word "Power" is recognized, the invention utilizes a speech recognition circuit 50 input/output 68 pin to activate a switch 93 to disconnect the power source from the power supply circuit 90.Manually depressing a power button is required to re-activate the invention.

Table 7 below indicates how a speaker dependent vocabulary recognition set sub-menu may be accessed if speaker dependent vocabulary words have previously been trained. If the word "Private" is recognized, the software enters speaker dependent recognition mode and makes a recognition vocabulary set containing speaker dependent function names, device names and macro names available for recognition. It should be noted that this recognition vocabulary set remains empty until the user has entered speaker dependent names via the voice training setup process shown in FIG. 15. The recognition of any speaker dependent voice command causes the software to execute the instruction(s) associated with the recognized command, including the transmission of any associated IR signals, and remain in speaker dependent recognition mode awaiting another command from this recognition vocabulary set. If no words are detected for a predetermined period of time or if a predetermined number of consecutive recognition error occur, the software automatically returns to a continuous listening default recognition mode, awaiting speaker independent commands.

Recognition Vocabulary—Television

TABLE 7

| Power Channel Change Volume Sound Control | Private | |
|---|---|---|
| | | Custom Name 1 |
| | | Custom Name 2 |
| | | etc. |
| | | Macro Name 1 |
| | | Macro Name 2 |
| | | etc. |

Default Menu Vocabulary for Video:

In addition to the default recognition vocabulary set commands available for a "Television," the device selection of "Video " (VCR, DVD, etc.) may also make voice commands named "Play," "Stop," "Pause," "Record," "Rewind" and "Fast Forward" available. If any of these are recognized, the invention transmits the IR signal associated with the indicated function and returns to continuous listening default recognition mode. The voice command "Record", however, is an exception. If the word "Record" is recognized, the software returns to recognition mode awaiting a repeat of this command to ensure there is no unintentional recording onto the media within the VCR or other such device.

Macros:

As described previously, a user has the option of creating one or more macros, where a single speaker dependent word command may produce a series of infrared signal transmissions to one or more target appliances. For example, the voice command "HBO" may generate infrared signals for digits "1," "2," and "3," causing the TV to change to channel number "123." FIG. 16a and FIG. 16b describe the macro programming process in detail.

Obviously, many modifications and variations of the present invention are possible in light of the above teachings. Thus, it is to be understood that, within the scope of the appended claims, the invention may be practiced otherwise than as specifically described above. For example, the circuitry and related software disclosed herein may be otherwise integrated and/or combined differently than represented by the embodiments of this invention. For example, one such alternate approach may involve providing direct electrical connections between predetermined speech recognition circuit IC output pins 68 and remote control controller IC 76 input pins. For this example, software executed by the speech recognition circuit 50 may emulate the signals output by the output by the output pins of a conventional remote control controller when one of its keypad buttons are depressed, whereby the remote control controller output pins are generally electrically connected to remote control controller input pins. Other approaches may integrate the features of this invention differently than disclosed therein into one or more microcontrollers, processors, digital signal processors (DSP), application-specific integrated circuits (ASIC) and the like.

In addition, the hands-free voice-operated remote control transmitter software is not limited to executing a speaker independent, continuous listening default recognition mode. For example, a setup process may be provided where a user is prompted to train speaker dependent words in a manner which would generate a speaker dependent vocabulary structure similar to the speaker independent vocabulary structure disclosed for the present invention.

Furthermore, the software executed by the present invention may be adapted to guide a user through controlled appliance setup processes, for example programming a VCR with or without VCR-PLUS® capability to record a televised program, in a prompt -driven manner.

Moreover, sound-activation circuitry utilized by the present invention is not limited to use of inverting Schmitt trigger circuits. Similar circuitry capable of performing amplification and comparator operations, such as that based upon one or more operational amplifiers, may also be used. Furthermore, the mode of activation of the present invention is not limited to sound activation. Similar schemes, for example, such at those utilizing light detection circuitry or motion detection circuitry may also be used.

What is claimed and desired to be secured by Letters Patent of the United States is:

1. An audio signal activated control system for controlling appliances comprising:
    a microphone for receiving audio signals and converting said audio signals to electrical signals;
    a speech recognition system for receiving said electrical signals, said speech recognition system including a processor and having a low power sound activation mode for detecting the presence of said electrical signals and a speech recognition mode for converting said electrical signals to electrical representative signals, decoding said electrical representative signals and generating control signals for controlling one or more appliances, wherein in said speech recognition mode said processor decodes said electrical representative signals and wherein in said sound activation mode said processor is in a low power state, said speech recognition system configured to automatically switch from said sound activation mode to said speech recognition mode as a function of the amplitude of said electrical signals; and
    an appliance control circuit which includes a transmitter, said appliance control circuit configured to receive said control signals from said speech recognition system and generate and automatically transmit one or more appliance control signals to said one or more appliances.

2. The voice actuated audio signal activated control system as recited in claim 1, wherein said transmitter is configured to wirelessly transmit said one or more appliance control signals to said one or more appliances.

3. The audio signal activated control system as recited in claim 2, wherein said transmitter is an infrared transmitter.

4. The audio signal activated control system as recited in claim 2, wherein said transmitter is an RF transmitter.

5. The audio signal activated control system as recited in claim 1, wherein said speech recognition system further includes a user-adjustable sound activation sensitivity control configured to enable a user to adjust the signal amplitude threshold level that must be exceeded by said amplitude of said electrical signals for automatically switching from said sound activation mode to said speech recognition mode.

6. The audio signal activated control system as recited in claim 1, wherein said speech recognition system further includes a user-adjustable amplification circuit configured to enable the degree of amplification of said amplitude of said electrical signals to be varied.

7. The audio signal activated control system as recited in claim 1, wherein said low power state of said processor is a sleep state.

8. The audio signal activated control system as recited in claim 1, wherein in said speech recognition mode said processor operates at a higher operating frequency than in said low power state.

9. The audio signal activated control system as recited in claim 1, wherein said speech recognition system is further configured to automatically terminate said speech recognition mode and automatically switch to said low power sound activation mode.

10. The audio signal activated control system as recited in claim 9, wherein said speech recognition system is configured for automatically terminating said speech recognition mode after a predetermined period of time.

11. The audio signal activated control system as recited in claim 9, wherein said speech recognition system is configured for automatically terminating said speech recognition mode after a period of time that is based upon the results of said decoding of said electrical representative signals.

12. The audio signal activated control system as recited in claim 9, wherein said speech recognition system is configured for automatically terminating said speech recognition mode based upon the results of said decoding of said electrical representative signals.

13. The audio signal activated control system as recited in claim 12, wherein said results include one or more predetermined errors detected during said speech recognition mode.

14. The audio signal activated control system as recited in claim 1, wherein said control system further comprises a memory for storage of data associated with said appliance control signals.

15. The audio signal activated control system as recited in claim 1, wherein said control system further comprises a memory for storage of data associated with a plurality of said appliance control signals for controlling an appliance.

16. The audio signal activated control system as recited in claim 1, wherein said control system further comprises a memory for storage of data associated with a plurality of said appliance control signals for controlling a plurality of said appliances.

17. The audio signal activated control system as recited in claim 1, wherein said speech recognition system further includes a programming mode to enable a user to define a control signal to be associated with a defined audible command, wherein in said speech recognition mode said speech recognition system generates said defined control signal for controlling one or more appliances if said electrical signals represent said defined audible command.

18. The audio signal activated control system as recited in claim 1, wherein said speech recognition system further includes a programming mode to enable a user to define a plurality of control signals to be associated with a defined audible command, wherein in said speech recognition mode said speech recognition system generates said defined plurality of control signals for controlling said one or more appliances if said electrical signals represent said defined audible command.

19. The audio signal activated control system as recited in claim 1, wherein said speech recognition system wherein in said speech recognition mode is further configured for decoding said electrical representative signals to define an appliance type, said appliance type defining said appliance to which said appliance control signals are transmitted by said appliance control circuit.

20. The audio signal activated control system as recited in claim 19, wherein said speech recognition system wherein in said speech recognition mode is further configured for decoding said electrical representative signals to determine if said signals represent predetermined audible commands corresponding to control functions associated with said defined appliance type.

21. An audio signal activated control system for controlling one or more appliances, said control system comprising:
a microphone for receiving audio signals and converting said audio signals to electrical signals;
a speech recognition circuit including a processor and having a plurality of modes of operation including a speech recognition mode and a low power sound activation mode, wherein in said speech recognition mode said speech recognition circuit converts said electrical signals to electrical representative signals and said processor decodes said electrical representative signals and wherein in said sound activation mode said processor is placed in a low power state;
a sound activation circuit configured for determining if the amplitude of said electrical signals exceeds a predetermined threshold and causing said speech recognition circuit to switch automatically from said sound activation mode to another of said plurality of said modes of operation;
said speech recognition circuit configured for generating first control signals in said speech recognition mode if said electrical signals represent one or more predetermined audible commands, said speech recognition circuit configured for switching automatically from said speech recognition mode to another of said plurality of said modes of operation under predetermined conditions; and
an appliance control circuit configured for receiving said first control signals from said speech recognition circuit and generating second control signals to cause one or more appliances to perform one or more functions associated with said first control signals.

22. The control system as recited in claim 21, wherein said predetermined threshold of said sound activation circuit is user-adjustable.

23. The audio signal activated control system as recited in claim 21, wherein said appliance control circuit is configured to wirelessly transmit said second control signals to said one or more appliances.

24. The control system as recited in claim 23, wherein said second control signals are RF signals.

25. The control system as recited in claim 23, wherein said second control signals are infrared signals.

26. The audio signal activated control system as recited in claim 21, wherein said sound activation circuit is configured to cause said speech recognition circuit to switch automatically from said sound activation mode to another of said plurality of said modes of operation, wherein another of said plurality of said modes of operation is said speech recognition mode.

27. The audio signal activated control system as recited in claim 21, wherein said sound activation circuit further includes a user-adjustable amplification level control to enable the degree of amplification of said amplitude of said electrical signals to be varied for controlling the sensitivity of said sound activation circuit.

28. The audio signal activated control system as recited in claim 21, wherein said low power state of said processor is a sleep state.

29. The audio signal activated control system as recited in claim 21, wherein said speech recognition circuit is configured for switching automatically from said speech recognition mode to another of said plurality of said modes of operation under predetermined conditions, wherein another of said plurality of said modes of operation is said sound activation mode.

30. The audio signal activated control system as recited in claim 21, wherein said predetermined conditions include a predetermined period of time.

31. The audio signal activated control system as recited in claim 21, wherein said predetermined conditions include a period of time that tis based upon the results of determining if said electrical signals represent said predetermined audible commands.

32. The audio signal activated control system as recited in claim 21, wherein said predetermined conditions are based upon the results of determining if said electrical signals represent said predetermined audible commands.

33. The audio signal activated control system as recited in claim 32, wherein said results include one or more predetermined errors detected during said speech regognition mode.

34. The audio signal activated control system as recited in claim 21, wherein said control system further comprises a memory for storage of data associated with said second control signals.

35. The audio signal activated control system as recited in claim 21, wherein said control system further comprises a memory for storage of data associated with a plurality of said second control signals for controlling an appliance.

36. The audio signal activated control system as recited in claim 21, wherein said control system further comprises a memory for storage of data associated with a plurality of said second control signals for controlling a plurality of said appliances.

37. The audio signal activated control system as recited in claim 21, wherein one of said plurality of said modes of operation is a programming mode wherein said speech recognition circuit is configured to enable a user to define a first control signal to be associated with a defined audible command, wherein in said speech recognition mode said speech recognition circuit generates said defined first control signal if said electrical signals represent said predetermined audible command defined in said programming mode.

38. The audio signal activated control system as recited in claim 21, wherein one of said plurality of said modes of operation is a programming mode wherein said speech recognition circuit is configured to enable a user to define a plurality of first control signals to be associated with a defined audible command, wherein in said speech recognition mode said speech recognition circuit generates said plurality of first control signals if said electrical signals represent said predetermined audible command defined in said programming mode.

39. The audio signal activated control system as recited in claim 21, wherein said control system further comprises a signal circuit for enabling said electrical signals to be in communication with said speech recognition circuit in said speech recognition mode and for enabling said electrical signals to be in communication with said sound activation circuit in said sound activation mode.

40. The audio signal activated control system as recited in claim 39, wherein said signal circuit is further configured for detecting when said speech recognition circuit is in said speech recognition mode and disabling said communication between said electrical signals from said microphone and said sound activation circuit.

41. A method for providing hands-free control of appliances, comprising:
   providing a speech recognition system having a speech recognition mode wherein a processor recognizes representations of audible signals as corresponding to predetermined audible commands;
   configuring said speech recognition system to have a low power sound activation mode wherein said processor is in a low power state;
   monitoring said audible signals to detect if the amplitude of said audible signals exceeds a predetermined threshold;
   enabling said speech recognition system to switch automatically from said sound activation mode to said speech recognition mode if said amplitude exceeds said predetermined threshold;
   generating and decoding representations of said audible signals in said speech recognition mode; and
   generating and transmitting one or more appliance control signals for controlling one or more appliances if said decoded representations of said audio signals represent one or more said predetermined audible commands.

42. The method for providing hands-free control of appliances as recited in claim 41, further comprising the step of providing a user-adjustable sound activation sensitivity control to enable the level of said predetermined threshold to be varied.

43. The method for providing hands-free control of appliances as recited in claim 41, wherein said low power state of said processor is a sleep state.

44. The method for providing hands-free control of appliances as recited in claim 41, further comprising the step of terminating said speech recognition mode automatically and returning to said sound activation mode.

45. The method for providing hands-free control of appliances as recited in claim 41, further comprising the step of terminating said speech recognition mode automatically and returning to said sound activation mode after a predetermined period of time.

46. The method for providing hands-free control of appliances as recited in claim 41, further comprising the step of terminating said speech recognition mode automatically and returning to said sound activation mode after a period of time that is based upon the results of said decoding of said representations of said audible signals.

47. The method for providing hands-free control of appliances as recited in claim 41, further comprising the step of terminating said speech recognition mode automatically and returning to said sound activation mode based upon the results of said decoding of said representations of said audible signals.

48. The method for providing hands-free control of appliances as recited in claim 41, further comprising the step of terminating said speech recognition mode automatically and returning to said sound activation mode based upon the detection of one or more predetermined errors during said speech recognition mode.

49. The method for providing hands-free control of appliances as recited in claim 41, wherein said step of generating and transmitting one or more appliance control signals comprises wirelessly transmitting said one or more appliance control signals to one or more appliances.

50. The method for providing hands-free control of appliances as recited in claim 41, further comprising the step of providing a memory for storage of data associated with said appliance control signals.

51. The method for providing hands-free control of appliances as recited in claim 41, further comprising the step of providing a memory for storage of data associated with a plurality of said appliance control signals for controlling an appliance.

52. The method for providing hands-free control of appliances as recited in claim 41, further comprising the step of providing a memory for storage of data associated with a plurality of said appliance control signals for controlling a plurality of said appliances.

53. The method for providing hands-free control of appliances as recited in claim 41, further comprising the steps of:
   providing a programming mode for defining an appliance control signal to be associated with a defined audible command;
   generating and transmitting said defined appliance control signal for controlling one or more appliances if said representations of said audio signals decoded in said speech recognition mode represent said defined audible command.

54. The method for providing hands-free control of appliances as recited in claim 41, further comprising the steps of:

providing a programming mode for defining a plurality of appliance control signals to be associated with a defined audible command;

generating and transmitting said defined plurality of appliance control signals for controlling one or more appliances if said representations of said audio signals decoded in said speech recognition mode represent said defined audible command.

55. The method for providing hands-free control of appliances as recited in claim 41, further comprising the step of decoding said representations of said audible signals in said speech recognition mode to define an appliance type for defining said appliance to which said appliance control signals are transmitted.

* * * * *

UNITED STATES PATENT AND TRADEMARK OFFICE
CERTIFICATE OF CORRECTION

PATENT NO.     : 6,397,186 B1
DATED          : May 28, 2002
INVENTOR(S)    : Bush et al.

It is certified that error appears in the above-identified patent and that said Letters Patent is hereby corrected as shown below:

Column 52,
Line 29, delete "voice actuated".

Column 53,
Line 49, delete "wherein".

Column 54,
Line 58, delete "tis" and insert -- is --.
Line 66, delete "regognition" and insert -- recognition --.

Signed and Sealed this

Twenty-second Day of October, 2002

Attest:

JAMES E. ROGAN
*Attesting Officer*    *Director of the United States Patent and Trademark Office*